(12) United States Patent
Kawazu et al.

(10) Patent No.: US 10,484,634 B2
(45) Date of Patent: Nov. 19, 2019

(54) IMAGE PICKUP ELEMENT, CONTROL METHOD, AND IMAGE PICKUP DEVICE

(71) Applicant: SONY CORPORATION, Tokyo (JP)

(72) Inventors: Naoki Kawazu, Kanagawa (JP); Atsushi Suzuki, Kanagawa (JP); Takashi Shoji, Kanagawa (JP); Masashi Akamatsu, Nagasaki (JP); Nobutaka Shimamura, Kanagawa (JP); Hayato Wakabayashi, Tokyo (JP); Yuuki Yamagata, Kanagawa (JP); Norihiro Nikai, Fukuoka (JP); Tohru Kikawada, Kanagawa (JP); Takumi Oka, Kanagawa (JP); Toshiki Kainuma, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/119,636

(22) PCT Filed: Feb. 24, 2015

(86) PCT No.: PCT/JP2015/055140
§ 371 (c)(1),
(2) Date: Aug. 17, 2016

(87) PCT Pub. No.: WO2015/133323
PCT Pub. Date: Sep. 11, 2015

(65) Prior Publication Data
US 2017/0195603 A1 Jul. 6, 2017

(30) Foreign Application Priority Data
Mar. 6, 2014 (JP) .................................. 2014-044036

(51) Int. Cl.
*H04N 5/374* (2011.01)
*H04N 5/378* (2011.01)
(Continued)

(52) U.S. Cl.
CPC ........... *H04N 5/3742* (2013.01); *H04N 5/347* (2013.01); *H04N 5/3456* (2013.01); *H04N 5/378* (2013.01);
(Continued)

(58) Field of Classification Search
CPC .. H04N 5/37455; H04N 5/3741; H04N 5/374; H04N 5/3765; H04N 5/3456;
(Continued)

(56) References Cited

U.S. PATENT DOCUMENTS

2008/0284884 A1 11/2008 Makimo et al.
2010/0271523 A1* 10/2010 Hara ..................... H04N 5/367
348/302
(Continued)

FOREIGN PATENT DOCUMENTS

CN 101309346 11/2008
CN 102811318 12/2012
(Continued)

OTHER PUBLICATIONS

Extended European Search Report for European Patent Application No. 15758339.4, dated Feb. 13, 2018, 12 pages.
(Continued)

*Primary Examiner* — Lin Ye
*Assistant Examiner* — Tuan H Le
(74) *Attorney, Agent, or Firm* — Sheridan Ross P.C.

(57) ABSTRACT

The present technology relates to an image pickup element, a control method, and an image pickup device which realize easier and more diversified data output. In one aspect of the present technology, a plurality of signal lines for transmitting a pixel signal read from a pixel is allocated to each column, and different reading modes of the pixel signals are respectively allocated to the signal lines of each column. Regarding each column of the pixel array connected to the
(Continued)

pixel corresponding to the mode, the pixel signal is read from the pixel connected to the signal line corresponding to the reading mode of the pixel signal in the mode, and the read pixel signal is transmitted via the signal line. The present technology is applied to, for example, an image pickup element and an image pickup device.

5 Claims, 44 Drawing Sheets

(51) Int. Cl.
    *H04N 5/345*     (2011.01)
    *H04N 5/347*     (2011.01)
    *H04N 5/3745*     (2011.01)
    *H04N 9/04*     (2006.01)

(52) U.S. Cl.
    CPC ..... *H04N 5/37455* (2013.01); *H04N 5/37457* (2013.01); *H04N 9/045* (2013.01)

(58) Field of Classification Search
    CPC ........ H04N 5/347; H04N 5/341; H04N 5/357; H04N 5/378; H04N 5/3745; H04N 5/3742; H04N 9/045; H04N 5/37457
    See application file for complete search history.

(56) References Cited

U.S. PATENT DOCUMENTS

| | | | |
|---|---|---|---|
| 2011/0102622 A1 | 5/2011 | Ebihara | |
| 2012/0119065 A1 | 5/2012 | Cieslinski | |
| 2012/0307120 A1 | 12/2012 | Masamichi et al. | |
| 2014/0145067 A1* | 5/2014 | Suh | H04N 5/378 250/208.1 |
| 2014/0209784 A1* | 7/2014 | Morita | H04N 5/378 250/208.1 |

FOREIGN PATENT DOCUMENTS

| | | |
|---|---|---|
| EP | 2453649 | 5/2012 |
| JP | 2003-234967 A | 8/2003 |
| JP | 2005-347932 | 12/2005 |
| JP | 2008-012482 | 1/2008 |
| JP | 2008-134390 A | 6/2008 |
| JP | 2008-219243 A | 9/2008 |
| JP | 2009-296423 | 12/2009 |
| JP | 2010-147614 A | 7/2010 |
| JP | 2010-252140 | 11/2010 |
| JP | 2010-263526 A | 11/2010 |
| JP | 2011-97540 A | 5/2011 |
| JP | 2012-253624 A | 12/2012 |

OTHER PUBLICATIONS

International Search Report prepared by the European Patent Office dated Nov. 13, 2017, for European Patent Application No. 15758339.4, 14 pages.

Official Action (with English translation) for Chinese Patent Application No. 201580010326.5, dated Nov. 1, 2018, 23 pages.

International Search Report prepared by the Japan Patent Office dated Apr. 1, 2015, for International Application No. PCT/JP2015/055140.

* cited by examiner

IMAGE PICKUP ELEMENT, CONTROL METHOD, AND IMAGE PICKUP DEVICE

CROSS REFERENCE TO RELATED APPLICATIONS

This application is a national stage application under 35 U.S.C. 371 and claims the benefit of PCT Application No. PCT/JP2015/055140 having an international filing date of 24 Feb. 2015, which designated the United States, which PCT application claimed the benefit of Japanese Patent Application No. 2014-044036 filed 6 Mar. 2014, the disclosure of which are incorporated herein by reference in their entirety.

TECHNICAL FIELD

The present technology relates to an image pickup element, a control method, and an image pickup device, and specifically, to an image pickup element, a control method, and an image pickup device which can realize easier and more diversified data output.

BACKGROUND ART

Traditionally, in an image pickup element such as a complementary metal oxide semiconductor (CMOS) image sensor, a plurality of A/D converters (analog digital converter (ADC)) is connected to each output line connected to pixels in each column. The image pickup element has realized data reading at a higher speed by using the plurality of ADCs (for example, refer to Patent Document 1).

Also, there has been an image pickup element, in which a plurality of comparators and counters are mounted to each output line and a voltage of a D/A converter (digital analog converter (DAC)) is shifted by an optional value, which reads a high bit precision signal at a high speed (for example, refer to Patent Document 2).

In addition, there has been an image pickup element which reduces noise and improves a dynamic range by performing A/D conversion twice to a reading signal (for example, refer to Patent Documents 3 and 4).

CITATION LIST

Patent Document

Patent Document 1: Japanese Patent Application Laid-Open No. 2005-347932
Patent Document 2: Japanese Patent Application Laid-Open No. 2010-252140
Patent Document 3: Japanese Patent Application Laid-Open No. 2009-296423
Patent Document 4: Japanese Patent Application Laid-Open No. 2008-012482

SUMMARY OF THE INVENTION

Problems to be Solved by the Invention

However, in a case of the method described in Patent Document 1, only rapid reading can be performed. For example, it has been difficult to facilitate development to high functionality such as extension of a dynamic range and reduction of a noise.

Also, in a case of the method described in Patent Document 2, although the plurality of ADCs has been provided, the structures of the ADCs have been used to improve resolution. For example, it has been difficult to realize the reduction of the noise and reduction of power consumption.

In addition, in a case of the methods described in Patent Documents 3 and 4, a processing time has been increased, and it has been difficult to perform rapid reading.

In recent years, by improvement of information processing technology, functions of the image processing and the image pickup device have been increased and improved. According to this, output formats required for image data output from the image pickup element are diversified. However, with the traditional method, it has been difficult to cope with various data output formats as described above.

The present disclosure has been made in consideration of the above state. A purpose of the present disclosure is to realize easier and more diversified data output.

Solutions to Problems

One aspect of the present technology is an image pickup element including a pixel array which has a plurality of signal lines for transmitting a pixel signal read from a pixel allocated to each column and has pixel signal reading modes which are different from each other respectively allocated to the signal lines of each column and is connected to the pixel corresponding to the mode and a control unit which performs control to read the pixel signal from the pixel connected to the signal line corresponding to the reading mode of the pixel signal in the mode regarding each column of the pixel array and to transmit the read pixel signal via the signal line.

The control unit can perform control to read the pixel signal from the pixel at a frame rate of the mode corresponding to the pixel.

The control unit can further perform control to perform a main shutter operation and a pre-shutter operation of each column at the frame rate of the mode.

In each column, the numbers of pixels allocated to the respective signal lines can be different from each other.

A selection unit which selects the signal line corresponding to the reading mode of the pixel signal from among the plurality of signal lines in each column is further included. The control unit can perform control to make the selection unit select any one of the signal lines for each column and to read the pixel signal from the pixel connected to the signal line selected by the selection unit in the mode and to transmit the read pixel signal via the signal line selected by the selection unit.

The control unit can perform control to make the selection unit sequentially switch the signal line to be selected and read the pixel signals of a plurality of modes in time series.

A dummy pixel corresponding to the mode corresponding to the signal line is connected to each of the plurality of signal lines of each column of the pixel array, and the control unit can perform control to read the pixel signal from the dummy pixel connected to the signal line corresponding to the reading mode of the pixel signal in the mode regarding each column of the pixel array.

In addition, the control unit can perform control to perform a shutter operation of the dummy pixel in the mode.

An A/D converter which performs A/D conversion to the pixel signal transmitted via the signal line in each column of the pixel array can be further included.

A selection unit which selects a signal line corresponding to a reading mode of the pixel signal from among the plurality of signal lines in each column of the pixel array can be further included, and the A/D converter can perform A/D conversion to the pixel signal read from the pixel connected to the signal line selected by the selection unit.

The plurality of A/D converters is provided relative to each column of the pixel array, and the selection unit can further select the A/D converter used for performing the A/D conversion to the pixel signal.

The control unit can perform control to make the selection unit select the plurality of signal lines and A/D converters for each column of the pixel array and to read the pixel signals in the mode from the pixels connected to the respective signal lines selected by the selection unit in parallel between the signal lines for each column of the pixel array.

An exposure time of each pixel can be set for each mode corresponding to the signal line connected to the pixel.

Also, one aspect of the present technology is a control method which includes reading a pixel signal in a mode from a pixel connected to a signal line corresponding to a reading mode of the pixel signal regarding each column of a pixel array connected to the pixel corresponding to the mode in which a plurality of signal lines for transmitting the pixel signal read from the pixel is allocated to each column and pixel signal reading modes different from each other are allocated to the respective signal lines of each column and transmitting the read pixel signal via the signal line.

One aspect of the present technology is an image pickup device including an imaging unit which images an object and an image processing unit which performs image processing to image data imaged by the imaging unit. The imaging unit has a plurality of signal lines for transmitting a pixel signal read from a pixel allocated to each column and have pixel signal reading modes which are different from each other respectively allocated to the signal lines of each column and be connected to the pixel corresponding to the mode and a control unit performs control to read the pixel signal from the pixel connected to the signal line corresponding to the reading mode of the pixel signal in the mode regarding each column of the pixel array and to transmit the read pixel signal via the signal line.

Another aspect of the present technology is an image pickup element including a pixel array which has a plurality of signal lines, which transmits a pixel signal read from a pixel, allocated to each column and has the pixel of each column connected to one of signal lines allocated to each column, a plurality of A/D converters which performs A/D conversion to the pixel signals transmitted via the signal lines different from each other of each column of the pixel array, and a plurality of compressors which compresses the pixel signals to which A/D conversion is respectively performed by the A/D converters different from each other, and a control unit which performs control to read the pixel signals in parallel from the plurality of lines of pixels allocated to the signal lines different from each other for each column of the pixel array, to transmit the plurality of lines of pixel signals read from the plurality of lines of pixels by using the signal lines corresponding to the pixels in parallel, to perform A/D conversion in parallel to the plurality of lines of pixel signals transmitted by using the plurality of signal lines by using the plurality of A/D converters, and to compress the pixel signal of the lines different from each other to which A/D conversion is performed by the different A/D converters by using the plurality of compressors in parallel.

The plurality of compressors can compress the pixel signal of each line so that the data size of the compressed pixel signals of the plurality of lines is equal to or smaller than the size which can be transmitted within a single unit period.

The control unit can read image signals for each two lines, and the plurality of compressors can compress the pixel signal of each line so that the data size of the pixel signal becomes half.

The compressor can compress the pixel signal at a predetermined bit.

A plurality of signal processing units which performs predetermined signal processing in parallel to the respective pixel signals of the different lines to which the A/D conversion is performed by the different A/D converters is further included, and the plurality of compressors can compress the pixel signals of the lines different from each other in parallel to which the signal processing is performed by the plurality of different signal processing units.

Also, still another aspect of the present technology is a control method including reading pixel signals in parallel from a plurality of lines of pixels allocated to the different signal lines of each column of a pixel array in which a plurality of signal lines for transmitting the pixel signal read from the pixel is allocated to each column and the pixel of each column is connected to one of the plurality of signal lines allocated to the column, transmitting the plurality of lines of pixel signals read from the plurality of lines of pixels in parallel by using the signal line corresponding to each pixel, performing A/D conversion in parallel to the plurality of lines of pixel signals transmitted by using the plurality of signal lines, and compressing the pixel signals of the different lines, to which A/D conversion has been performed, in parallel.

Also, yet another aspect of the present technology is an image pickup device including an imaging unit which images an object, and an image processing unit which performs image processing to image data imaged by the imaging unit. The imaging unit includes a pixel array which has a plurality of signal lines, which transmits a pixel signal read from a pixel, allocated to each column and has the pixel of each column connected to one of signal lines allocated to each column, a plurality of A/D converters which performs A/D conversion to the pixel signals transmitted via the signal lines different from each other of each column of the pixel array, a plurality of compressors which compresses the pixel signals to which A/D conversion is respectively performed by the A/D converters different from each other, and a control unit which performs control to read the pixel signals in parallel from the plurality of lines of pixels allocated to the signal lines different from each other for each column of the pixel array, to transmit the plurality of lines of pixel signals read from the plurality of lines of pixels by using the signal lines corresponding to the pixels in parallel, to perform A/D conversion in parallel to the plurality of lines of pixel signals transmitted by using the plurality of signal lines by using the plurality of A/D converters, and to compress the pixel signal of the lines different from each other to which A/D conversion is performed by the different A/D converters by using the plurality of compressors in parallel.

Still yet another present technology is an image pickup element including a pixel array, a plurality of A/D converters which is allocated to each column of the pixel array and performs A/D conversion to a pixel signal read from a pixel of the column, a plurality of latches which is allocated to each A/D converter and stores the pixel signal to which A/D conversion has been performed by the A/D converter, and a control unit which performs control to read the pixel signal from the pixel of the line to be processed in each column of the pixel array, to perform A/D conversion to the pixel signal read from the pixel by using the A/D converter allocated to the column, to store the pixel signals to which A/D conversion has been performed by the A/D converter to one of or all the plurality of latches corresponding to the A/D converter according to a reading mode of the pixel signal, and to read the pixel signals stored in one of or all the plurality of latches according to the mode.

A calculation unit which adds or subtracts the pixel signals read from the plurality of latches is further included, and the control unit can perform control to add or subtract the pixel signals read from the plurality of latches according to the mode by using the calculation unit.

Also, another aspect of the present technology is a control method including reading a pixel signal from a pixel of a line to be processed of a column for each column of a pixel array, performing A/D conversion to the pixel signal read from the pixel, storing the pixel signal to which A/D conversion has been performed to one of or all of a plurality of latches according to a reading mode of the pixel signals, and reading the pixel signal stored in one of or all of the plurality of latches according to the mode.

Still another aspect of the present technology is an image pickup device including an imaging unit which images an object and an image processing unit which performs image processing to image data imaged by the imaging unit. The imaging unit includes a pixel array, a plurality of A/D converters which is allocated to each column of the pixel array and performs A/D conversion to a pixel signal read from a pixel of the column, a plurality of latches which is allocated to each A/D converter and stores the pixel signal to which A/D conversion has been performed by the A/D converter, and a control unit which performs control to read the pixel signal from the pixel of the line to be processed in each column of the pixel array, to perform A/D conversion to the pixel signal read from the pixel by using the A/D converter allocated to the column, to store the pixel signals to which A/D conversion has been performed by the A/D converter to one of or all the plurality of latches corresponding to the A/D converter according to a reading mode of the pixel signal, and to read the pixel signals stored in one of or all the plurality of latches according to the mode.

Yet another aspect of the present technology is an image pickup element including a pixel array, a plurality of A/D converters which is allocated to each column of the pixel array and performs A/D conversion to a pixel signal read from a pixel of the column by using a different ramp signal, and a control unit which performs control to set an offset of the ramp signal of each A/D converter to be a different value, to read the pixel signal from the pixel of a line to be processed in each column of the pixel array, and to perform A/D conversion to the pixel signal read from the pixel by using the plurality of A/D converters allocated to the column.

The control unit can set the offset of the ramp signal of each A/D converter according to an inclination of the ramp signal.

The control unit can set a difference between the offsets of the ramp signals of the respective A/D converters to be small when the inclination of the ramp signal is large and can set the difference between the offsets of the ramp signals of the respective A/D converters to be large when the inclination of the ramp signal is small.

Still yet another aspect of the present technology is a control method including setting offsets of respective ramp signals of A/D converters, which are allocated to each column of a pixel array and performs A/D conversion to pixel signals read from pixels of the column by using different ramp signals, to be values different from each other, reading the pixel signal from the pixel of the line to be processed in each column of the pixel array, and performing A/D conversion to the pixel signals read from the pixels by the plurality of A/D converters allocated to the column.

Another aspect of the present technology is an image pickup device including an imaging unit which images an object and an image processing unit which performs image processing to image data imaged by the imaging unit. The imaging unit includes a pixel array, a plurality of A/D converters which is allocated to each column of the pixel array and performs A/D conversion to a pixel signal read from a pixel of the column by using a different ramp signal, and a control unit which performs control to set an offset of the ramp signal of each A/D converter to be a different value, to read the pixel signal from the pixel of a line to be processed in each column of the pixel array, and to perform A/D conversion to the pixel signal read from the pixel by using the plurality of A/D converters allocated to the column.

In one aspect of the present technology, a plurality of signal lines for transmitting a pixel signal read from a pixel is allocated to each column, and different reading modes of the pixel signals are respectively allocated to the signal lines of each column. Regarding each column of the pixel array connected to the pixel corresponding to the mode, the pixel signal is read from the pixel connected to the signal line corresponding to the reading mode of the pixel signal in the mode, and the read pixel signal is transmitted via the signal line.

In another aspect of the present technology, pixel signals are read in parallel from a plurality of lines of pixels allocated to the different signal line of each column of a pixel array in which a plurality of signal lines for transmitting the pixel signal read from the pixel is allocated to each column and the pixel of each column is connected to one of the plurality of signal lines allocated to the column, and the plurality of lines of pixel signals read from the plurality of lines of pixels is transmitted in parallel by using the signal line corresponding to each pixel. Also, A/D conversion is performed in parallel to the plurality of lines of pixel signals transmitted by using the plurality of signal lines and the pixel signals of the different lines, to which A/D conversion has been performed, are compressed in parallel.

In still another aspect of the present technology, a pixel signal is read from a pixel of a line to be processed of a column for each column of a pixel array, and A/D conversion is performed to the pixel signal read from the pixel. Also, the pixel signal to which A/D conversion has been performed is stored to one of or all of a plurality of latches according to a reading mode of the pixel signals and the pixel signal stored in one of or all of the plurality of latches is read according to the mode.

In yet another aspect of the present technology, offsets of respective ramp signals of A/D converters, which are allocated to each column of a pixel array and performs A/D conversion to pixel signals read from pixels of the column by using different ramp signals, are set to be values different from each other, and the pixel signal is read from the pixel of the line to be processed in each column of the pixel array, and A/D conversion is performed to the pixel signals read from the pixels by the plurality of A/D converters allocated to the column.

Effects of the Invention

According to the present technology, an object can be imaged. Especially, easier and more diversified data output can be realized.

MODE FOR CARRYING OUT THE INVENTION

Embodiments of the present disclosure are described below. Note that, the description will be in the following order.

1. First embodiment (CMOS image sensor)
2. Second embodiment (CMOS image sensor)
3. Third embodiment (CMOS image sensor)
4. Fourth embodiment (CMOS image sensor)
5. Fifth embodiment (CMOS image sensor)
6. Sixth embodiment (image pickup device)

1. First Embodiment

<CMOS Image Sensor>

Figure 1:
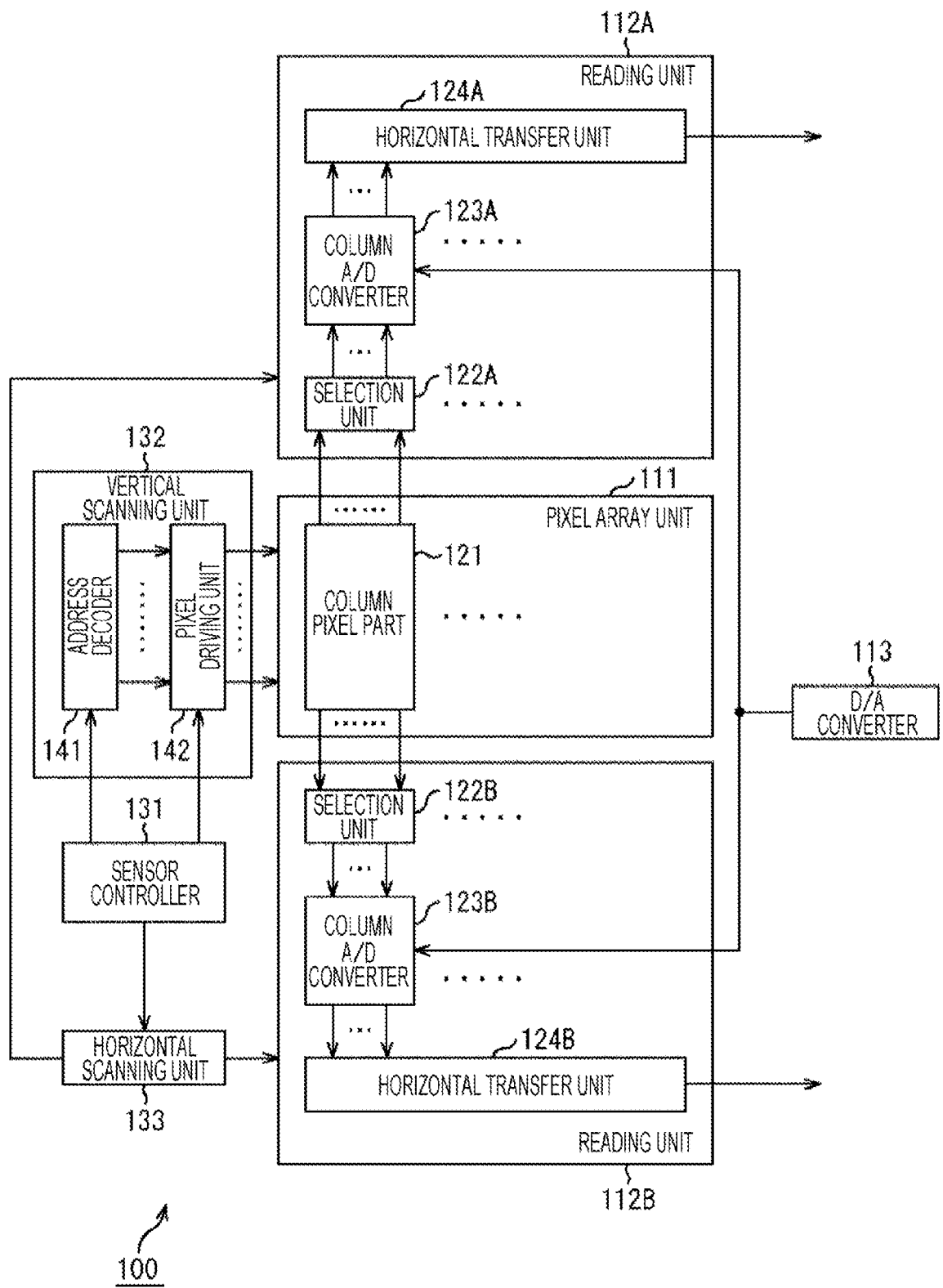
FIG. 1 is a block diagram of a primary example structure of an image sensor to which the present technology has been applied.

FIG. 1 is a block diagram of an example structure of a part of a complementary metal oxide semiconductor (CMOS) image sensor which is one embodiment of an image pickup element to which the present technology has been applied. A CMOS image sensor 100 illustrated in FIG. 1 is an image pickup element which images an object and obtains digital data of the imaged image. Note that, the CMOS image sensor is described as an example here. However, for example, the present technology can be applied to an image pickup element other than the CMOS image sensor such as a charge coupled device (CCD) image sensor.

As illustrated in FIG. 1, the CMOS image sensor 100 includes a pixel array unit 111, reading units 112A and 112B, and a D/A converter 113.

The pixel array unit 111 is a pixel region where pixel configurations (unit pixel) having a photoelectric conversion element such as a photodiode are arranged in a planar shape or a curved shape. Each unit pixel of the pixel array unit 111 receives light from the object and photoelectrically converts the incident light. Then, the unit pixel accumulates charges and outputs the charges as a pixel signal at a predetermined timing.

In the pixel array unit 111, for example, the unit pixels are arranged in a matrix (array). Regarding each unit pixel, a signal line (vertical signal line) for transferring the pixel signal is allocated to each column of the unit pixel. Also, an operation for reading the pixel signal is controlled for each line (row) of the unit pixel.

Note that, when the unit pixels can be classified (grouped) in two different directions, any form of the pixel array can be used. It is not necessary that the form is a N×M typical matrix form in which the unit pixels are arranged in two lines perpendicular to each other. That is, for example, like a honeycomb structure, it is not necessary that the lines (row) and the columns of the unit pixels are straight lines. That is, the unit pixels in each line and each column do not need to be linearly arranged, and it is not necessary to arrange the lines and columns of the unit pixels perpendicular to each other.

That is, the pixel array unit 111 includes the column pixel parts 121 which is a structure of a single column of the unit pixels, and the number of the column pixel parts 121 is the same as that of the columns of the pixel array. In FIG. 1, the structure of the single column is illustrated. However, for example, when the pixel array unit 111 includes P (P is a natural number) columns of unit pixels, the pixel array unit 111 includes P column pixel parts 121. The column pixel part 121 is described in detail below. The column pixel part 121 includes a plurality of signal lines (vertical signal line) (for example, N lines (N is a natural number of two or more) for transmitting the pixel signal read from the unit pixel of the column. That is, a plurality of (for example, N) pixel signals can be read from the column pixel part 121 in parallel.

The reading unit 112A reads the pixel signal from the pixel array unit 111 and outputs it by performing signal processing such as A/D conversion. The reading unit 112A includes a selection unit 122A and a column A/D converter 123A relative to each column (each column pixel part 121) of the pixel array unit 111. That is, the structure of the single column is illustrated in FIG. 1. However, for example, when the pixel array unit 111 includes P columns of unit pixels, the reading unit 112A includes P selection units 122A and column A/D converters 123A.

The selection unit 122A selects the signal line for supplying the pixel signal to the column A/D converter 123A from among a plurality of (for example, N) vertical signal lines of the column pixel part 121 connected to the selection unit 122A. That is, the selection unit 122A controls connection between the vertical signal line (unit pixel connected to the vertical signal line) of the column pixel part 121 and the column A/D converter 123A.

The column A/D converter 123A performs A/D conversion to the pixel signal (analog data) transmitted from the column pixel part 121 via the selection unit 122A connected to the column A/D converter 123A. The column A/D converter 123A includes a plurality of (for example, M (M is a natural number of two or more, M N) A/D converters and can perform A/D conversion to the plurality of (for example, M) pixel signals, which is transmitted via the selection unit 122A, in parallel. That is, for example, the selection unit 122A selects M vertical signal lines from N lines and can connect them to the column A/D converter 123A.

The column A/D converter 123A performs A/D conversion to the pixel signal by using the ramp signal supplied from the D/A converter 113. This is described in detail below.

The reading unit 112A further includes a horizontal transfer unit 124A. The horizontal transfer unit 124A sequentially outputs the pixel signal (digital data) output from each column A/D converter 123A, that is, the pixel signal of each column of the pixel array unit 111. For example, when the pixel array unit 111 includes P columns of unit pixels and each column A/D converter 123A includes M A/D converters, P×M pixel signals are supplied to the horizontal transfer unit 124A in parallel. The horizontal transfer unit 124A sequentially transmits the P×M pixel signals. The pixel signal output from the horizontal transfer unit 124A is supplied to, for example, a post-stage processing unit (not shown) such as a signal processing unit. The post-stage processing unit may be provided in the CMOS image sensor 100 and may be provided outside the CMOS image sensor 100.

The reading unit 112B is a processing unit similar to the reading unit 112A and has a structure similar to that of the reading unit 112A. Also, the reading unit 112B performs similar processing to the reading unit 112A. That is, the reading unit 112B includes a selection unit 122B and a column A/D converter 123B for each column of the unit pixel of the pixel array unit 111, and the reading unit 112B further includes a horizontal transfer unit 124B. The selection unit 122B is a processing unit similar to the selection unit 122A and has a structure similar to that of the selection unit 122A. The selection unit 122B performs processing similar to the selection unit 122A. The column A/D converter 123B is a processing unit similar to the column A/D converter 123A and has a structure similar to that of the column A/D converter 123A. Also, the column A/D converter 123B performs processing similar to the column A/D converter 123A. The horizontal transfer unit 124B is a processing unit similar to the horizontal transfer unit 124A and has a structure similar to that of the horizontal transfer unit 124A. Also, the horizontal transfer unit 124B performs processing similar to the horizontal transfer unit 124A.

In the following description, when it is not necessary to describe the reading units 112A and 112B as distinguishing them from each other, they are simply referred to as a reading unit 112. Similarly, when it is not necessary to describe the selection units 122A and 122B as distinguishing them from each other, they are simply referred to as a selection unit 122. Similarly, when it is not necessary to describe the column A/D converters 123A and 123B as distinguishing them from each other, they are simply referred to as a column A/D converter 123. Similarly, when it is not necessary to describe the horizontal transfer units 124A and 124B as distinguishing them from each other, they are simply referred to as a horizontal transfer unit 124.

The D/A converter 113 supplies a predetermined ramp signal to each column A/D converter 123.

As described above, in the example in FIG. 1, the CMOS image sensor 100 has two lines of paths for reading the pixel signal from the pixel array unit 111. That is, in the example in FIG. 1, the reading unit 112 includes two reading units 112, i.e., the reading unit 112A and the reading unit 112B. However, the number of paths can be optionally selected. The number may be one and three or more. That is, the reading units 112A and 112B may be configured as a single reading unit 112, and for example, the number of reading units 112 may be three or more such as the reading units 112A, 112B, 112C (not shown), and . . . .

The CMOS image sensor 100 further includes a sensor controller 131, a vertical scanning unit 132, and a horizontal scanning unit 133.

The sensor controller 131 controls an operation of each processing unit of the CMOS image sensor 100. For example, the sensor controller 131 controls the vertical scanning unit 132 and the horizontal scanning unit 133 and controls the reading of the pixel signal from the pixel array unit 111.

The sensor controller 131 controls the vertical scanning unit 132, and the vertical scanning unit 132 drives the unit pixels of each column of the pixel array unit 111 for each line and makes them read the pixel signals. The vertical scanning unit 132 includes an address decoder 141 and a pixel driving unit 142. The address decoder 141 decodes address designating information supplied from the sensor controller 131 and supplies a control signal to a structure corresponding to a designated address of the pixel driving unit 142. The pixel driving unit 142 is controlled by the sensor controller 131 and supplies the control signal to drive the unit pixel to each unit pixel of the pixel array unit 111. The pixel driving unit 142 includes a structure for supplying the control signal for each line of the pixel array. The pixel driving unit 142 supplies a control signal corresponding to a control content designated from the sensor controller 131 to the pixel array unit 111 (that is, each unit pixel of the line designated by the sensor controller 131) by using the structure designated by the address decoder 141.

The horizontal scanning unit 133 controls an operation of the reading unit 112 and makes the reading unit 112 sequentially transmit the pixel signal of each column supplied from the pixel array unit 111 to the post stage.

<Column Pixel Part>

Figure 2:
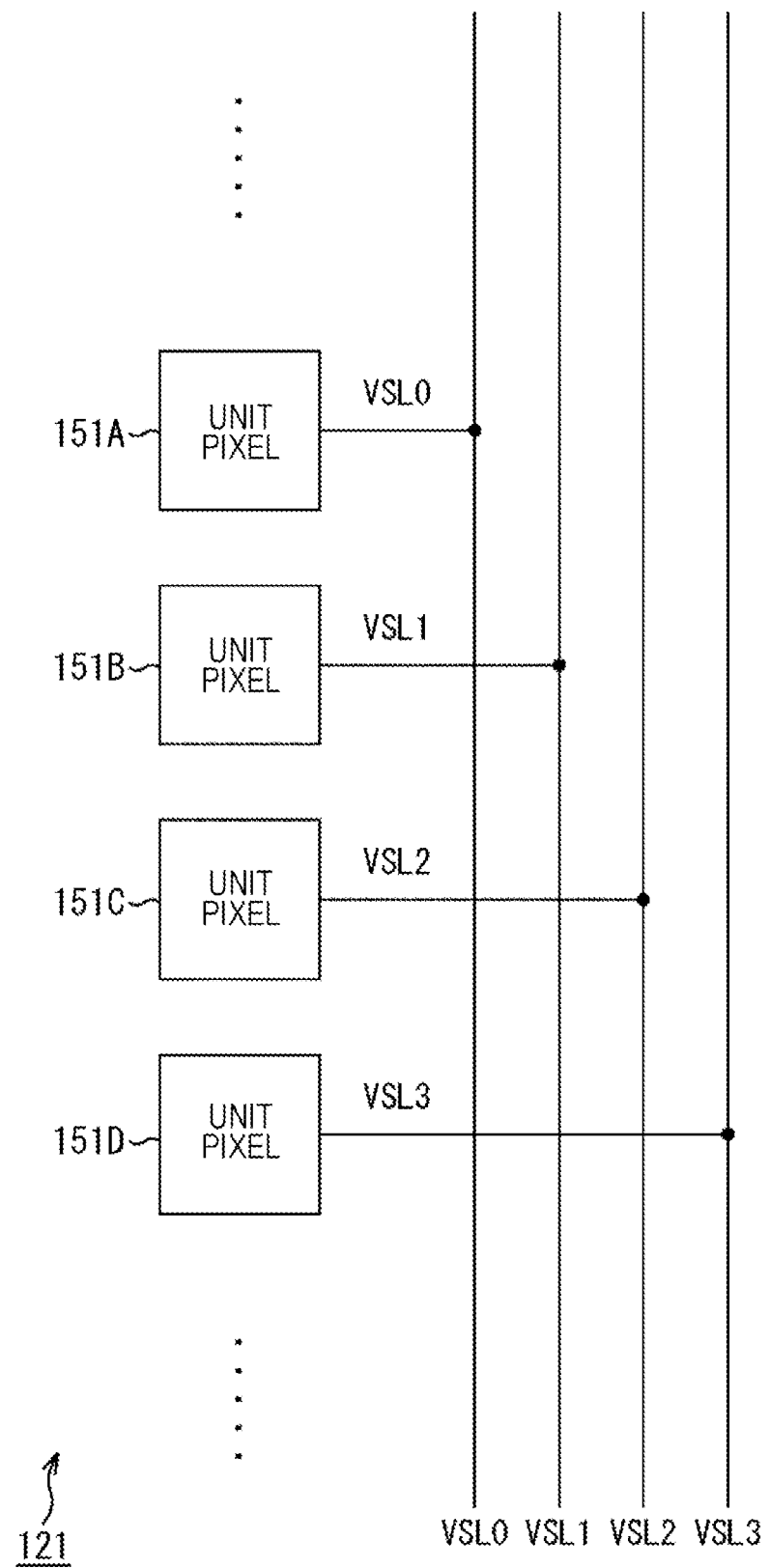
FIG. 2 is a diagram of a primary example structure of a column pixel part.

A primary example structure of the column pixel part 121 is illustrated in FIG. 2. As described above, a plurality of (for example, N (N is a natural number of two or more)) vertical signal lines is allocated to the column pixel part 121. Each unit pixel of the column pixel part 121 (that is, each unit pixel of the column of the pixel array) is connected to any one of the vertical signal lines. Also, the number of unit pixels included in the column pixel part 121 can be optionally selected.

In a case of the example in FIG. 2, four vertical signal lines (VSL0, VLS1, VSL2, and VSL3) are allocated, and four unit pixels (unit pixels 151A, 151B, 151C, and 151D) are illustrated. The unit pixel 151A is connected to the vertical signal line VSL0, and the unit pixel 151B is connected to the vertical signal line VSL1. The unit pixel 151C is connected to the vertical signal line VSL2, and the unit pixel 151D is connected to the vertical signal line VSL3. When the column pixel part 121 has five or more unit pixels, the other unit pixels are similarly connected to any one of the four vertical signal lines (VSL0, VLS1, VSL2, and VSL3).

Note that, in the following description, when it is not necessary to describe the unit pixels as distinguishing them from each other, they are simply referred to as a unit pixel 151. Also, when it is not necessary to describe the vertical signal lines as distinguishing them from each other, they are simply referred to as a vertical signal line VSL.

<Unit Pixel>

Figure 3:
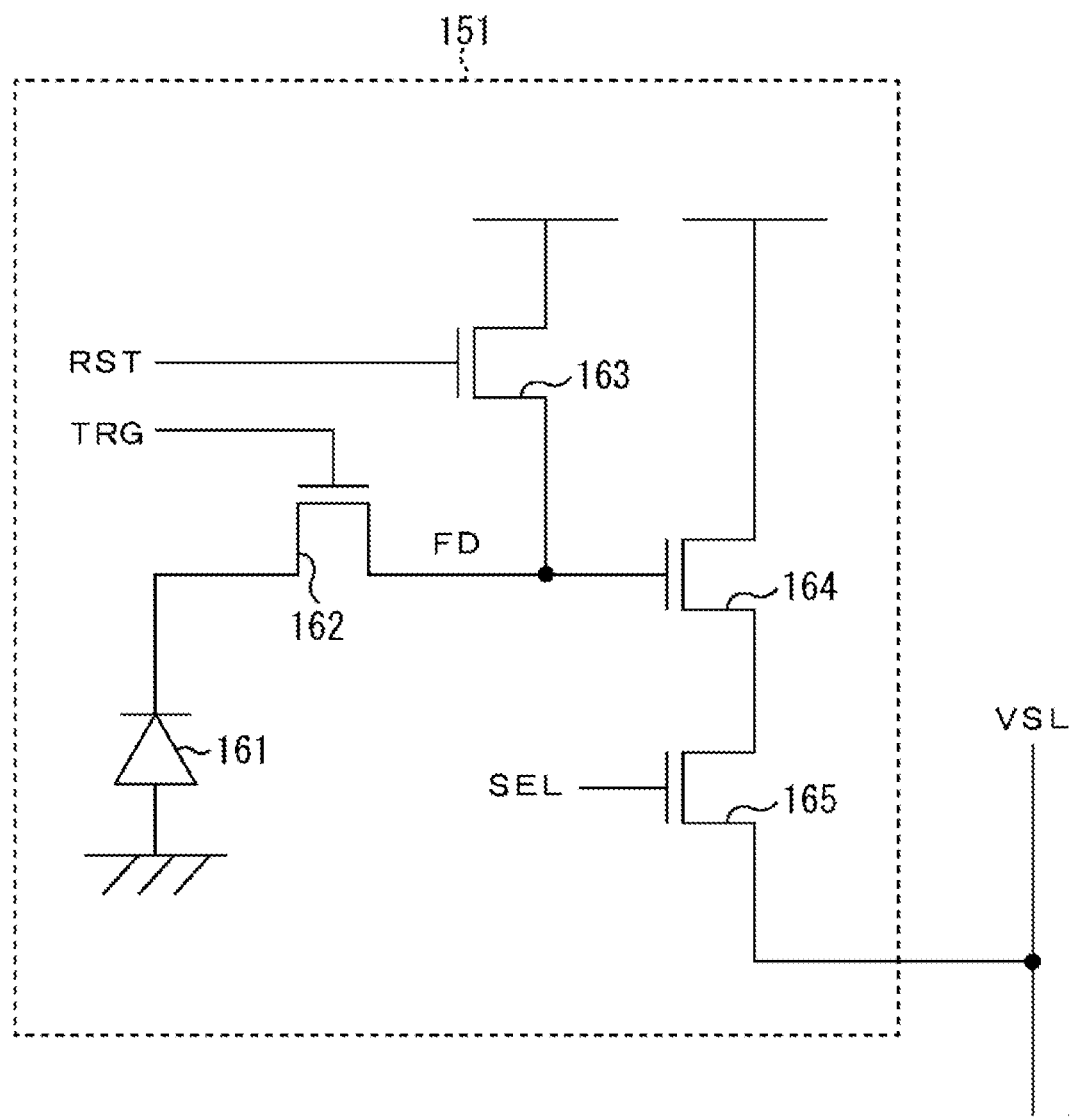
FIG. 3 is a diagram of a primary example structure of a unit pixel.

A primary example structure of the unit pixel 151 is illustrated in FIG. 3. As illustrated in FIG. 3, the unit pixel 151 includes a photodiode 161, a reading transistor 162, a reset transistor 163, an amplifier transistor 164, and a select transistor 165.

The photodiode (PD) 161 photoelectrically converts the received light into photoelectric charges (here, photoelectron) of the charge amount according to the light intensity and accumulates the photoelectric charges. An anode electrode of the photodiode 161 is connected to the ground (pixel ground) of the pixel region, and a cathode electrode is connected to a floating diffusion (FD) via the reading transistor 162.

The reading transistor 162 controls reading of the photoelectric charges from the photodiode 161. A drain electrode of the reading transistor 162 is connected to the floating diffusion, and a source electrode is connected to the cathode electrode of the photodiode 161. Also, a control signal TRG is supplied from the pixel driving unit 142 to a gate electrode of the reading transistor 162. When the control signal TRG (that is, gate potential of reading transistor 162) is in an off-state, the photoelectric charges are not read from the photodiode 161 (photoelectric charges are accumulated in photodiode 161). When the control signal TRG (that is, gate potential of reading transistor 162) is in an on-state, the photoelectric charges accumulated in the photodiode 161 are read and supplied to the floating diffusion (FD).

The reset transistor 163 resets the potential of the floating diffusion (FD). A drain electrode of the reset transistor 163 is connected to a power supply potential, and a source electrode is connected to the floating diffusion (FD). Also, the pixel driving unit 142 supplies the control signal RST to a gate electrode of the reset transistor 163. When the control signal RST (that is, gate potential of reset transistor 163) is in the off-state, the floating diffusion (FD) is separated from the power supply potential. When the control signal RST (that is, gate potential of reset transistor 163) is in the on-state, the charge of the floating diffusion (FD) is discarded to the power supply potential, and the floating diffusion (FD) is reset.

The amplifier transistor 164 amplifies a potential change of the floating diffusion (FD) and outputs it as an electrical signal (analog signal). A gate electrode of the amplifier transistor 164 is connected to the floating diffusion (FD), and a drain electrode is connected to the power supply potential. A source electrode is connected to a drain electrode of the select transistor 165. For example, the amplifier transistor 164 outputs the potential of the floating diffusion (FD) reset by the reset transistor 163 to the select transistor 165 as a reset signal (reset level). Also, the amplifier transistor 164 outputs the potential of the floating diffusion (FD) to which the photoelectric charge is transferred by the reading transistor 162 to the select transistor 165 as an optical storage signal (signal level).

The select transistor 165 controls the output of the electrical signal supplied from the amplifier transistor 164 to the vertical signal line VSL. A drain electrode of the select transistor 165 is connected to the source electrode of the amplifier transistor 164, and a source electrode is connected to the vertical signal line VSL. Also, the pixel driving unit 142 supplies a control signal SEL to the gate electrode of the select transistor 165. When the control signal SEL (that is, gate potential of select transistor 165) is in the off-state, the amplifier transistor 164 is electrically isolated from the vertical signal line VSL. Therefore, in this state, the unit pixel does not output the pixel signal. When the control signal SEL (that is, gate potential of select transistor 165) is in the on-state, the unit pixel is in a selection state. That is, the amplifier transistor 164 is electrically connected to the vertical signal line VSL, and the signal output from the amplifier transistor 164 is supplied to the vertical signal line VSL as the pixel signal of the unit pixel. That is, the pixel signal is read from the unit pixel.

<Another Example of Unit Pixel>

The structure of the unit pixel 151 can be optionally determined and is not limited to the example in FIG. 3. For example, the reading transistor 162 may be omitted. Also, the pixel number per unit pixel can be optionally selected. The pixel number may be one as in the example in FIG. 3 and may be plural.

Figure 4:
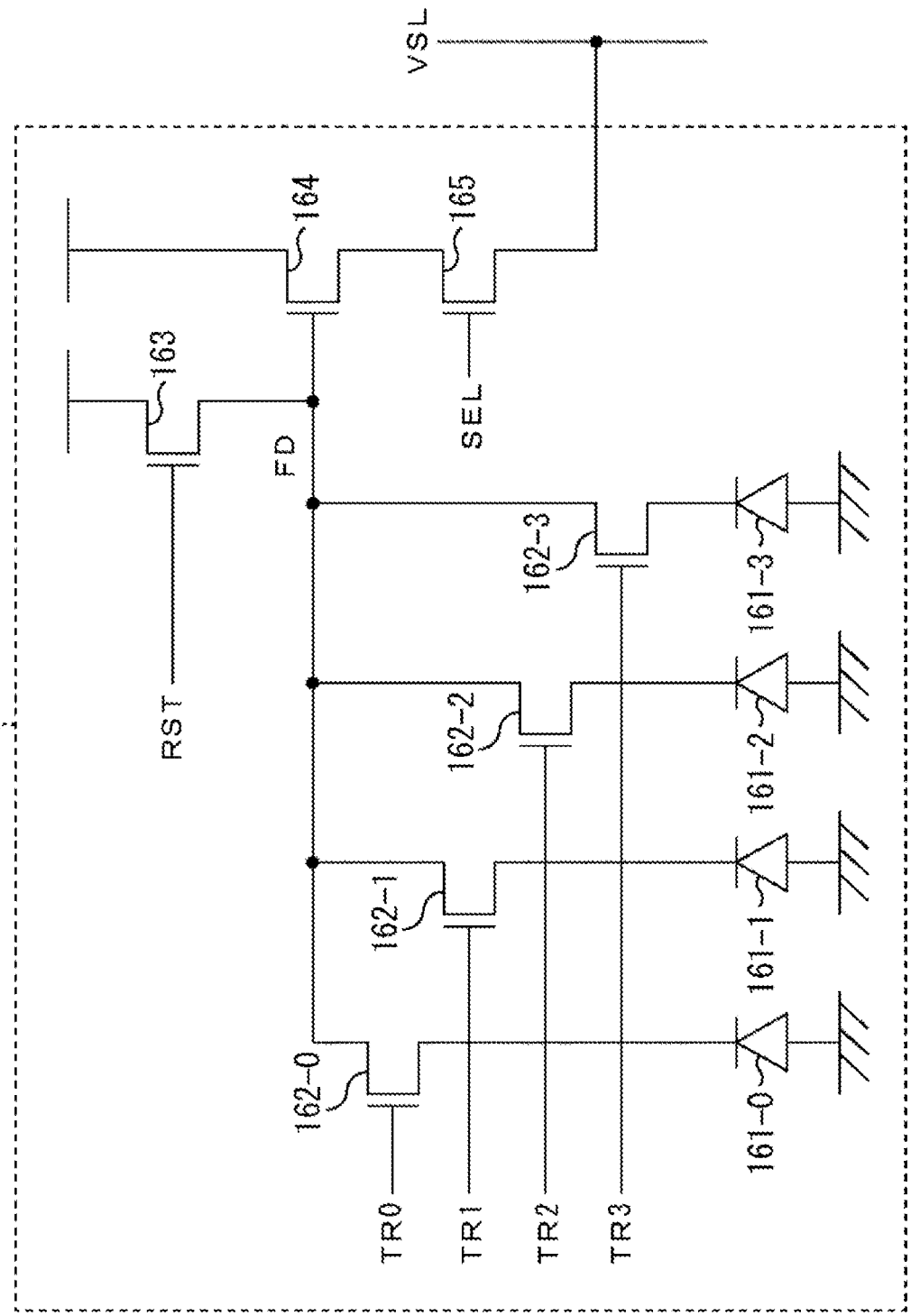
FIG. 4 is a diagram of another example structure of the unit pixel.

An example structure of a unit pixel having a plurality of pixels is illustrated in FIG. 4. In the example in FIG. 4, the unit pixel 151 has four photodiodes 161 (photodiodes 161-0, 161-1, 161-2, and 161-3). That is, in this case, the unit pixel 151 is configured of four pixels. The photodiodes 161 may have the same characteristics and may have different characteristics from each other. For example, a part of or all the photodiodes 161 may photoelectrically convert the incident light in a wavelength band different from that of the other photodiode 161. For example, it is preferable that the photodiodes 161-0 to 161-3 be arranged in two lines and two columns. It is preferable that the upper-left photodiode 161-0 mainly and photoelectrically convert a red (R) band and the upper-right photodiode 161-1 mainly and photoelectrically convert a green (GR) band. Also, it is preferable that the lower-left photodiode 161-2 mainly and photoelectrically convert a green (GB) band and the lower-right photodiode 161-3 mainly and photoelectrically convert a blue (B) band. In this way, the unit pixel 151 can form a single unit of a Bayer array.

Also, in the example in FIG. 4, the unit pixel 151 has four reading transistors 162 (reading transistors 162-0, 162-1, 162-2, and 162-3). The reading transistor 162-0 controls the reading of the photoelectric charge from the photodiode 161-0 on the basis of the control signal TRG (TR0) supplied from the pixel driving unit 142. The reading transistor 162-1 controls the reading of the photoelectric charge from the photodiode 161-1 on the basis of the control signal TRG (TR1) supplied from the pixel driving unit 142. The reading transistor 162-2 controls the reading of the photoelectric charge from the photodiode 161-2 on the basis of the control signal TRG (TR2) supplied from the pixel driving unit 142. The reading transistor 162-3 controls the reading of the photoelectric charge from the photodiode 161-3 on the basis of the control signal TRG (TR3) supplied from the pixel driving unit 142.

In a case of the example in FIG. 4, the units such as the floating diffusion (FD), the reset transistor 163, the amplifier transistor 164, and the select transistor 165 are shared in the unit pixel. Then, the pixel signals of the respective pixels (photodiodes 161-0, 161-1, 161-2, and 161-3) are transmitted via the same vertical signal line VSL.

In the following description, the description is made with reference to the example in FIG. 4 as the structure of the unit pixel 151.

<Selection Unit>

Figure 5:
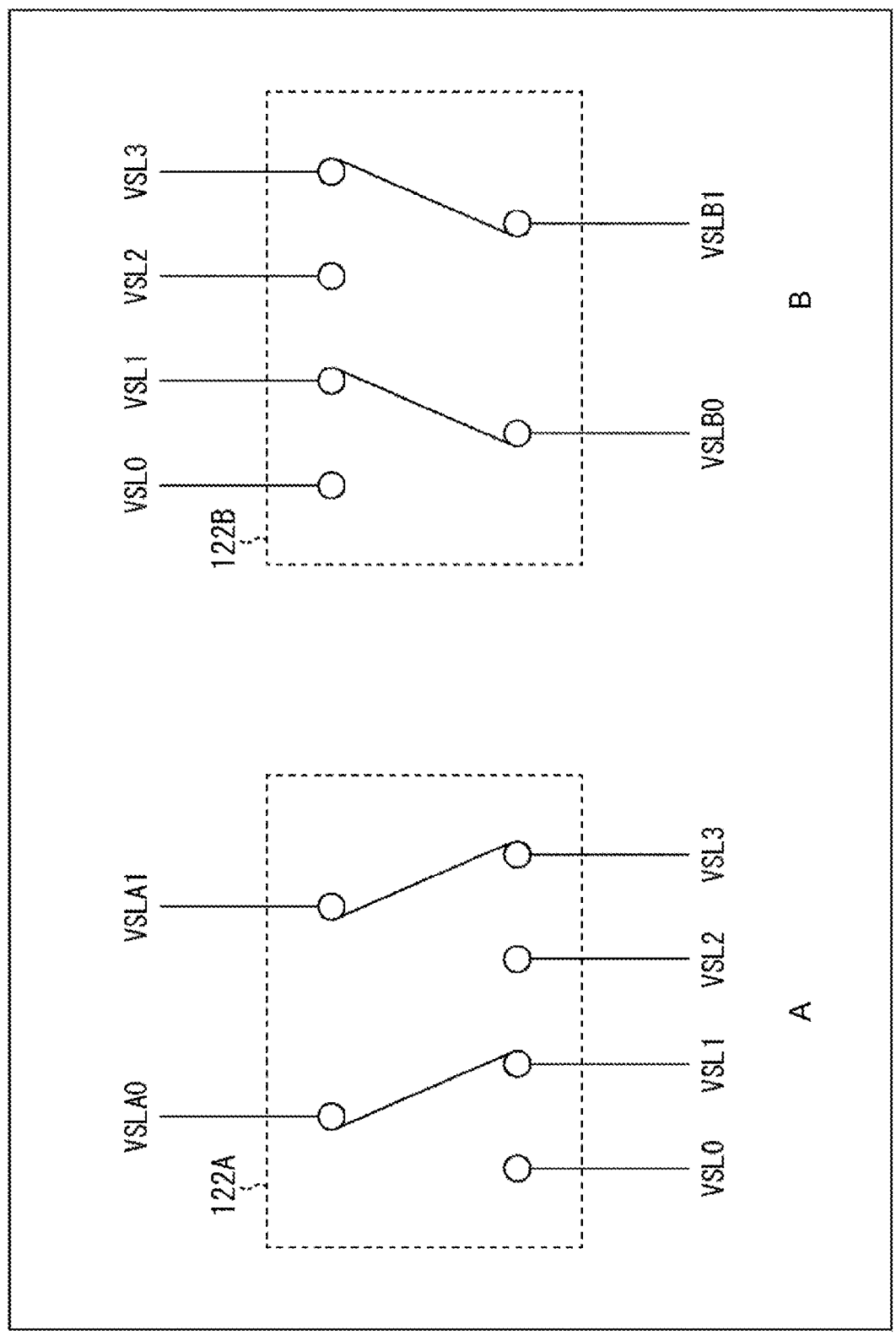
FIG. 5 is a diagram of primary example structure of a selection unit.

FIG. 5 is a diagram of primary example structure of the selection unit 122. A of FIG. 5 is an example structure of the selection unit 122A. B of FIG. 5 is an example structure of the selection unit 122B. The selection unit 122 is provided for each column pixel part 121 and controls connection between N vertical signal lines of the column pixel part 121 and M A/D converters (M vertical signal lines) of the column A/D converter 123. In a case of the example in A of FIG. 5, the selection unit 122A selects two vertical signal lines from among four vertical signal lines (VSL0 to VSL3) connected to the column pixel part 121 connected to the selection unit 122A and connects them to the two vertical signal lines (VSLA0 and VSLA1) of the column A/D converter 123A.

The selection unit 122B basically has the similar structure to that of the selection unit 122A. That is, in a case of the example in B of FIG. 5, the selection unit 122B selects two vertical signal lines from among the four vertical signal lines (VSL0 to VSL3) connected to the column pixel part 121 connected to the selection unit 122B and connects them to the two vertical signal lines (VSLB0 and VSLB1) of the column A/D converter 123B.

That is, the selection unit 122 selects a vertical signal line VSL corresponding to a reading mode of the pixel signal in each column from among the plurality of vertical signal lines VSL allocated to the column. At this time, the sensor controller 131 performs control to make the selection unit 122 select one of vertical signal lines VSL for each column and to read the pixel signal from the pixel connected to the vertical signal line VSL selected by the selection unit 122 in that mode. Then, the sensor controller 131 performs control to transmit the read pixel signal via the signal line selected by the selection unit 122. Note that, the selection unit 122 may be omitted. For example, when the column A/D converter 123 includes N A/D converters which are operated in parallel, it is not necessary to provide the selection unit 122.

<Column A/D Converter>

Figure 6:
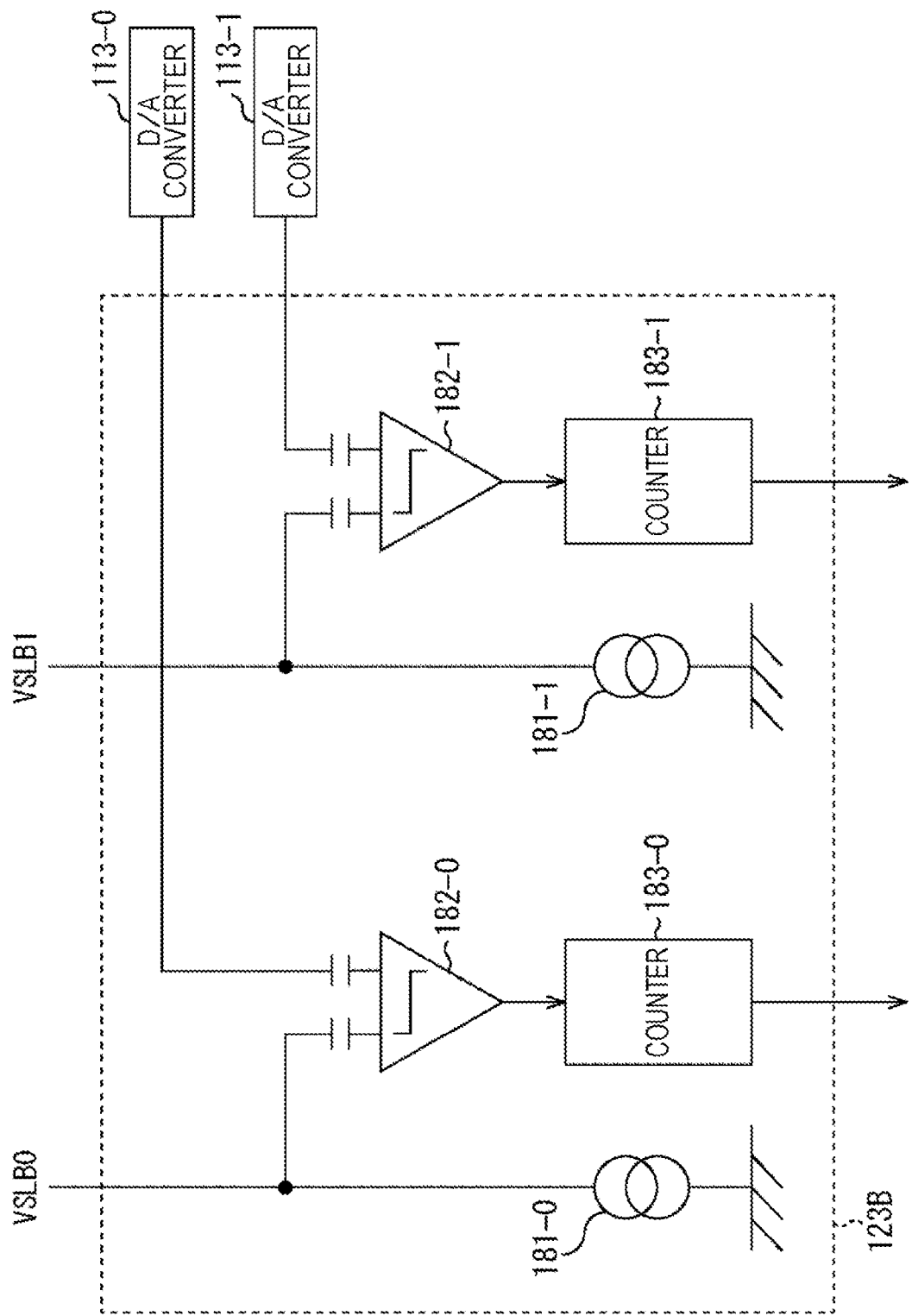
FIG. 6 is a diagram of a primary example structure of a column A/D converter.

A primary example structure of the column A/D converter 123B is illustrated in FIG. 6. As described above, the column A/D converter 123 has M A/D converters. In the example in FIG. 6, the column A/D converter 123 has two A/D converters (VSLB0 and VSLB1). Then, the column A/D converter 123B includes a current source 181-0, a comparator 182-0, and a counter 183-0 as the A/D converter of the vertical signal line VSLB0. The current source 181-0 indicates a load of a peripheral circuit connected to the vertical signal line VSLB0. The current source 181-0 is connected to the vertical signal line VSLB0 and the ground.

The D/A converter 113 supplies the ramp signal to each line of the column A/D converter 123B. In a case of the example in FIG. 6, in the column A/D converter 123B, the D/A converter 113 includes a D/A converter 113-0 which supplies the ramp signal to the A/D converter of the vertical signal line VSLB0 and a D/A converter 113-1 which supplies the ramp signal to the A/D converter of the vertical signal line VSLB1.

The comparator 182-0 compares the pixel signal with the ramp signal supplied from the D/A converter 113-0 and supplies the comparison result (information indicating the larger value) to the counter 183-0. The pixel signal is transmitted from the unit pixel 151 of the pixel array unit 111 via the vertical signal line VSL, the selection unit 122B, and the vertical signal line VSLB0.

The counter 183-0 counts a period from a count start to a time when the value of the comparison result is changed and outputs the count value to the horizontal transfer unit 124B as the digital data of the pixel signal at the time when the value of the comparison result is changed.

The column A/D converter 123B includes a current source 181-1, a comparator 182-1, and a counter 183-1 as the A/D converter of the vertical signal line VSLB1. The current source 181-1 has the similar structure as that of the current source 181-0. That is, the current source 181-1 indicates a load of a peripheral circuit connected to the vertical signal line VSLB1. The current source 181-1 is connected to the vertical signal line VSLB1 and the ground.

The comparator 182-1 has the similar structure and performs the similar processing to those of the comparator 182-0. That is, the comparator 182-1 compares the pixel signal with the ramp signal supplied from the D/A converter 113-1 and supplies the comparison result (information indicating the larger value) to the counter 183-1. The pixel signal is transmitted from the unit pixel 151 of the pixel array unit 111 via the vertical signal line VSL, the selection unit 122B, and the vertical signal line VSLB1.

The counter 183-1 has the similar structure and performs the similar processing to those of the counter 183-0. That is, the counter 183-1 counts a period from a count start to a time when the value of the comparison result is changed and outputs the count value to the horizontal transfer unit 124B as the digital data of the pixel signal at the time when the value of the comparison result is changed.

The column A/D converter 123A also has the similar structure to that of the column A/D converter 123B and performs the similar processing to the column A/D converter 123B. That is, regardless of the number of column A/D converters 123, each column A/D converter 123 has the similar structure as that in the example in FIG. 6 and performs the similar processing to that in the example in FIG. 6.

Note that, the number of A/D converters included in the column A/D converter 123 may be optionally selected. The number of A/D converters may be one and three or more. Regardless of the number of A/D converters, the D/A converter 113 separately supplies the ramp signals to each line. That is, for example, when the column A/D converter 123 has M A/D converters, the D/A converter 113 may have M independent D/A converters.

<Address Decoder>

Figure 7:
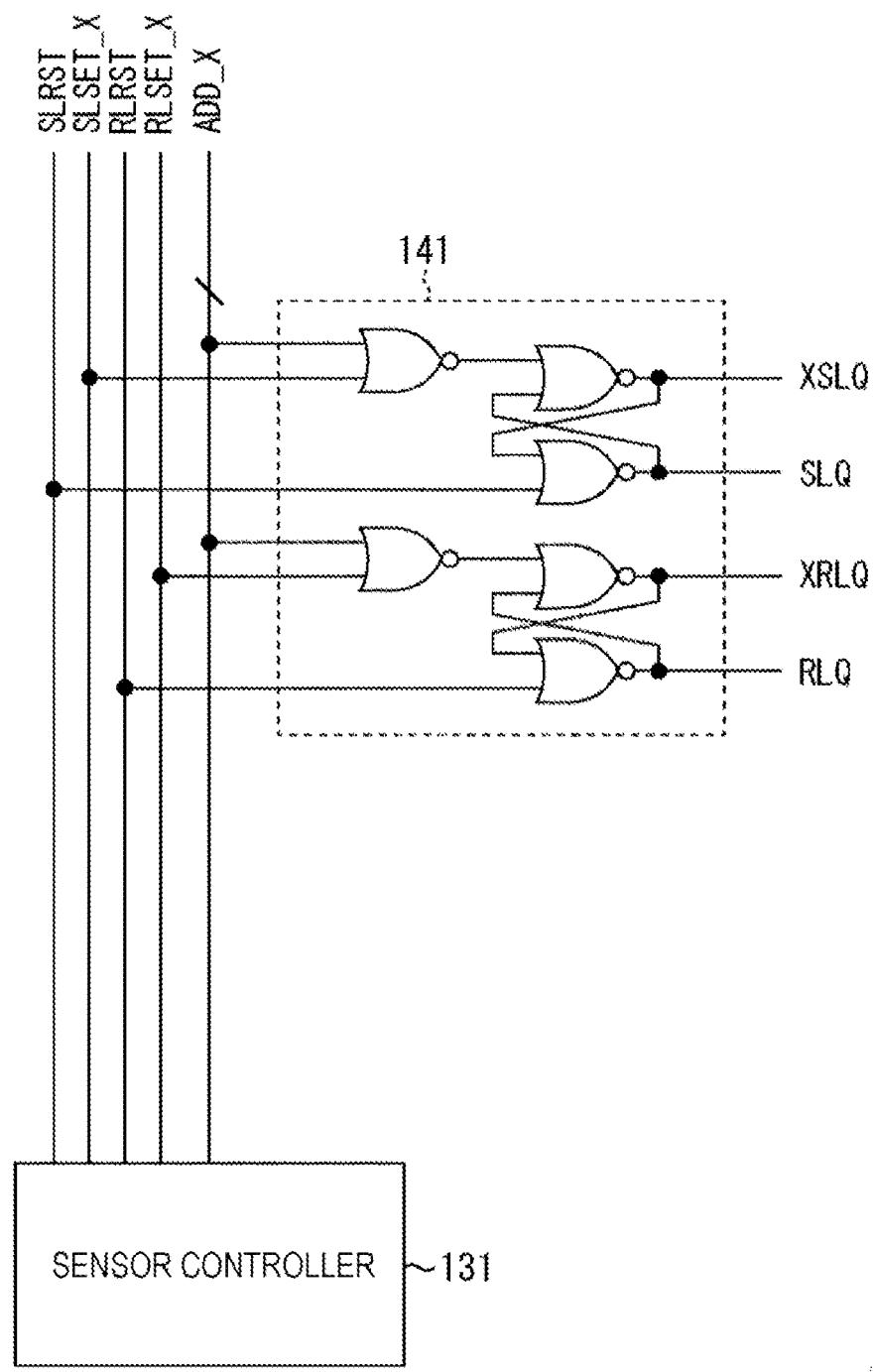
FIG. 7 is a diagram of a primary example structure of an address decoder.

A primary example structure of the address decoder 141 is illustrated in FIG. 7. The address decoder 141 includes a logic circuit having the structure illustrated in FIG. 7 for each line of the pixel array. Then, the control singles for designating an address is input from the sensor controller 131 to the address decoder 141. The control signals include an address to select the pixel (ADD_X), reading latch reset (RLRST), reading latch set (RLSET_X), electronic shutter latch reset (SLRST), and electronic shutter latch set (SLSET_X). The address decoder 141 outputs a value "H (high)" as a reading latch (RLQ) or an electronic shutter latch (SLQ) to the pixel driving unit 142 based on the input signal in the logic circuit of the line designated by the sensor controller 131. A NOT_reading latch (XRLQ) and a NOT_electronic shutter latch (XSLQ) are pulses which are obtained by setting the control signal to be a negative logic.

<Pixel Driving Unit>

Figure 8:
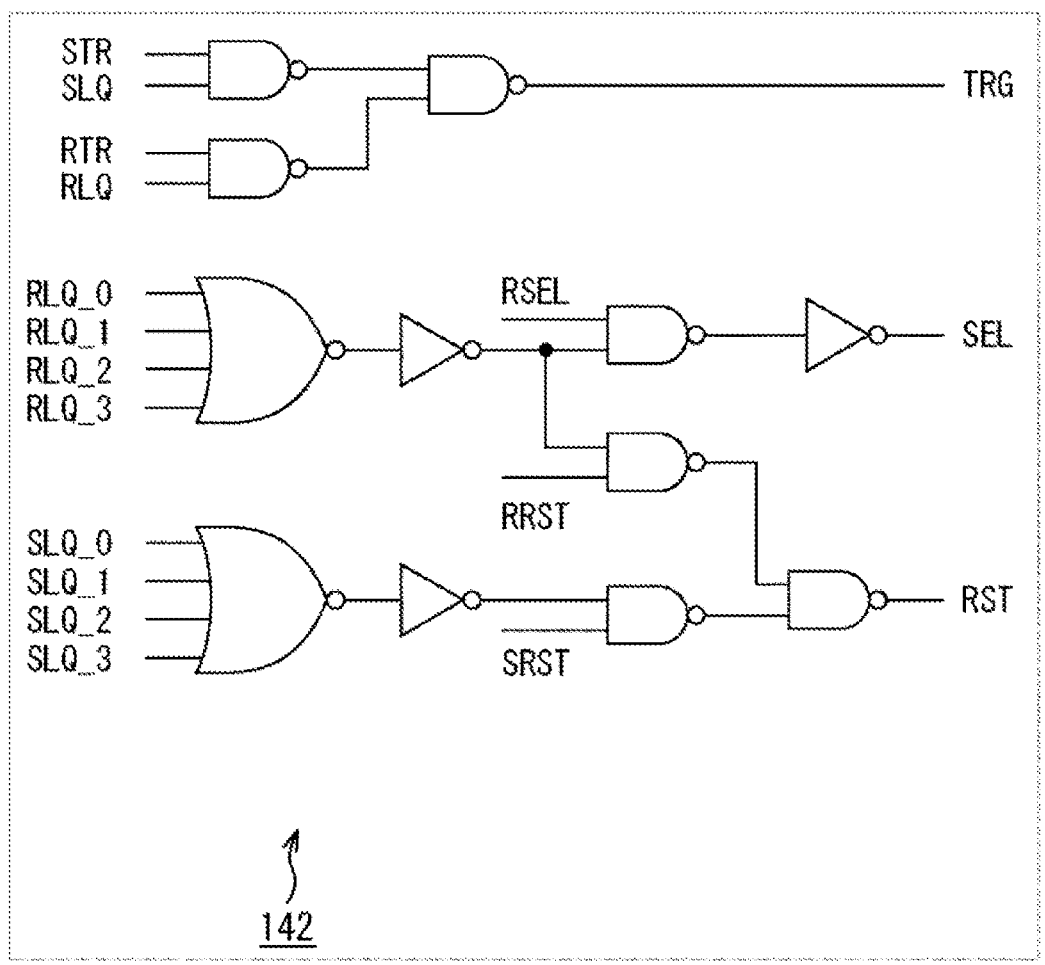
FIG. 8 is a diagram of a primary example structure of a pixel driving unit.

A primary example structure of the pixel driving unit 142 is illustrated in FIG. 8. The pixel driving unit 142 has a logic circuit having the structure illustrated in FIG. 8 for each line of the pixel array.

FIG. 8 is an equivalent circuit diagram and a timing chart of a pixel drive timing driving circuit. According to the values of the control signals such as the reading latch output pulse RLQ and the electronic shutter latch SLQ supplied from the address decoder 141, a transfer pulse at the time of reading RTR supplied from the sensor controller 131, a transfer pulse at the time of the electronic shutter STR, a reset pulse at the time of the electronic shutter SRST, a reset pulse at the time of reading RRST, and a selection pulse at the time of reading RSEL, the control signals TRG, SEL, and RST are supplied to each transistor of each unit pixel 151 of the line.

<Timing Chart>

Figure 9:
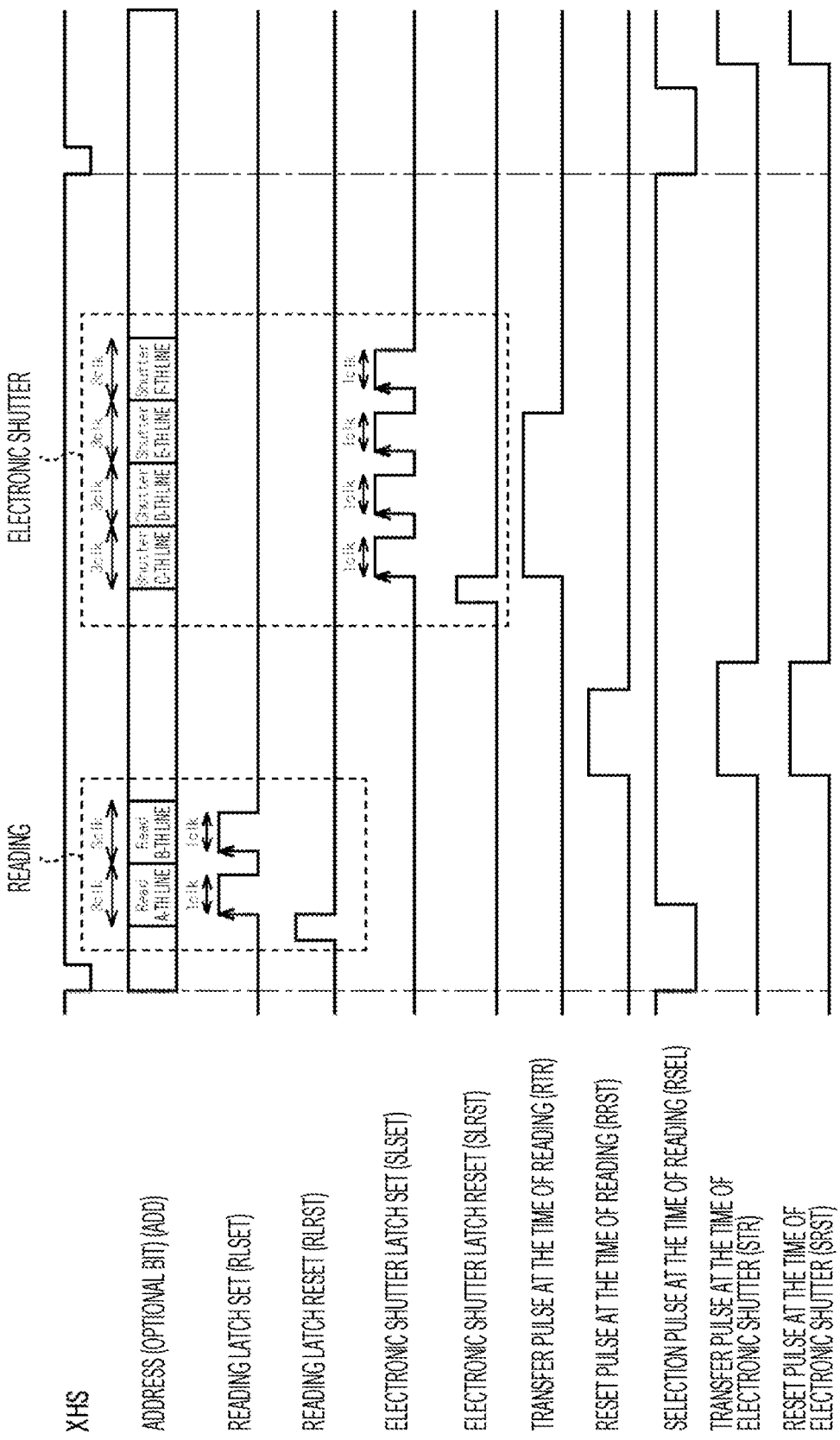
FIG. 9 is a timing chart to describe an exemplary state of pixel reading.

An exemplary timing chart of the control signals to drive the CMOS image sensor 100 is illustrated in FIG. 9. As illustrated in FIG. 9, the sensor controller 131 can drive an optional address by inputting the control signals to the address decoder 141. The control signals include an address to select the pixel (ADD), the reading latch reset (RLRST), the reading latch set (RLSET), the electronic shutter latch reset (SLRST), and the electronic shutter latch set (RLSET) of the address decoder 141.

Also, the sensor controller 131 can drive an optional address which is set to the address decoder 141 for an optional period by inputting the control signals including the transfer pulse at the time of reading (RTR), the reset pulse at the time of reading (RRST), the selection pulse at the time of reading (RSEL), the transfer pulse at the time of the electronic shutter (STR), and the reset pulse at the time of the electronic shutter (SRST) to the pixel driving unit 142.

Figure 10:
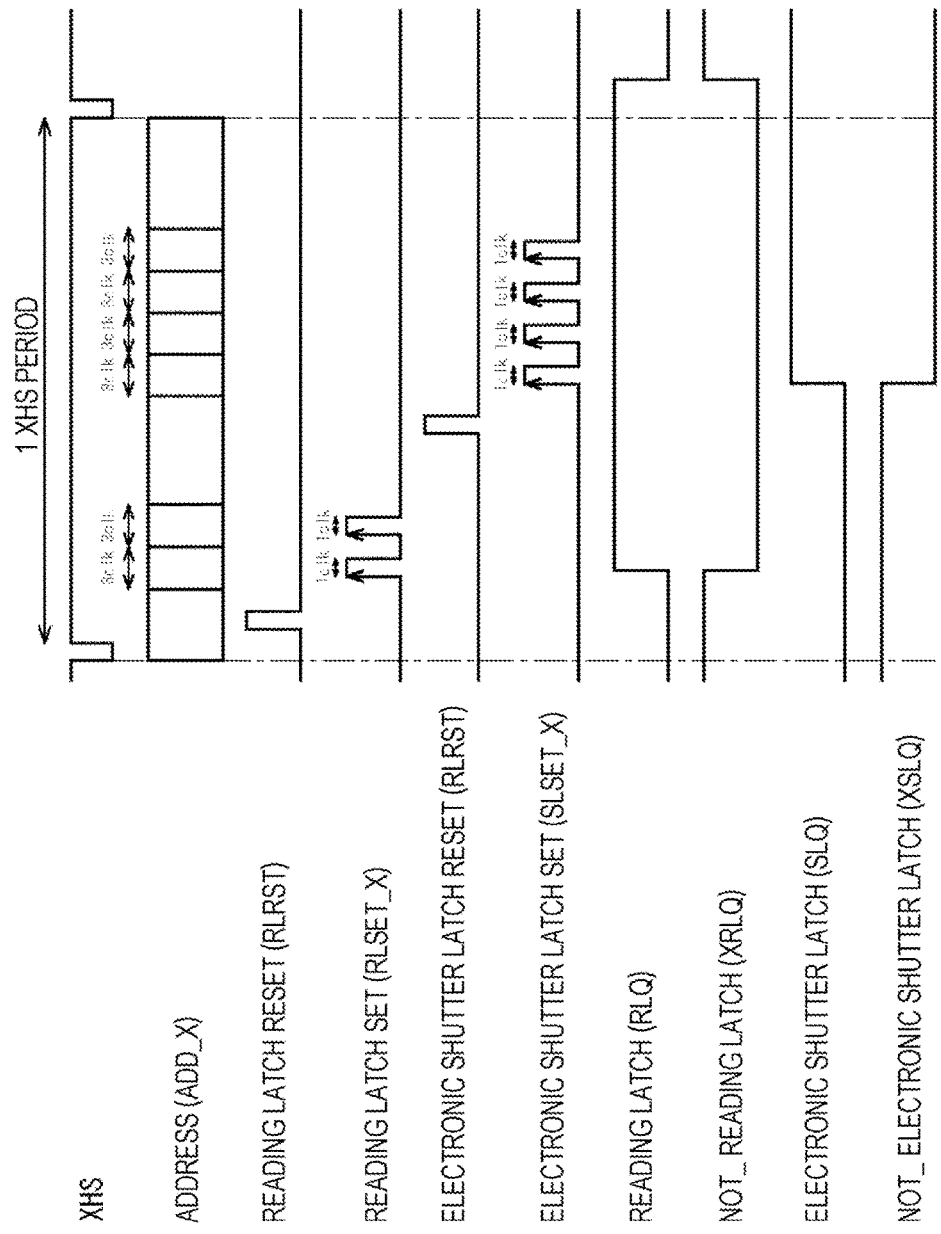
FIG. 10 is a timing chart to describe an exemplary state where the address decoder is driven.
Figure 11:
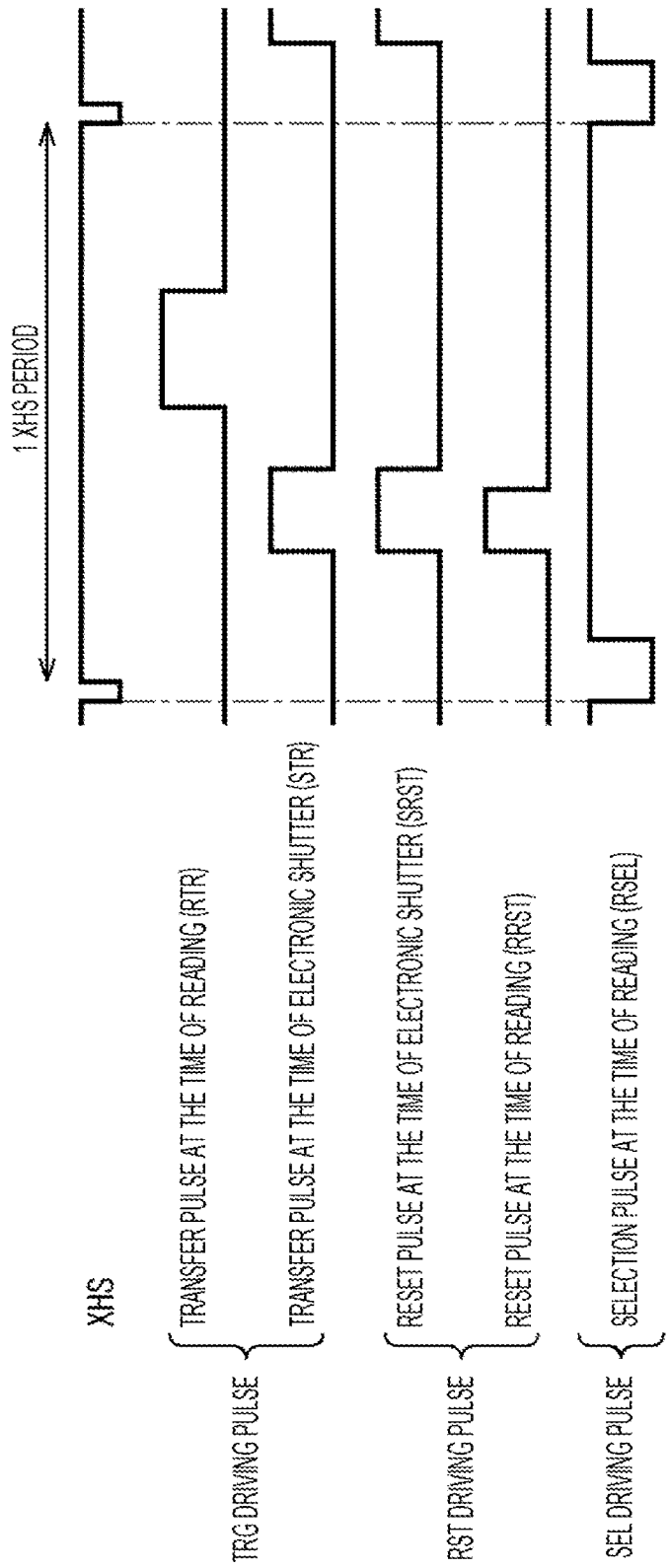
FIG. 11 is a timing chart to describe an exemplary state of unit pixel operation control.

An exemplary timing chart of the control signals output from the address decoder 141 relative to the control signals is illustrated in FIG. 10. Also, an exemplary timing chart of the control signals output from the pixel driving unit 142 is illustrated in FIG. 11.

Figure 12:
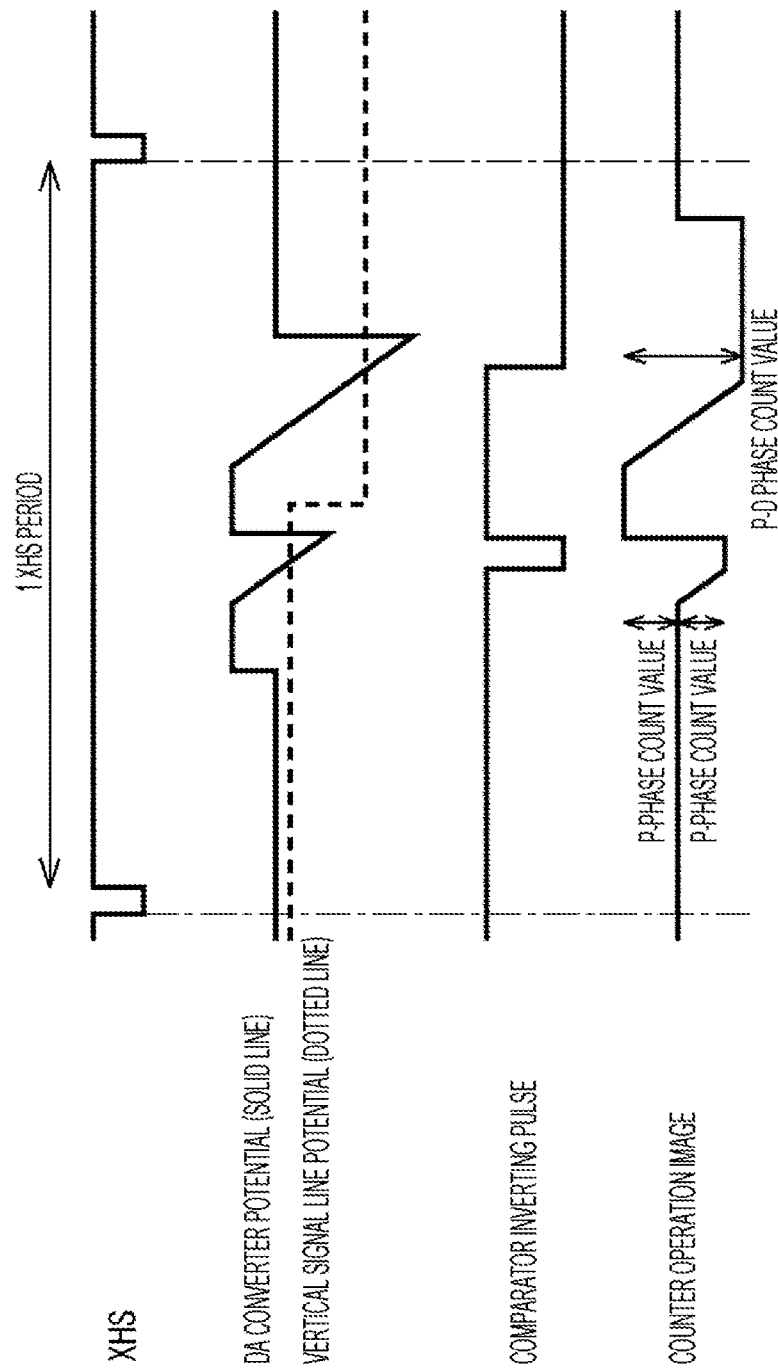
FIG. 12 is a timing chart to describe an exemplary state where an A/D converter is driven.

The pixel signal is read from each unit pixel of the pixel array on the basis of the control signals. The read pixel signal is A/D converted by each column A/D converter 123 as illustrated in a timing chart in FIG. 12.

<Reading Mode and Distribution of Vertical Signal Lines>

The CMOS image sensor 100 described above can read the pixel signal with various reading methods (reading mode) by using the plurality of vertical signal lines and the plurality of A/D converters of each column. For example, the reading mode such as two-stream reading for realizing simultaneous outputs of two lines of data, parallel reading for using all the vertical columns to perform the reading at a higher speed, and multisampling to realize improvement of the dynamic range can be realized.

However, when each vertical signal line is irregularly connected to the unit pixel, there has been a possibility that control of the reading of the pixel signal become complicated. For example, it has been necessary to designate the vertical signal line used for the pixel signal every time when the line of the unit pixel to be driven is switched (for each horizontal synchronization). Especially, when the plurality of reading modes is used in parallel, it has been necessary to change the vertical signal line to be designated for each mode, and the control has been more complicated.

The unit pixel and the vertical signal line VSL are connected to each other according to the reading mode. That is, the control is performed so that the plurality of signal lines for transmitting the pixel signal read from the pixel is allocated to each column, that a predetermined reading mode of the pixel signal is allocated to each signal line of each column, that the pixel corresponding to the mode of the column of the pixel array is connected to each signal line, that the pixel signal is read in the mode from the pixel connected to the signal line corresponding to the reading mode of the pixel signal for each column of the pixel array, and that the read pixel signal is transmitted via the signal line.

In other words, one of the vertical signal lines VSL is allocated to each reading mode, and the unit pixel to read the pixel signal in the reading mode is connected to the vertical signal line VSL. The number of vertical signal lines VSL to be allocated to the reading mode can be optionally determined. The number of vertical signal lines VSL may be a singular or plural number. Also, the allocation of the vertical signal line may be overlapped between the reading modes. For example, a single vertical signal line VSL may be allocated to the plurality of reading modes.

In this way, for example, when a certain reading mode is selected, the pixel signals can be read from all the unit pixels corresponding to the reading mode by selecting the vertical signal line according to the reading mode at first (for each vertical synchronization). Therefore, in each horizontal synchronization, a desired reading mode can be easily realized by selecting the line to be driven. When the plurality of reading modes is used in parallel, in any reading modes, it is only necessary to select the line according to the mode to control each horizontal synchronization by selecting the vertical signal line corresponding to the switched mode in the vertical synchronization.

Figure 13:
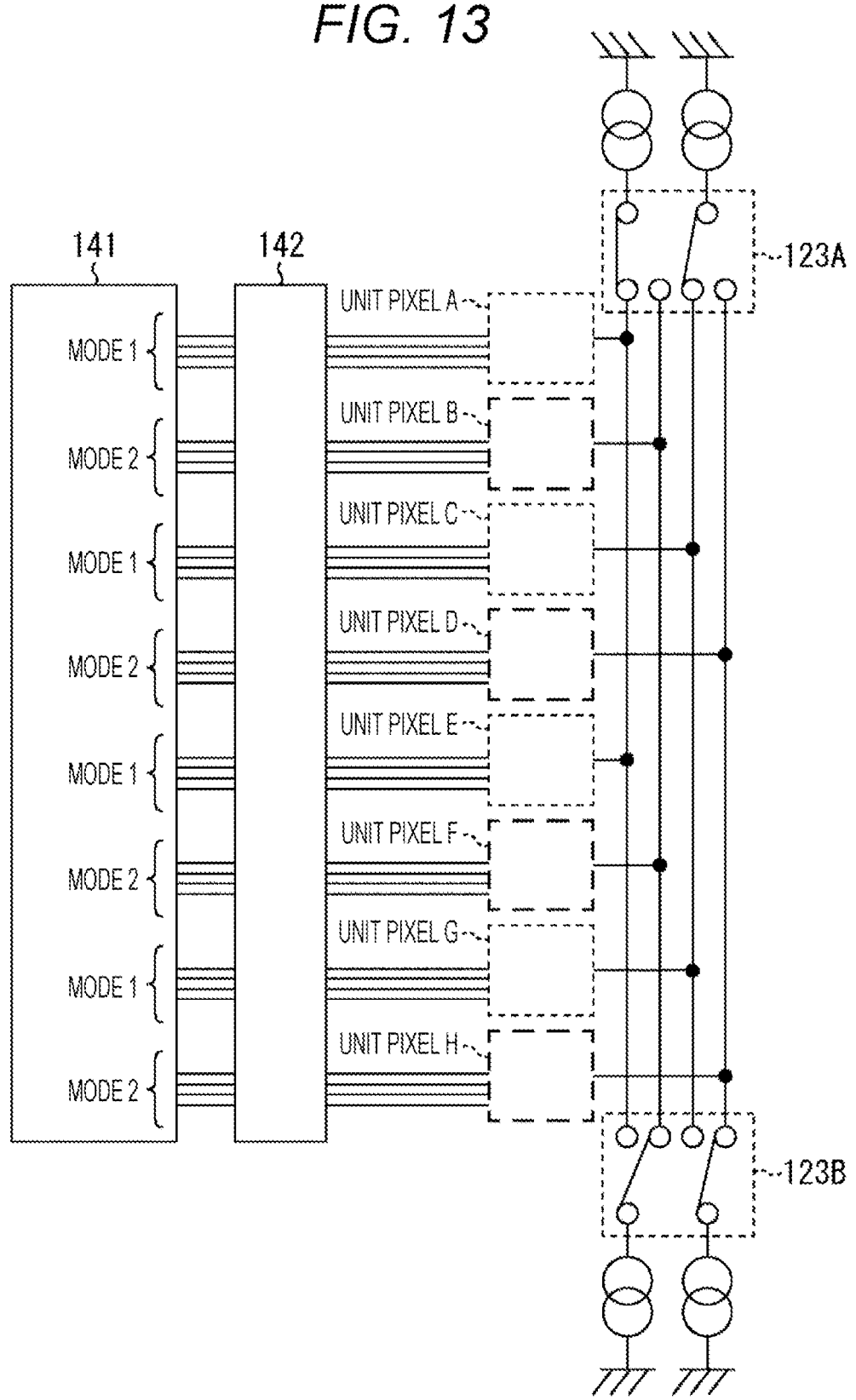
FIG. 13 is a diagram of an exemplary state of two-stream reading.

The example is illustrated in FIG. 13. In the example in FIG. 13, the pixel signals are read from unit pixels A, C, E, and G in a reading mode 1, and the pixel signals are read from unit pixels B, D, F, and H in a reading mode 2. As illustrated in FIG. 13, the unit pixels A, C, E, and G are connected to the vertical signal lines different from those of the unit pixels B, D, F, and H.

Therefore, when the pixel signal is read in the reading mode 1, it is preferable that the selection unit 122 select the vertical signal lines to which the unit pixels A, C, E, and G are connected at the beginning of the vertical synchronization. Conversely, when the pixel signal is read in the reading mode 2, it is preferable that the selection unit 122 select the vertical signal lines to which the unit pixels B, D, F, and H are connected at the beginning of the vertical synchronization. It is not necessary to switch the selection of the vertical signal line for each horizontal synchronization.

That is, easier and more diversified reading modes can be realized.

Figure 14:
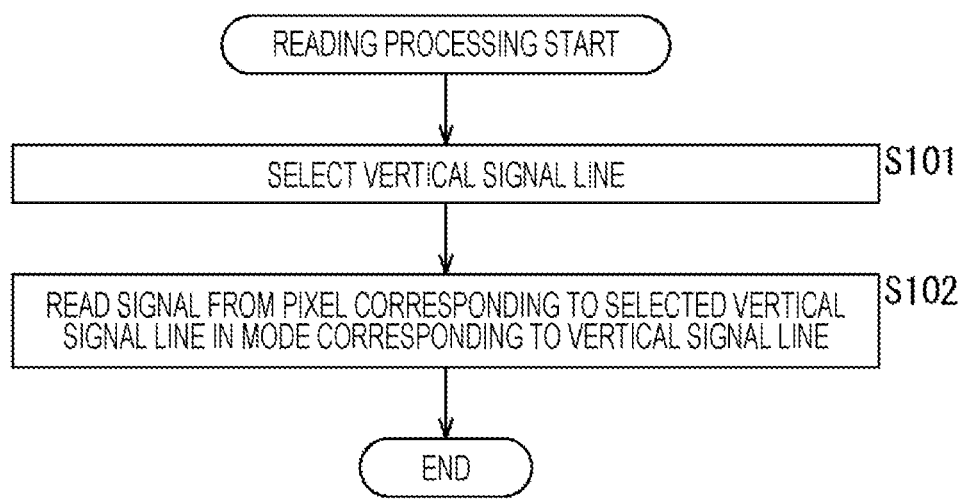
FIG. 14 is a flowchart to describe an exemplary flow of reading processing.

An exemplary flow of reading processing by the sensor controller 131 is described with reference to a flowchart in FIG. 14.

When the reading processing is started, in step S101, the sensor controller 131 controls the selection unit 122 of each column via the horizontal scanning unit 133 and selects the vertical signal line according to the reading mode for each column. The sensor controller 131 performs this processing at the beginning of the vertical synchronization when the reading is started or when the reading mode is switched.

In step S102, the sensor controller 131 reads the pixel signal in the reading mode corresponding to the vertical signal line from the unit pixel corresponding to the selected vertical signal line. That is, the sensor controller 131 controls the address decoder 141 and the pixel driving unit 142 of the vertical scanning unit 132 and selects the unit pixel corresponding to the reading mode of each column. Then, the sensor controller 131 reads the pixel signal from the unit pixel in the reading mode. The sensor controller 131 performs this processing at each horizontal synchronization.

By performing the reading processing as described above, the sensor controller 131 can realize operations of more diversified reading modes. That is, the CMOS image sensor 100 can realize easier and more diversified data output.

<Example of Reading Mode>

An exemplary reading mode which can be realized by the above CMOS image sensor 100 is described below.

Figure 15:
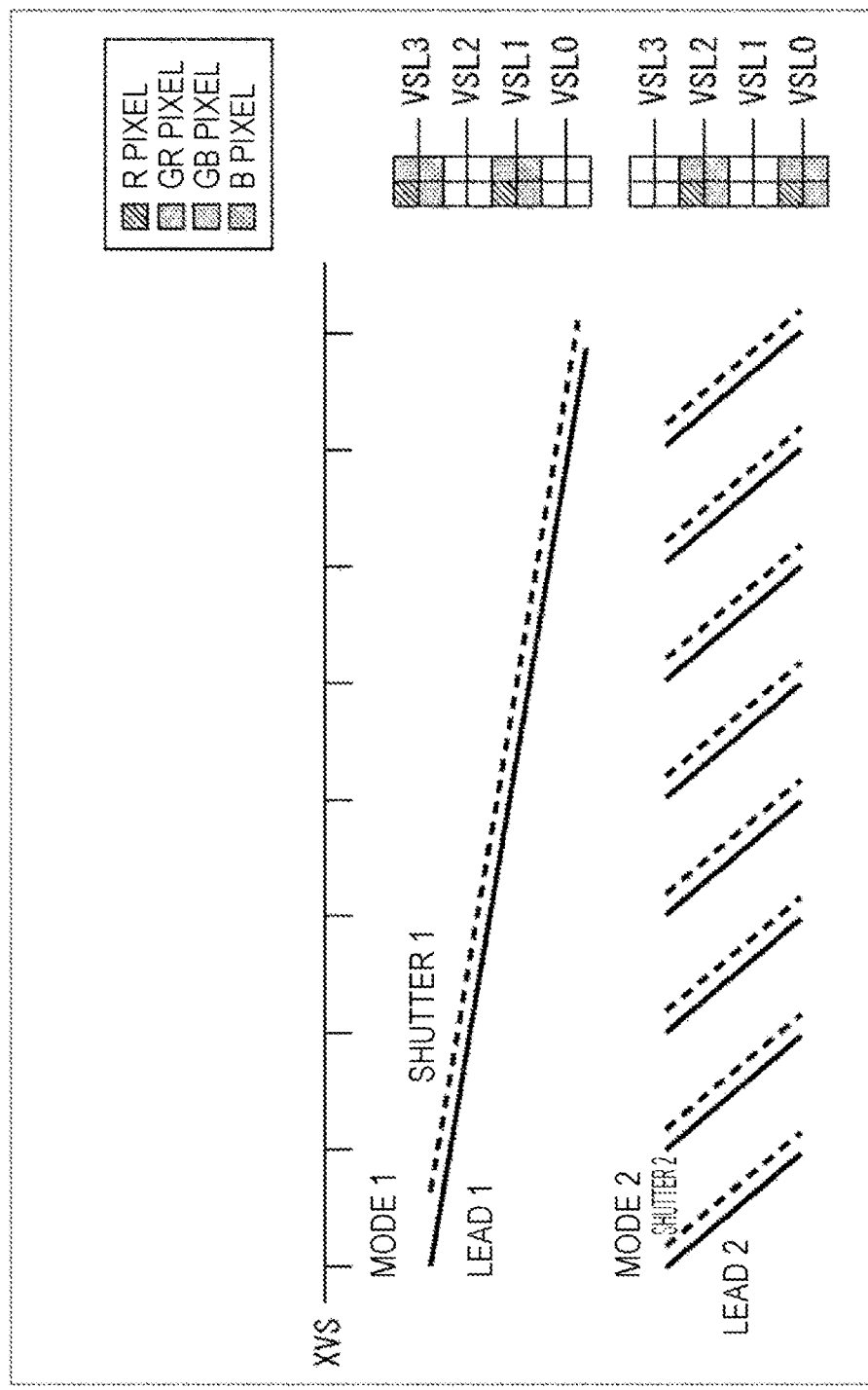
FIG. 15 is a diagram of an exemplary state of two-stream access.

An example of two-stream access (XVS unit) is illustrated in FIG. 15. In the example illustrated in FIG. 15, the pixel signals are read in two reading modes, i.e., modes 1 and 2. For example, when the mode 1 is a monitoring mode, an operation is performed at 30 fps. When the mode 2 is an AF mode, an operation is performed at 240 fps. In this way, the reading of the pixel signal from the pixel may be controlled to be performed at a frame rate of the mode corresponding to the pixel.

At this time, the vertical signal lines VSL1 and VSL3 are allocated to the mode 1, and the vertical signal lines VSL0 and VSL2 are allocated to the mode 2. Therefore, even when the pixel signals are read in the two reading modes having different frame rates from each other, since the vertical signal lines VSL are distributed to the respective reading modes, the pixels and the vertical signal lines VSL are not overlapped with each other in the reading of the pixel signals in the respective reading modes. Therefore, the CMOS image sensor 100 can more easily realize the reading in the two reading modes without affecting the image quality.

Figure 16:
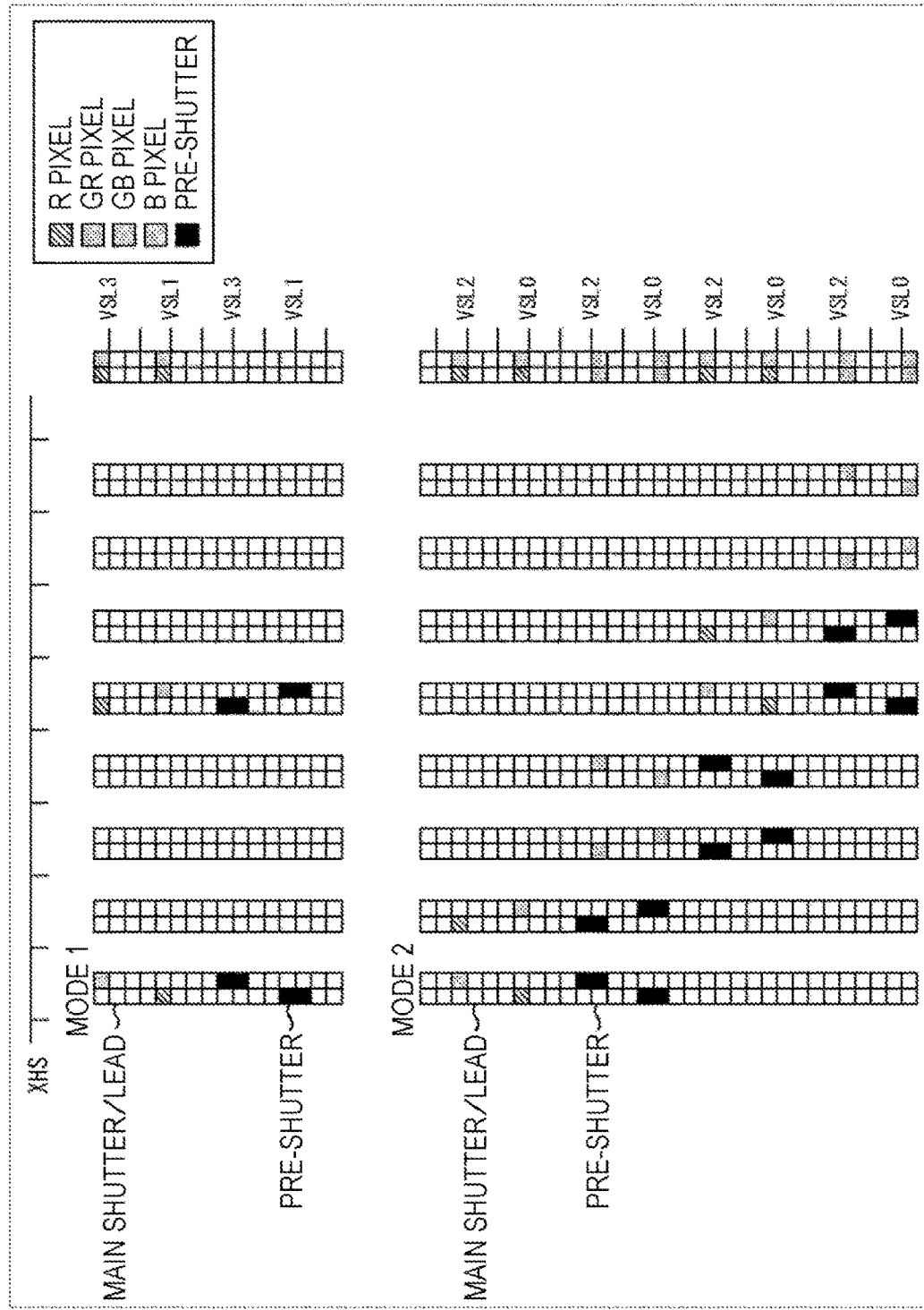
FIG. 16 is a diagram of another exemplary state of the two-stream access.

Also, a main shutter operation and a pre-shutter operation of each column may be controlled at the frame rate of the mode. An example of two-stream access (XHS unit) is illustrated in FIG. 16. Also, in the example in FIG. 16, the pixel signals are read in the two reading modes, i.e., the modes 1 and 2. Similarly to the case of FIG. 15, the mode 1 is the monitoring mode performed at 30 fps, and the mode 2 is the AF mode performed at 240 fps. Similarly to the example in FIG. 15, the vertical signal lines VSL1 and VSL3 are allocated to the mode 1, and the vertical signal lines VSL0 and VSL2 are allocated to the mode 2.

In this case, as in the example in FIG. 16, by distributing the vertical signal lines VSL to both a main shutter and lead and a pre-shutter, overlap of the pixels and the vertical signal lines VSL at the time of reading the pixel signal in each reading mode can be prevented. Therefore, an excellent image quality equal to that of the traditional CMOS image sensor can be obtained through two lines.

Figure 17:
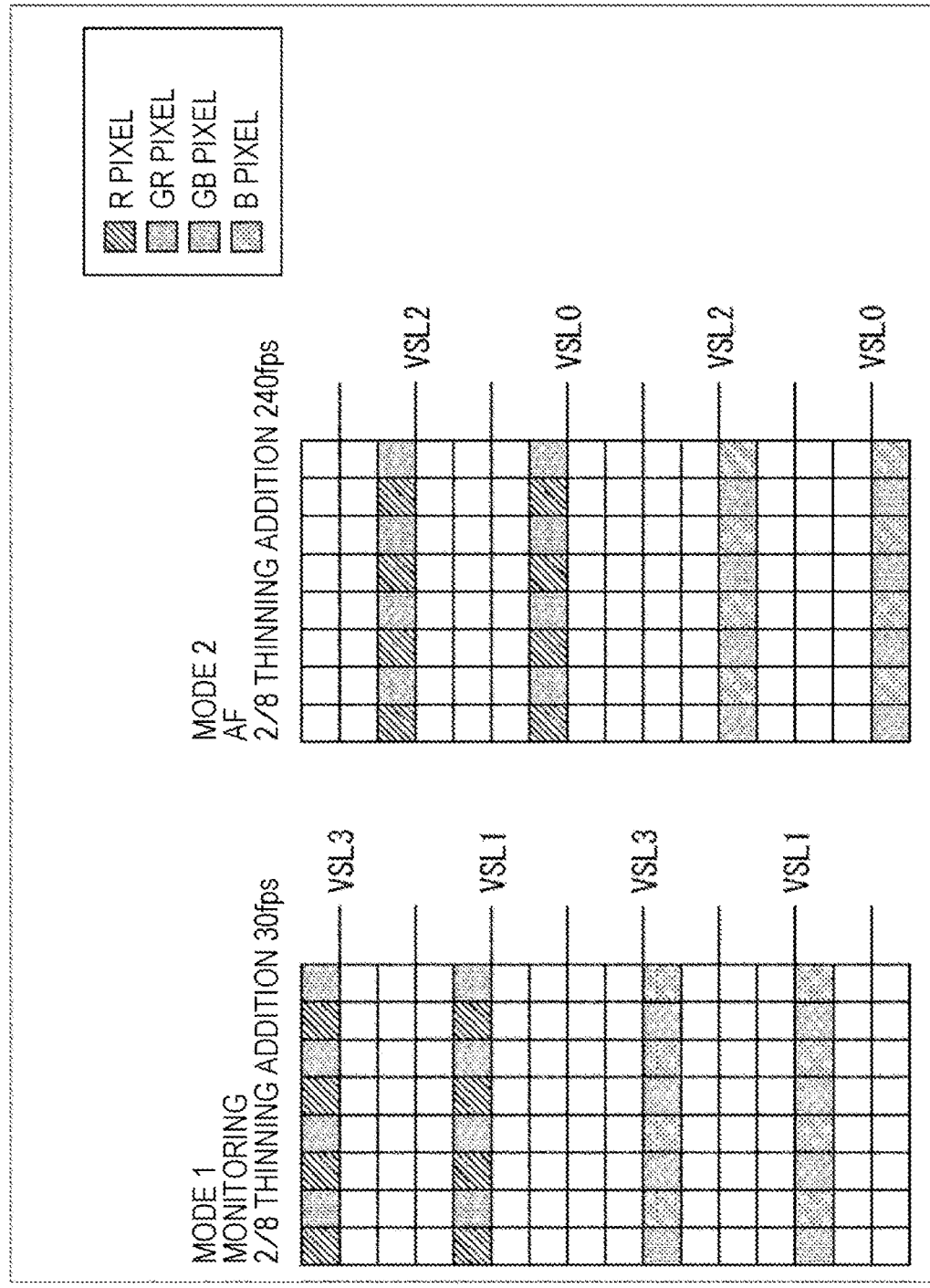
FIG. 17 is a diagram of still another exemplary state of the two-stream access.

An example of 2/8 thinning addition+2/8 thinning addition is illustrated in FIG. 17. In the case of the example in FIG. 17, the pixel signals are read in the two modes, i.e., the modes 1 and 2. Similarly to the case of FIG. 15, the mode 1 is the monitoring mode performed at 30 fps, and the mode 2 is the AF mode performed at 240 fps. Similarly to the example in FIG. 15, the vertical signal lines VSL1 and VSL3 are allocated to the mode 1, and the vertical signal lines VSL0 and VSL2 are allocated to the mode 2.

However, in the example in FIG. 17, the 2/8 thinning addition is performed in the mode 1 (monitoring mode). In the 2/8 thinning addition, two lines are read and added for each eight lines of pixels. That is, in the mode 1 (monitoring mode), the reading in the "2/8 thinning addition and 30 fps mode" is performed. Also, the 2/8 thinning addition is performed in the mode 2 (AF mode). That is, the reading in the "2/8 thinning addition and 240 fps mode" is performed in the mode 2 (AF mode).

In a case of an addition mode, for example, two lines of pixels (that is, lines (R/GR) where R pixels and GR pixels are arranged and lines (GB/B) where GB pixels and B pixels are arranged) of eight lines are read for each two lines, and the two lines (R/GR lines and GB/B lines) are added to each other. Accordingly, a high sensitivity image (added image) can be obtained. A method for adding the pixel signals can be optionally determined. For example, methods such as counter addition, comparator capacity addition, addition in the logic can be considered.

In a case of the two mode reading, the CMOS image sensor 100 can prevent the overlap of the pixels and vertical signal lines VSL when the pixel signals are read in each reading mode by distributing the vertical signal lines VSL to each reading mode.

Figure 18:
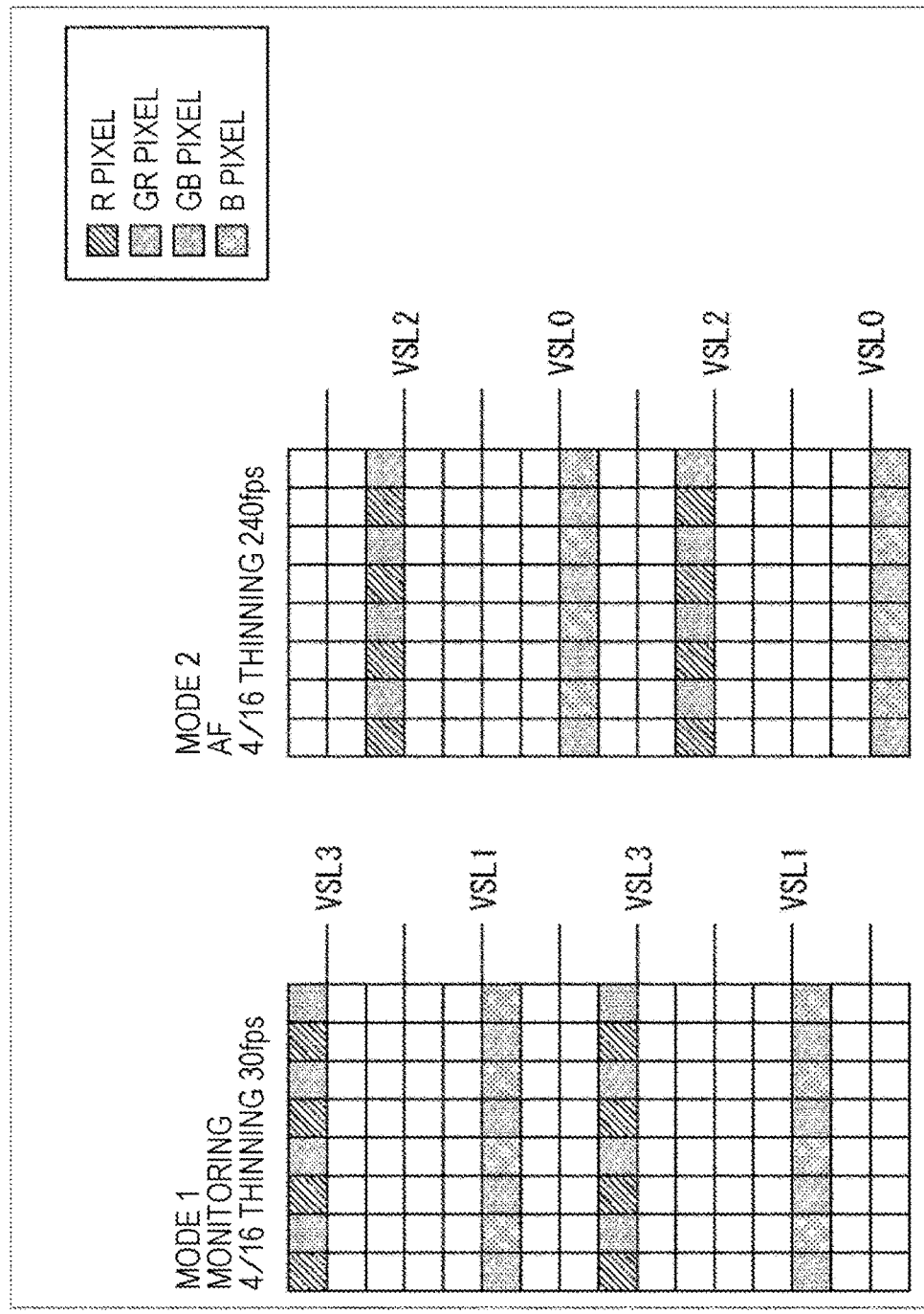
FIG. 18 is a diagram of yet another exemplary state of the two-stream access.

An example of 4/16 thinning+4/16 thinning is illustrated in FIG. 18. Also, in the example in FIG. 18, the pixel signals are read in the two reading modes, i.e., the modes 1 and 2. Similarly to the case of FIG. 15, the mode 1 is the monitoring mode performed at 30 fps, and the mode 2 is the AF mode performed at 240 fps. Similarly to the example in FIG. 15, the vertical signal lines VSL1 and VSL3 are allocated to the mode 1, and the vertical signal lines VSL0 and VSL2 are allocated to the mode 2.

However, in the example in FIG. 18, 4/16 thinning for reading four lines for each 16 lines of pixels is performed as the mode 1 (monitoring mode). That is, in the mode 1 (monitoring mode), the reading in the "4/16 thinning 30 fps mode" is performed. Also, the 4/16 thinning is performed in the mode 2 (AF mode). That is, the reading in the "4/16 thinning 240 fps mode" is performed in the mode 2 (AF mode).

In a case of the 4/16 thinning, as illustrated in FIGS. 17 and 18, a line reading pattern is different from that of the 2/8 thinning. Also, in the example in FIG. 18, the lines are not added to each other.

In a case of the two mode reading, the CMOS image sensor 100 can prevent the overlap of the pixels and vertical signal lines VSL when the pixel signals are read in each reading mode by distributing the vertical signal lines VSL to each reading mode.

Figure 19:
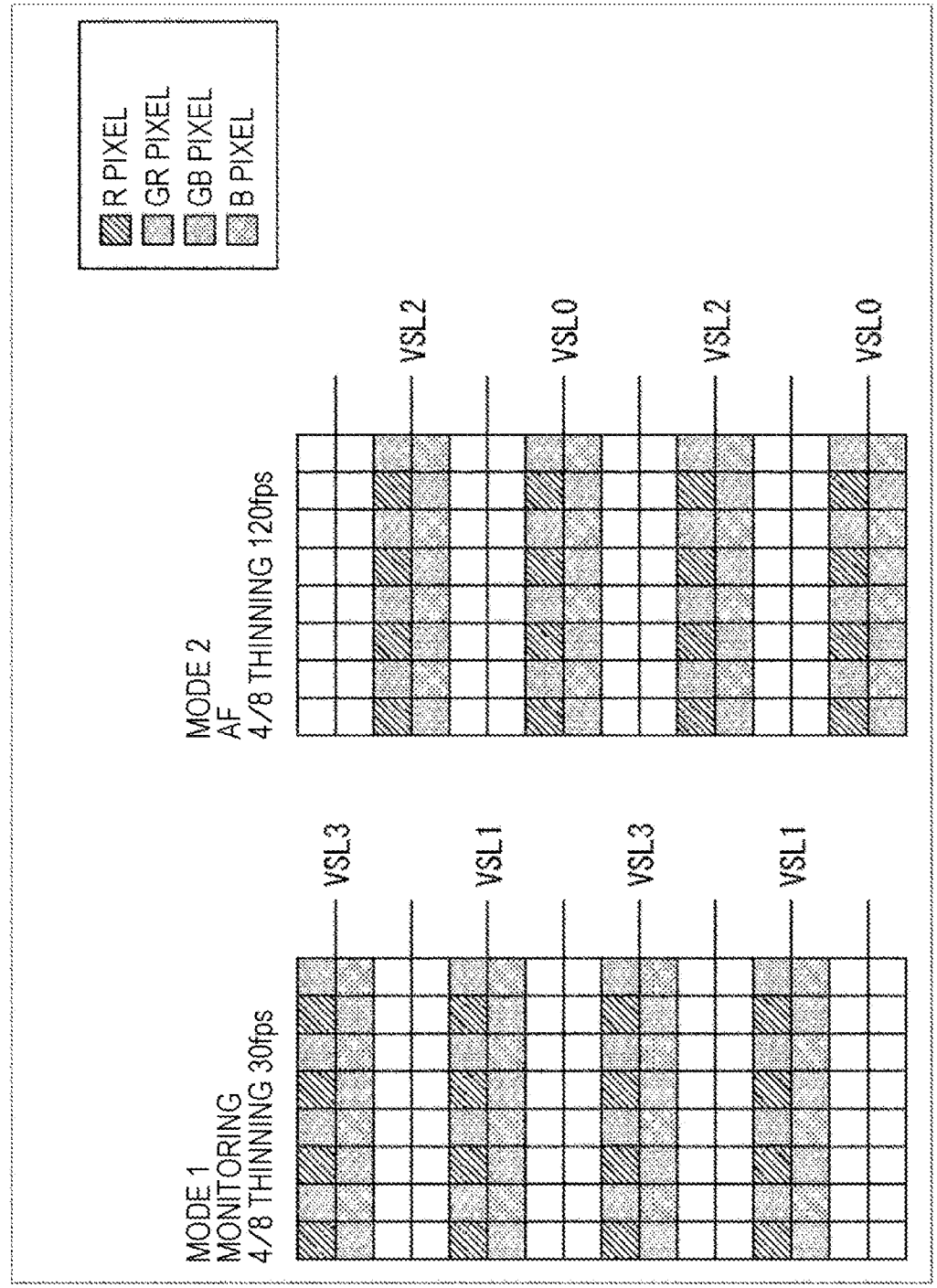
FIG. 19 is a diagram of still yet another exemplary state of the two-stream access.

An example of 4/8 thinning+4/8 thinning is illustrated in FIG. 19. Also, in the example in FIG. 19, the pixel signals are read in the two reading modes, i.e., the modes 1 and 2. The mode 1 is a monitoring mode performed at 30 fps, and the mode 2 is an AF mode performed at 120 fps. Similarly to the example in FIG. 15, the vertical signal lines VSL1 and VSL3 are allocated to the mode 1, and the vertical signal lines VSL0 and VSL2 are allocated to the mode 2.

However, in the example in FIG. 19, the 4/8 thinning for reading four lines for each eight lines of the pixels is performed as the mode 1 (monitoring mode). That is, the reading in the "4/8 thinning 30 fps mode" is performed in the mode 1 (monitoring mode). Also, the 4/8 thinning is performed in the mode 2 (AF mode). That is, in the mode 2 (AF mode), the reading in the "4/8 thinning 120 fps mode" is performed. In the example in FIG. 19, the lines are not added to each other.

In a case of the two mode reading, the CMOS image sensor 100 can prevent the overlap of the pixels and vertical signal lines VSL when the pixel signals are read in each reading mode by distributing the vertical signal lines VSL to each reading mode.

Figure 20:
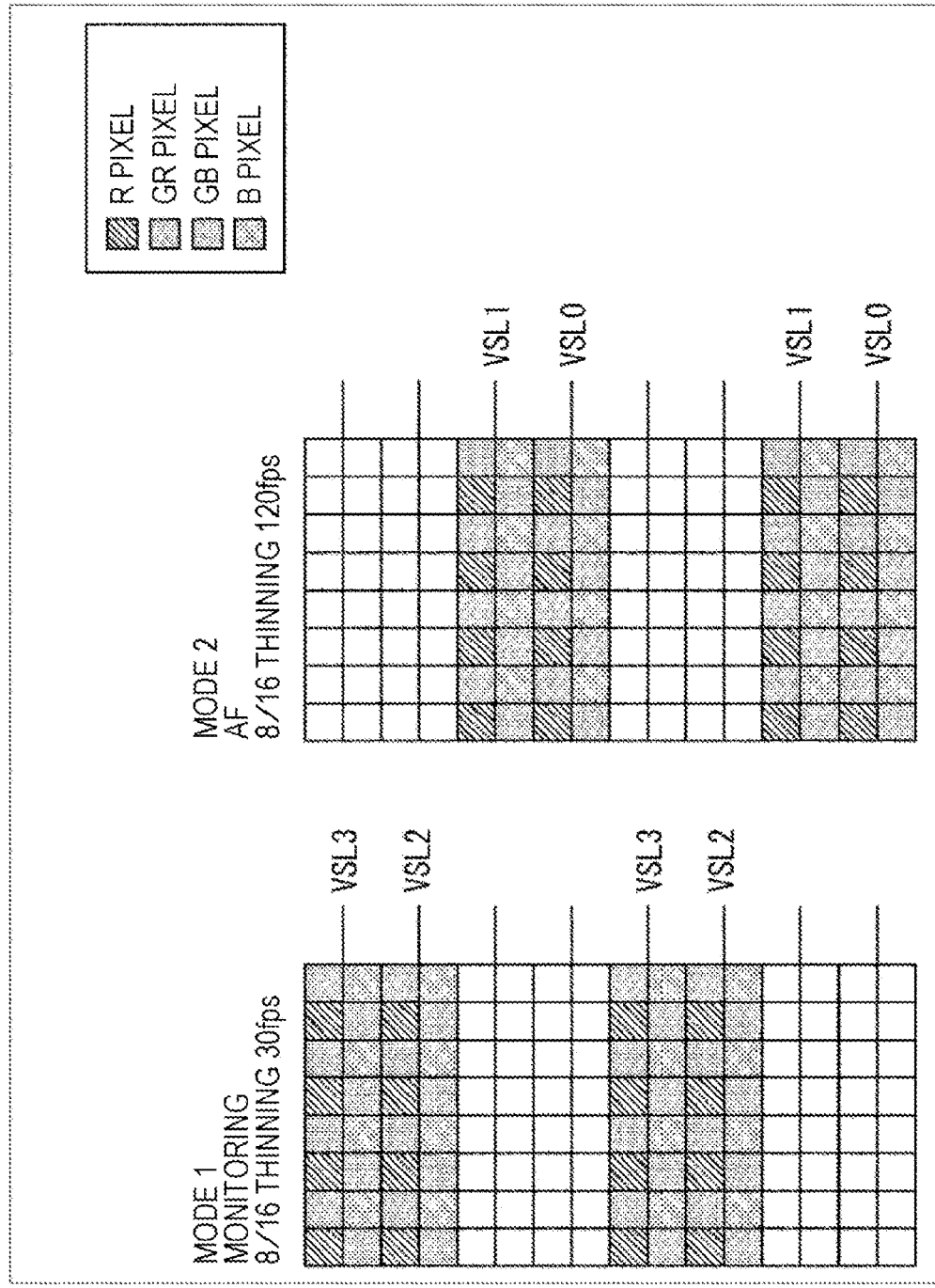
FIG. 20 is a diagram of the other exemplary state of the two-stream access.

An example of 8/16 thinning+8/16 thinning is illustrated in FIG. 20. Also, in the example in FIG. 20, the pixel signals are read in the two reading modes, i.e., the modes 1 and 2. Similarly to the example in FIG. 19, the mode 1 is a monitoring mode performed at 30 fps, and the mode 2 is an AF mode performed at 120 fps. Similarly to the example in FIG. 15, the vertical signal lines VSL1 and VSL3 are allocated to the mode 1, and the vertical signal lines VSL0 and VSL2 are allocated to the mode 2.

However, in the example in FIG. 20, the 8/16 thinning for reading eight lines for each 16 lines of pixels is performed as the mode 1 (monitoring mode). That is, in the mode 1 (monitoring mode), the reading in the "8/16 thinning 30 fps mode" is performed. Also, the 8/16 thinning is performed in the mode 2 (AF mode). That is, in the mode 2 (AF mode), the reading in the "8/16 thinning 120 fps mode" is performed. In the example in FIG. 20, the lines are not added to each other.

In a case of the two mode reading, the CMOS image sensor 100 can prevent the overlap of the pixels and vertical signal lines VSL when the pixel signals are read in each reading mode by distributing the vertical signal lines VSL to each reading mode.

Note that, ratios of the lines of the pixels read in the respective modes do not need to be the same. That is, in each column, the numbers of pixels allocated to the respective signal lines may be different from each other. For example, the ratio of the thinning of the mode 1 may be different from that of the mode 2. Also, the numbers of vertical signal lines VSL to be allocated to the respective modes may be different from each other. For example, the number of vertical signal lines VSL allocated to the mode 1 may be different from that of the mode 2.

Figure 21:
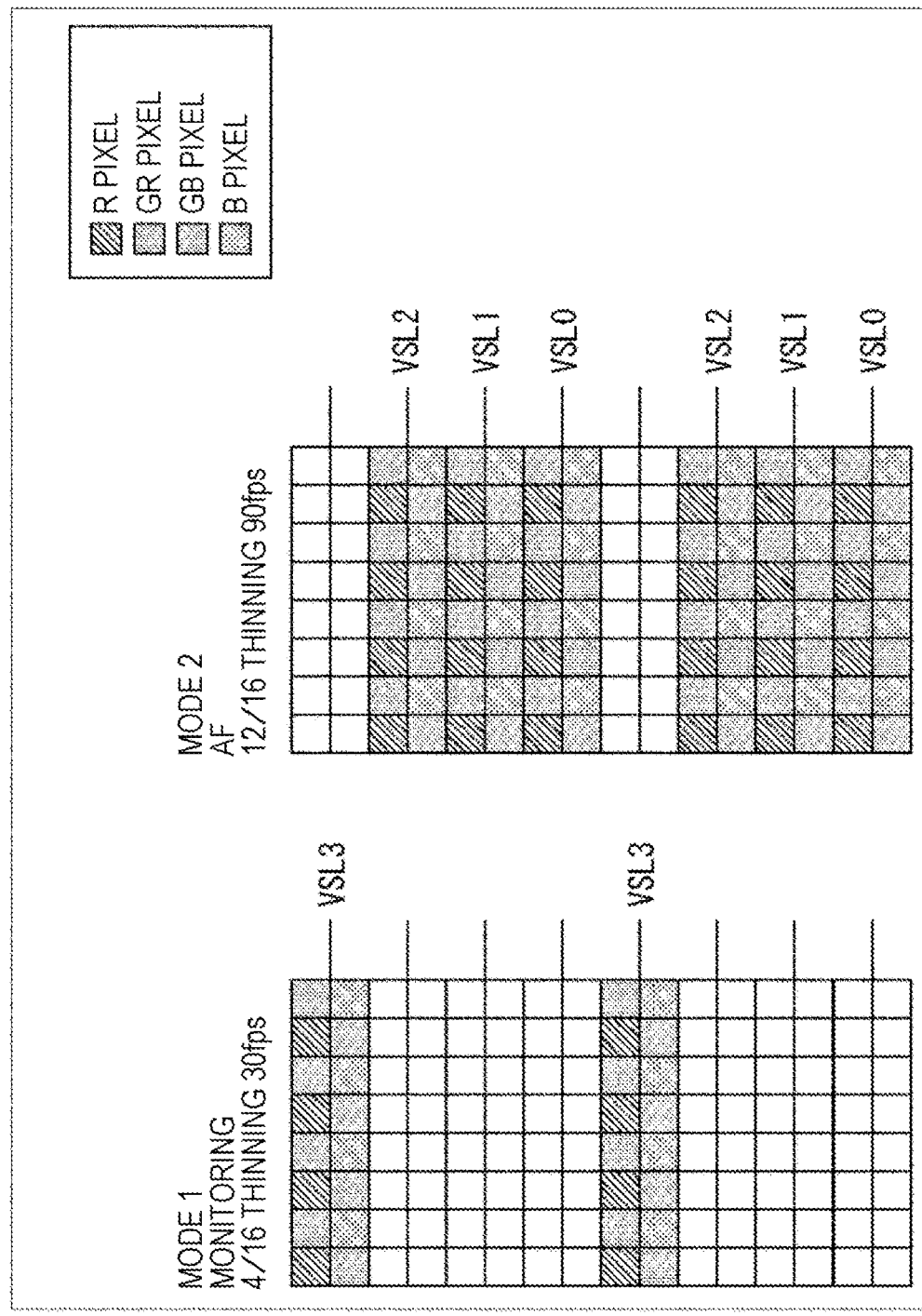
FIG. 21 is a diagram of the other exemplary state of the two-stream access.

An example of 4/16 thinning+12/16 thinning is illustrated in FIG. 21. In the example in FIG. 21, the pixel signals are read in the two reading modes, i.e., the modes 1 and 2. Similarly to the case of FIG. 15, the mode 1 is a monitoring mode performed at 30 fps, and the mode 2 is an AF mode performed at 90 fps. The vertical signal line VSL3 is allocated to the mode 1, and the vertical signal lines VSL0, VSL1, and VSL2 are allocated to the mode 2.

In the example in FIG. 21, the 4/16 thinning for reading four lines for each 16 lines of the pixels is performed as the mode 1 (monitoring mode). That is, in the mode 1 (monitoring mode), the reading in the "4/16 thinning 30 fps mode" is performed. Also, the 12/16 thinning for reading 12 lines for each 16 lines of the pixels is performed as the mode 2 (AF mode). That is, in the mode 2 (AF mode), the reading in the "12/16 thinning 90 fps mode" is performed. Note that, in the example in FIG. 21, the lines are not added to each other.

In a case of the two mode reading in which the reading mount of the pixel signals is different for each mode, the CMOS image sensor 100 can prevent the overlap of the pixels and the vertical signal lines VSL when the pixel signals are read in each reading mode by distributing the vertical signal lines VSL to each reading mode.

As described above, the CMOS image sensor 100 can realize easier and more diversified data output. The reading mode can be optionally selected and is not limited to the above-described examples. Also, the number of reading modes used in parallel and the combination patterns can be optionally determined and are not limited to the above-described examples. For example, even when a non-addition mode and an addition mode are mixed such as a case of 2/8 thinning addition+4/16 thinning addition, the control can be performed. Also, a thinning rate can be optionally set when the thinning rate is 2N times the number of vertical signal lines VSL.

<Example of Other Reading Mode>

The reading modes may be used in parallel according to the number of A/D converters of the column A/D converter 123. However, as in the example illustrated in FIG. 22, the parallel use of the reading modes may be realized in time division.

Figure 22:
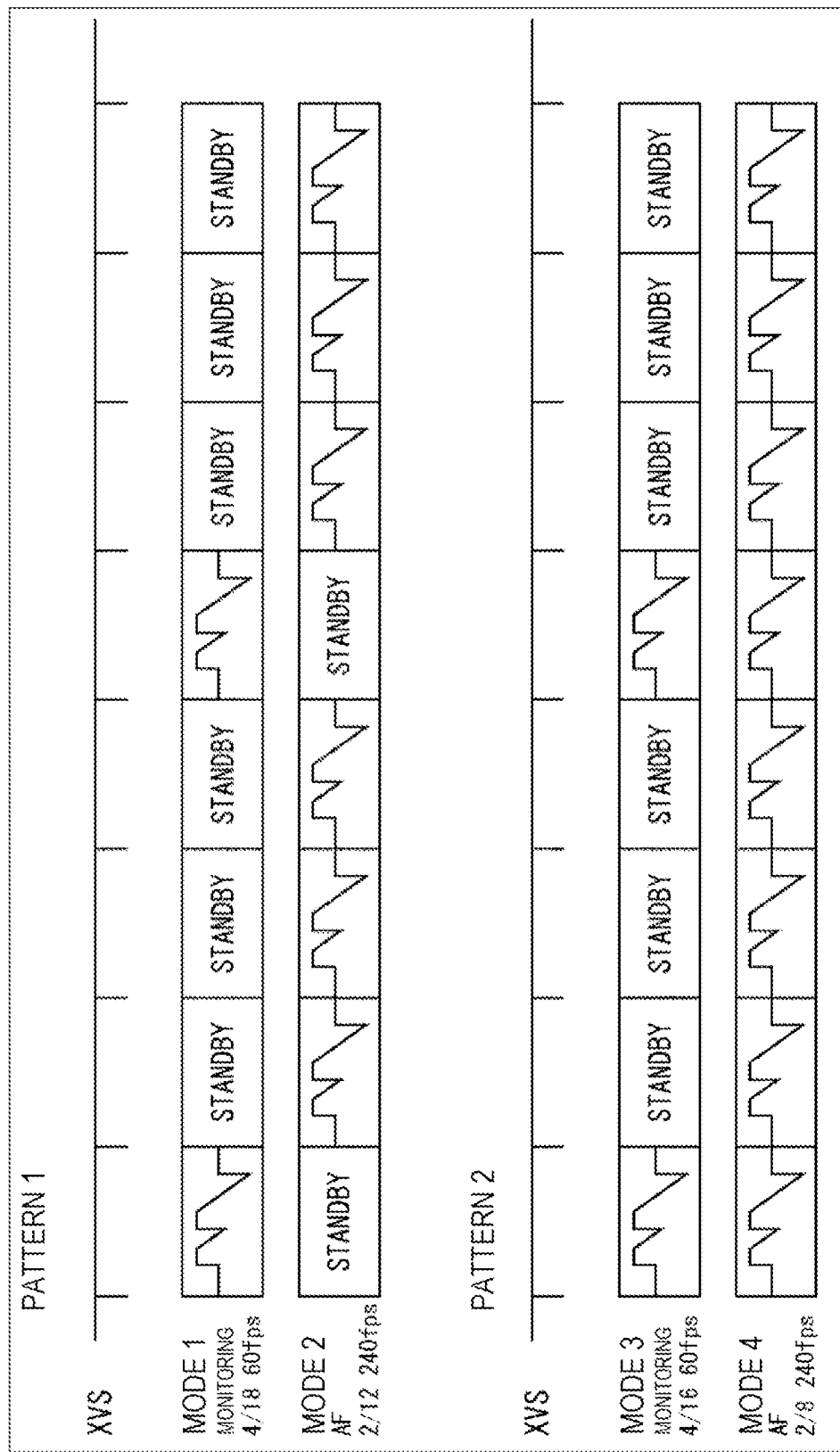
FIG. 22 is a diagram of an exemplary state of time division two-stream access.

For example, as in a pattern 2 in FIG. 22, two reading modes can be realized by using two A/D converters of the column A/D converter 123 by reading the pixel signal in each reading mode. Whereas, as in a pattern 1, the single A/D converter can be used for the two reading modes by time-dividing the single A/D converter by shifting reading timings of the respective modes. That is, the reading modes of which the number is larger than that of A/D converters of the column A/D converter 123 can be realized. In this case, for example, the sensor controller 131 makes the selection unit 122 sequentially switch the signal line to be selected and performs control to read the pixel signals in the plurality of modes in time division.

That is, even when the single A/D converter is provided per column, the plurality of reading modes described above can be realized. Note that, the number of reading modes performed by the single A/D converter can be optionally set. For example, three or more reading modes may use the same A/D converter.

Even when the control like this is performed, the CMOS image sensor 100 can realize easier and more diversified data output by distributing the vertical signal lines VSL to each reading mode.

Also, the distribution of the vertical signal lines VSL to the reading modes may be performed to not only an effective pixel but also a dummy pixel. That is, the dummy pixel may be connected to the vertical signal line VSL corresponding to the reading mode.

Figure 23:
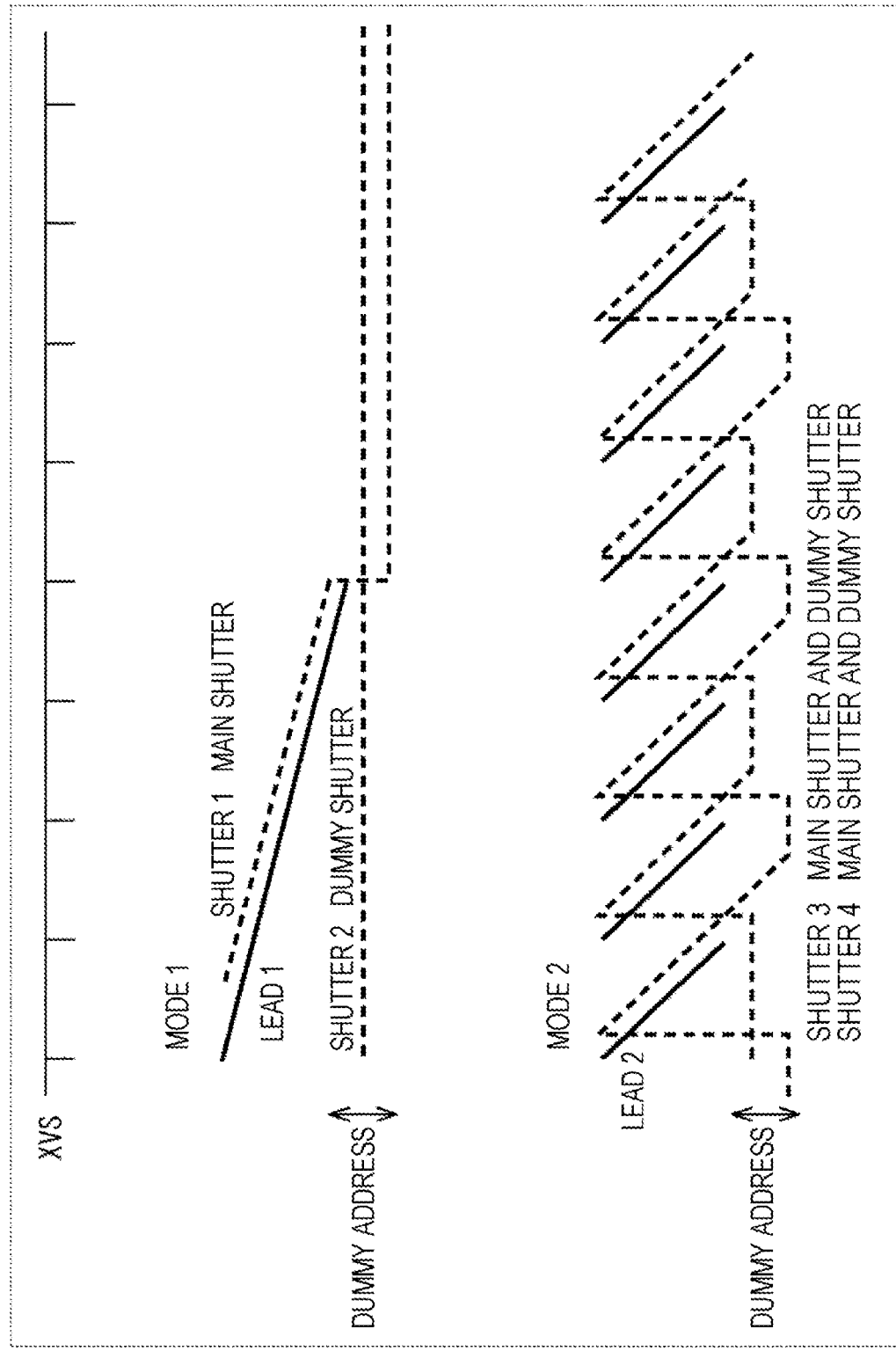
FIG. 23 is a diagram of an exemplary dummy address application.
Figure 24:
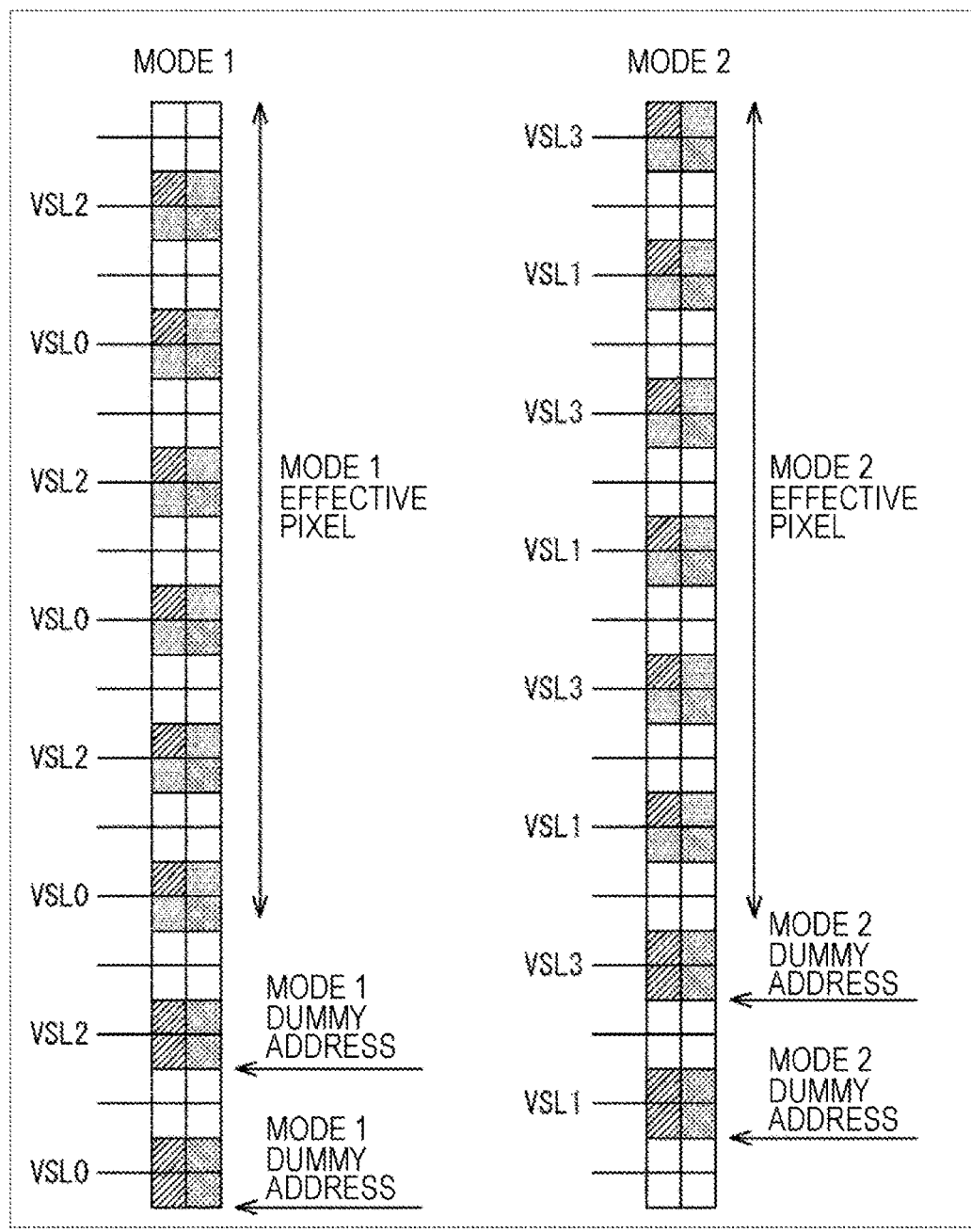
FIG. 24 is a diagram of an exemplary dummy address application.

An exemplary state of the dummy address and an operation of a dummy shutter in each reading mode is illustrated in FIG. 23. Also, an example of an arrangement of the dummy addresses is illustrated in FIG. 24.

Even in a non-effective period or a blanking period, the CMOS image sensor 100 performs lead and shutter operation to align the loads. The dummy pixel is used at this time. For example, in a case of the two-stream, there is a period of time when the blanking period of the mode 2 and an effective period of the mode 1 are overlapped with each other. When the vertical signal lines VSL of the dummy addresses are contact with each other at this time, this may cause image quality deterioration such as a horizontal line of the mode 1.

Therefore, to improve the image quality of the two-stream, the dummy address is controlled by distributing the vertical signal lines VSL similarly to the effective address. That is, the sensor controller 131 performs control to read the pixel signal in the mode from the dummy pixel connected to the vertical signal line VSL corresponding to the reading mode of the pixel signal regarding each column of the pixel array unit 111. According to this, the CMOS image sensor 100 can obtain an excellent image quality even in the period overlapped with the blanking period of the mode 1 or 2. That is, the CMOS image sensor 100 can realize easier and more diversified data output.

The sensor controller 131 may further control the shutter operation of the dummy pixel in the mode.

Figure 25:
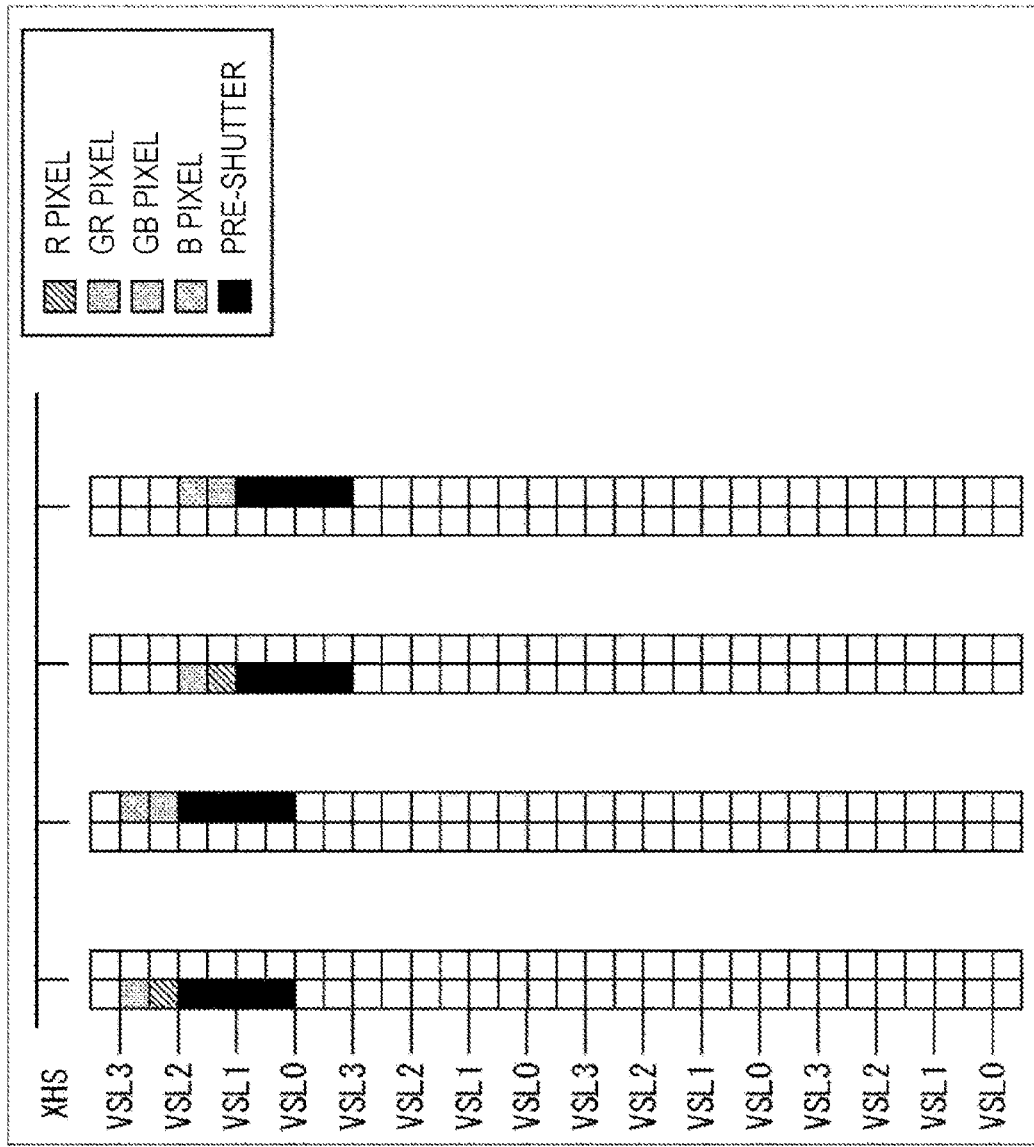
FIG. 25 is a diagram of exemplary double speed reading.

In addition, the present technology can be applied to the reading mode to read the pixel signal faster than a normal reading speed. A V access image of the normal speed reading is illustrated in FIG. 25. In a case of this reading mode, two pixels are read in a single horizontal synchronization period (1XHS).

Figure 26:
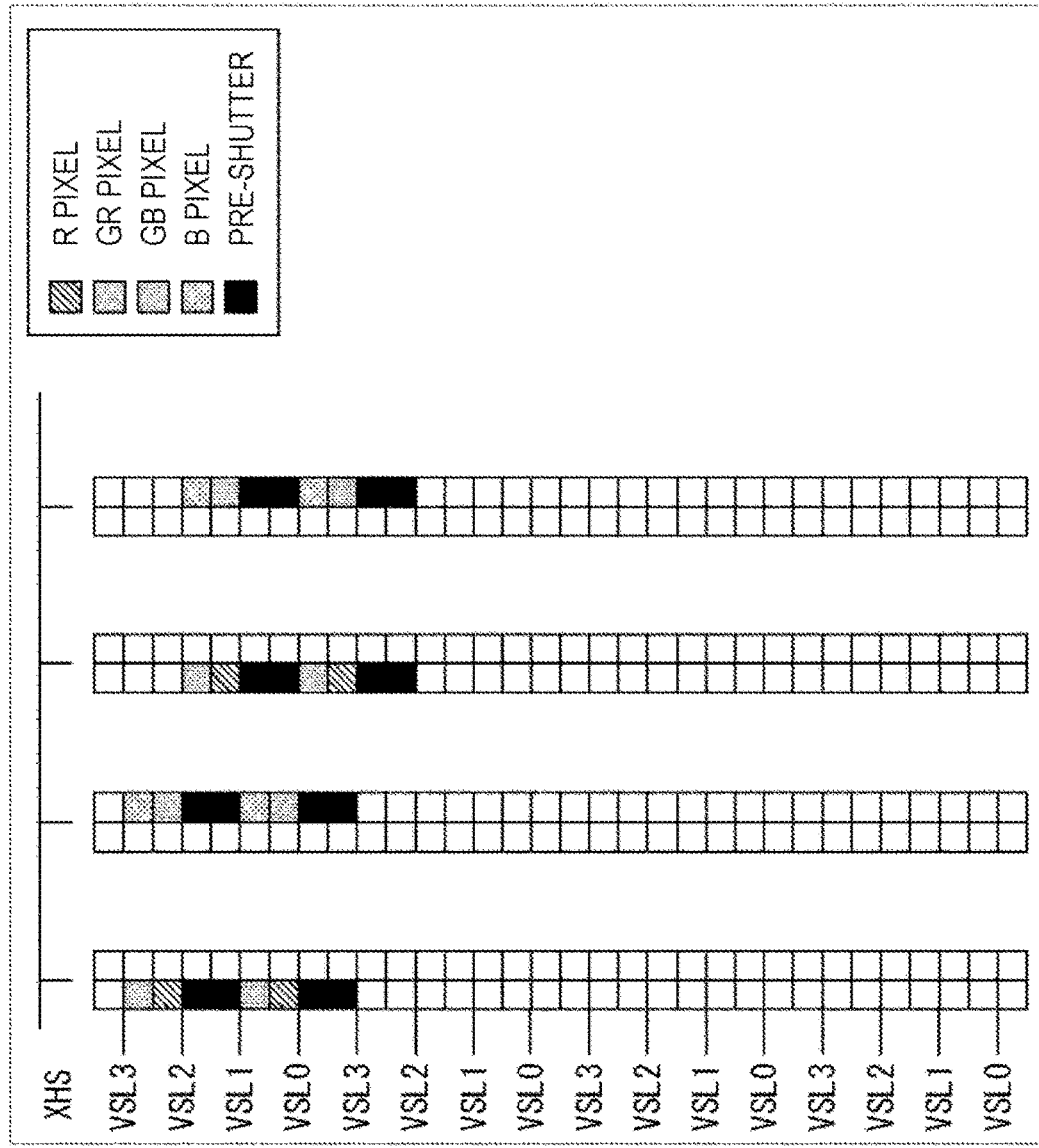
FIG. 26 is a diagram of another example of the double speed reading.

A V access image of a double speed reading is illustrated in FIG. 26. By constantly A/D converting four VSLs, a double frame rate of the normal reading speed mode can be realized. Also, by setting the pre-shutter to be twice of the normal reading speed, in a case of the double speed reading mode, a good image quality equal to that of the normal reading speed can be obtained.

Figure 27:
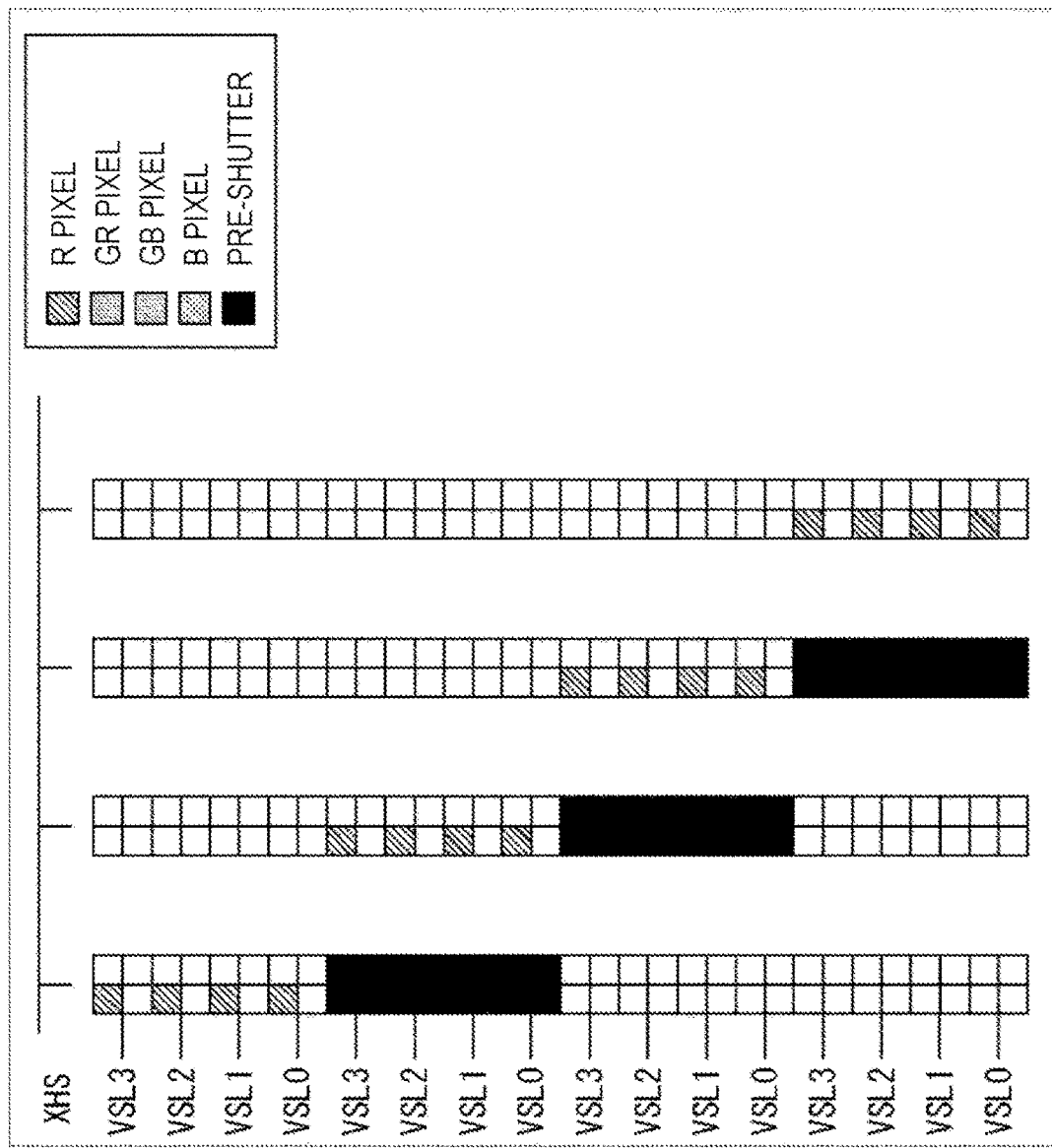
FIG. 27 is a diagram of exemplary double speed reading.

A V access image of a quad-speed reading is illustrated in FIG. 27. The CMOS image sensor 100 is generally formed of a silicon (Si) substrate, and near infrared rays (for example, a wavelength region equal to or less than one um) can be photoelectrically converted due to a band gap. Also, when an infrared rays (IR) cut filter is removed, by focusing on that the R pixel has the highest sensitivity around one um and reading the R pixels at the quad speed, the CMOS image sensor 100 coping with near infrared rays can be realized. Also, by providing the plurality of A/D converters per column, the CMOS image sensor 100 can realize double frame rate of the normal reading speed.

Figure 28:
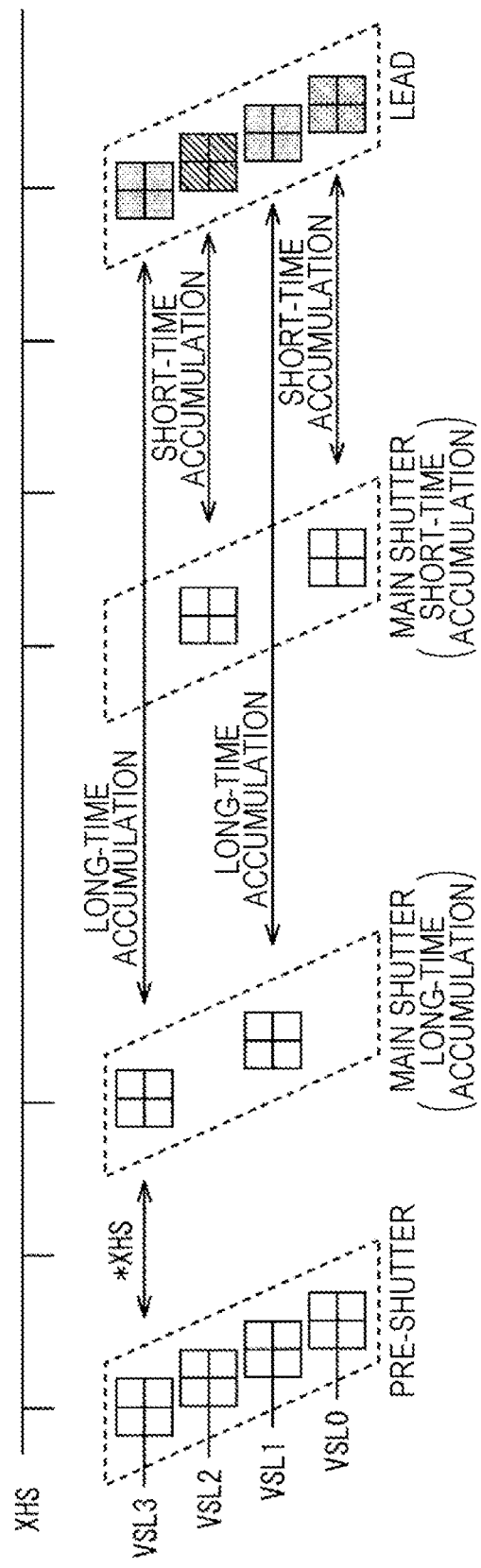
FIG. 28 is a diagram of exemplary high S/N reading.

A control method of high S/N reading is illustrated in FIG. 28. By applying the two-stream control method, the high S/N reading which has been proposed before can be easily realized. As illustrated in FIG. 28, by dividing the system of the shutter into long-time accumulation and short-time accumulation, the long-time accumulation and short-time accumulation can be realized for every two lines by using the control method similar to the two stream. When two pixels are read per horizontal synchronization period (1XHS) similarly to the traditional CMOS image sensor, there is no problem in reading. That is, an exposure time of each signal may be set for each mode corresponding to the signal line connected to the pixel.

As described above, the CMOS image sensor 100 can realize easier and more diversified data output.

2. Second Embodiment

<Transfer of Pixel Signal in High-Speed Reading Mode>

In a case of a general CMOS image sensor, a single A/D converter is mounted per column. The A/D conversion is performed as sequentially scanning the pixels by line unit. This is referred to as a rolling shutter system. By using this scanning system, timing of the A/D conversion is shifted for each line. Therefore, when a moving body is imaged, a distortion is generated. This is referred to as a rolling shutter distortion. Since an A/D conversion speed depends on a settling time of the D/A converter, it is difficult to realize an extreme high speed. Therefore, it has been difficult to reduce the rolling shutter distortion.

As described in the first embodiment, by providing two or more A/D converters per column and performing the A/D conversion to two lines in parallel, the rolling shutter distortion can be reduced.

However, with this configuration, a problem of a transfer band occurs at this time. There is a limit in a transfer band of post-stage camera signal processing LSI. Therefore, there has been a possibility that imaged data to which the A/D conversion is concurrently performed in two lines cannot be transferred within a unit time. Therefore, it has been necessary to mount a large number of line memories in the image sensor as a buffer, and there has been a possibility of increase in a chip size and power consumption.

As described above, by providing the plurality of A/D converters per column and performing the A/D conversion to the pixel signals in the multiple lines in parallel, the rolling shutter distortion is reduced. In addition, two lines of the pixel signals to which the A/D conversion is performed in parallel are compressed, and a band necessary for transfer is reduced. According to this, data can be transferred within an hour. In this way, it is not necessary to provide a large-capacity buffer, and increase in cost and power consumption can be prevented.

<CMOS Image Sensor>

Figure 29:
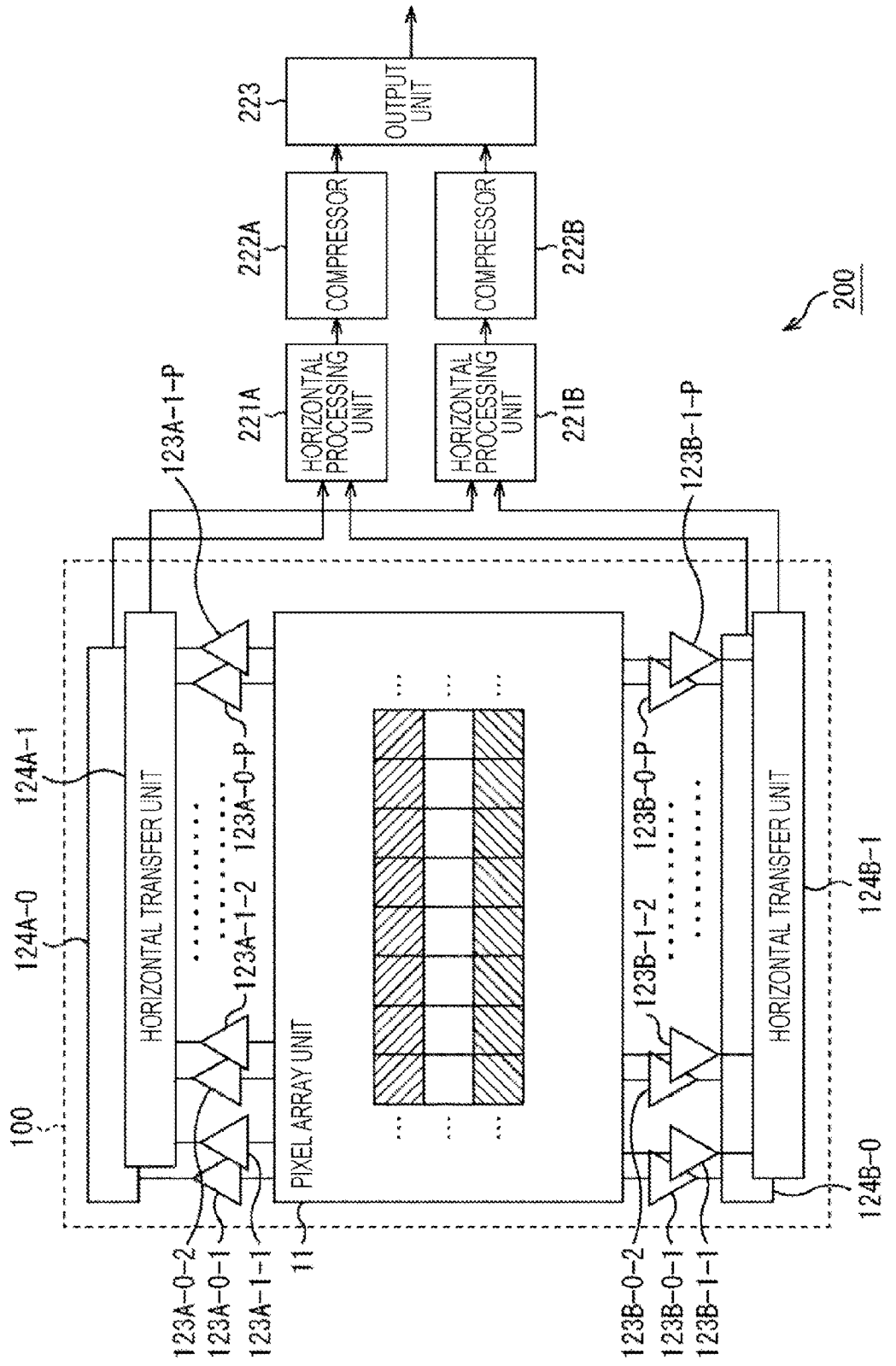
FIG. 29 is a block diagram of another example structure of the image sensor to which the present technology has been applied.

FIG. 29 is a block diagram of an example structure of a part of a complementary metal oxide semiconductor (CMOS) image sensor which is one embodiment of an image pickup element to which the present technology has been applied. Similarly to the CMOS image sensor 100, a CMOS image sensor 200 illustrated in FIG. 29 is an image pickup element which images an object and obtains digital data of the imaged image. Note that, in the following description, the CMOS image sensor is described as an example. However, also in the present embodiment, similarly to the first embodiment, the present technology can be applied to an image pickup element other than the CMOS image sensor such as a charge coupled device (CCD) image sensor.

As illustrated in FIG. 29, the CMOS image sensor 200 has a similar structure to that of the CMOS image sensor 100. The CMOS image sensor 200 includes column A/D converters 123A-0 (column A/D converters 123A-0-1 to 123A-

0-P), column A/D converters 123B-0 (column A/D converters 123B-0-1 to 123B-0-P), column A/D converters 123A-1 (column A/D converters 123A-1-1 to 123A-1-P), and column A/D converters 123B-1 (column A/D converters 123B-1-1 to 123B-1-P).

The column A/D converters 123 perform the A/D conversion to the pixel signals read from a pixel array unit 111. The pixel signals (digital data) to which the A/D conversion is performed by the column A/D converters 123 are supplied to a horizontal transfer unit 124.

The CMOS image sensor 200 includes horizontal transfer units 124A-0, 124B-0, 124A-1, and 124B-1. The pixel signals to which the A/D conversion is performed by the column A/D converters 123A-0 (column A/D converters 123A-0-1 to 123A-0-P) are supplied to the horizontal transfer unit 124A-0. The pixel signals to which the A/D conversion is performed by the column A/D converters 123B-0 (column A/D converters 123B-0-1 to 123B-0-P) are supplied to the horizontal transfer unit 124B-0. The pixel signals to which the A/D conversion is performed by the column A/D converters 123A-1 (column A/D converters 123A-1-1 to 123A-1-P) are supplied to the horizontal transfer unit 124A-1. The pixel signals to which the A/D conversion is performed by the column A/D converters 123B-1 (column A/D converters 123B-1-1 to 123B-1-P) are supplied to the horizontal transfer unit 124B-1.

Also, the CMOS image sensor 200 includes horizontal processing units 221A and 221B. Also, when it is not necessary to describe the horizontal processing units 221A and 221B as distinguishing them from each other, they are simply referred to as a horizontal processing unit 221. The horizontal transfer units 124A-0 and 124B-0 supply the pixel signals to the horizontal processing unit 221A. The horizontal transfer units 124A-1 and 124B-1 supply the pixel signals to the horizontal processing unit 221B.

That is, the horizontal transfer unit 124 outputs the pixel signals to the horizontal processing unit 221 in parallel in two lines. The horizontal processing units 221A and 221B perform predetermined signal processing to the pixel signals in the respective lines. Note that, the horizontal processing unit 221 may be configured as a single processing unit for independently performing signal processing to the pixel signal in each line. Also, the horizontal processing unit 221 may be omitted.

The CMOS image sensor 200 further includes compressors 222A and 222B. When it is not necessary to describe the compressors 222A and 222B as distinguishing them from each other, they are simply referred to as a compressor 222.

The horizontal processing unit 221A supplies the pixel signal, to which the signal processing has been performed, to the compressor 222A. The horizontal processing unit 221B supplies the pixel signal, to which the signal processing has been performed, to the compressor 222B. The compressors 222A and 222B compress the pixel signals in the respective lines. At this time, the compressors 222A and 222B compress the pixel signals until the data amount of the pixel signals in all the lines become an amount which can be transferred within a predetermined unit period (for example, a single horizontal synchronization period).

The CMOS image sensor 200 further includes an output unit 223. The compressors 222A and 222B supply the compressed pixel signals to the output unit 222. The output unit 223 outputs the compressed pixel signals in all the lines which have been supplied to the outside of the CMOS image sensor 200.

Note that, the compressor 222 may be configured as a single processing unit for independently performing compression processing to the pixel signal in each line.

In this way, the CMOS image sensor 200 can output the pixel signals of the plurality of lines without increasing the transfer band. Note that, in FIG. 29, it has been described that the pixel signals are read in two lines. However, the number of the lines to read may be optionally set when the number is multiple. Regardless of the number of lines, it is preferable to prepare the same number of compressors 222. However, when the number of lines is increased, it is necessary to increase a compression ratio. For example, when the reading is performed in N lines, N compressors 222 are prepared, and it is preferable that a data size of the pixel signal is compressed by each compressor to equal to or less than Nth part of that. In the following description, a case where the pixel signals are read in two lines is described.

<Timing Chart>

Figure 30:
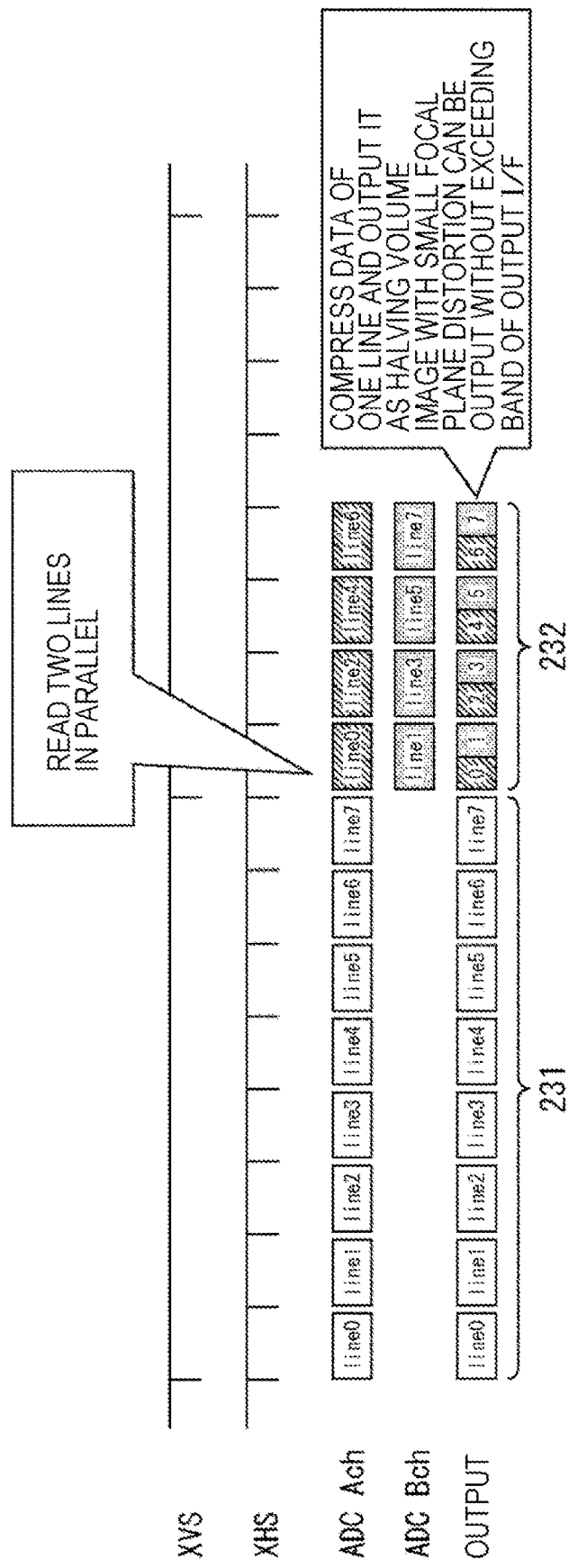
FIG. 30 is a diagram of an exemplary state of compression.

FIG. 30 is a timing chart to describe a state of data output of the CMOS image sensor 200. When the pixel signals are read as in a section 231 in FIG. 30, the pixel signal for one line in a single line can be output per unit time. Whereas, by compressing and outputting the pixel signals of each line as illustrated in the example in FIG. 29, the pixel signals of two lines can be output in a single line per unit time as in a section 232. Therefore, the CMOS image sensor 200 can output an image with a small focal plane distortion without exceeding a band of an output interface.

<Horizontal Processing Unit>

Figure 31:
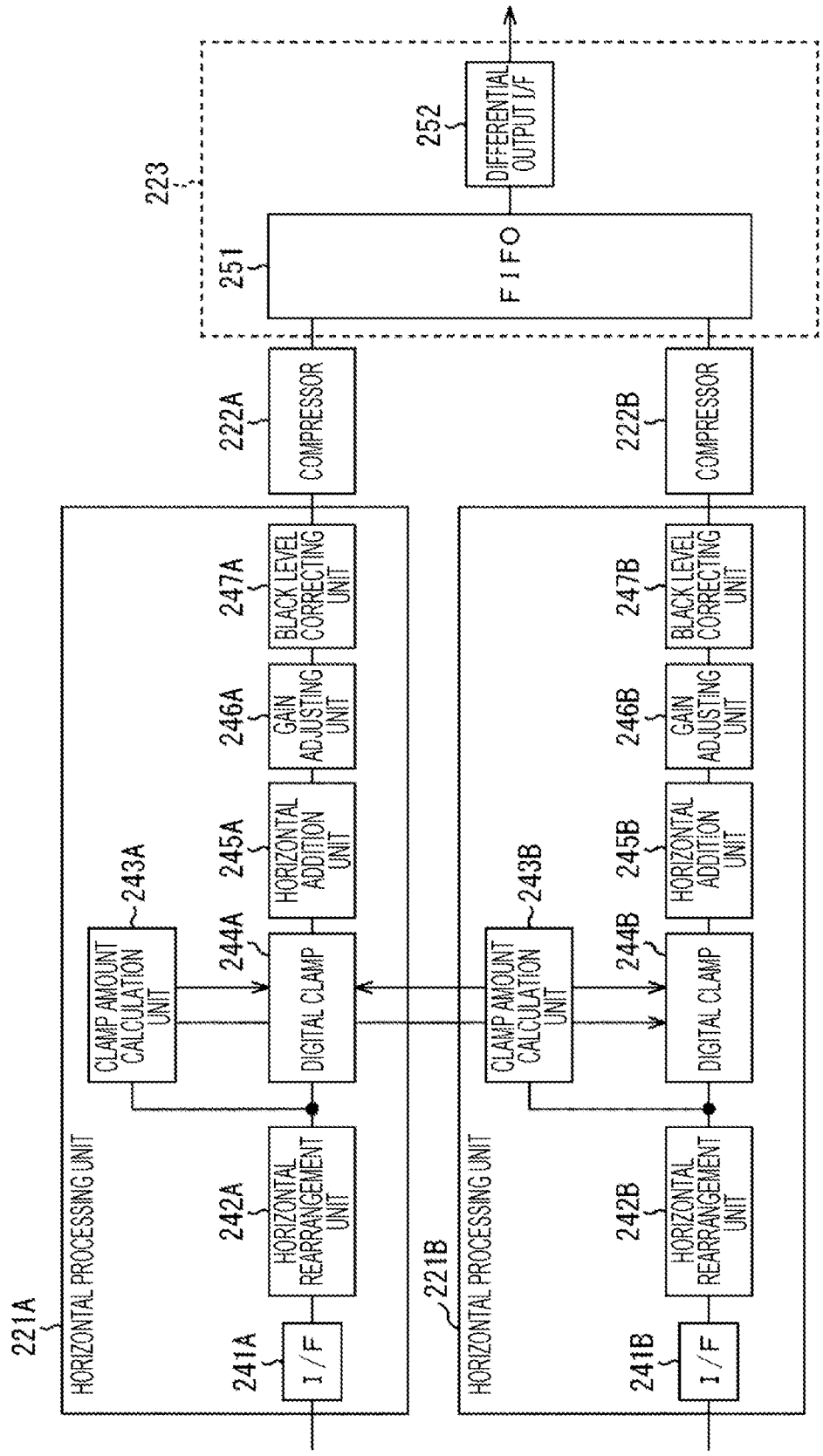
FIG. 31 is a diagram of an exemplary horizontal processing unit.

FIG. 31 is a diagram of a primary example structure of the horizontal processing units 221A and 221B.

In the example in FIG. 31, the horizontal processing unit 221A includes an interface (I/F) 241A, a horizontal rearrangement unit 242A, a clamp amount calculation unit 243A, a digital clamp 244A, a horizontal addition unit 245A, a gain adjusting unit 246A, and a black level correcting unit 247A.

Similarly, the horizontal processing unit 221B includes an interface (I/F) 241B, a horizontal rearrangement unit 242B, a clamp amount calculation unit 243B, a digital clamp 244B, a horizontal addition unit 245B, a gain adjusting unit 246B, and a black level correcting unit 247B.

When it is not necessary to describe the interfaces (I/F) 241A and 241B as distinguishing them from each other, they are simply referred to as an interface (I/F) 241. When it is not necessary to describe the horizontal rearrangement units 242A and 242B as distinguishing them from each other, they are simply referred to as a horizontal rearrangement unit 242. When it is not necessary to describe the clamp amount calculation units 243A and 243B as distinguishing them from each other, they are simply referred to as a clamp amount calculation unit 243. When it is not necessary to describe the digital clamps 244A and 244B as distinguishing them from each other, they are simply referred to as a digital clamp 244. When it is not necessary to describe the horizontal addition units 245A and 245B as distinguishing them from each other, they are simply referred to as a horizontal addition unit 245. When it is not necessary to describe the gain adjusting units 246A and 246B as distinguishing them from each other, they are simply referred to as a gain adjusting unit 246. When it is not necessary to describe the black level correcting units 247A and 247B as distinguishing them from each other, they are simply referred to as a black level correcting unit 247.

Optional signal processing is performed by the horizontal processing unit 221. Therefore, the structure of the horizontal processing unit 221 is not limited to the example in FIG. 31.

Also, as illustrated in FIG. 31, the output unit 223 includes a FIFO buffer 251 and a differential output interface (I/F) 252. As described above, by sufficiently compressing the pixel signal by the compressor 222, an overflow of the FIFO buffer 251 is prevented from being generated, and the pixel signals of the plurality of lines can be output in a single line within a unit time. Note that, the structure of the output unit 223 can be optionally determined and is not limited to the example in FIG. 31.

<Compressor>

Note that, an optional compression method of the pixel signals by the compressor 222 is performed.

Figure 32:
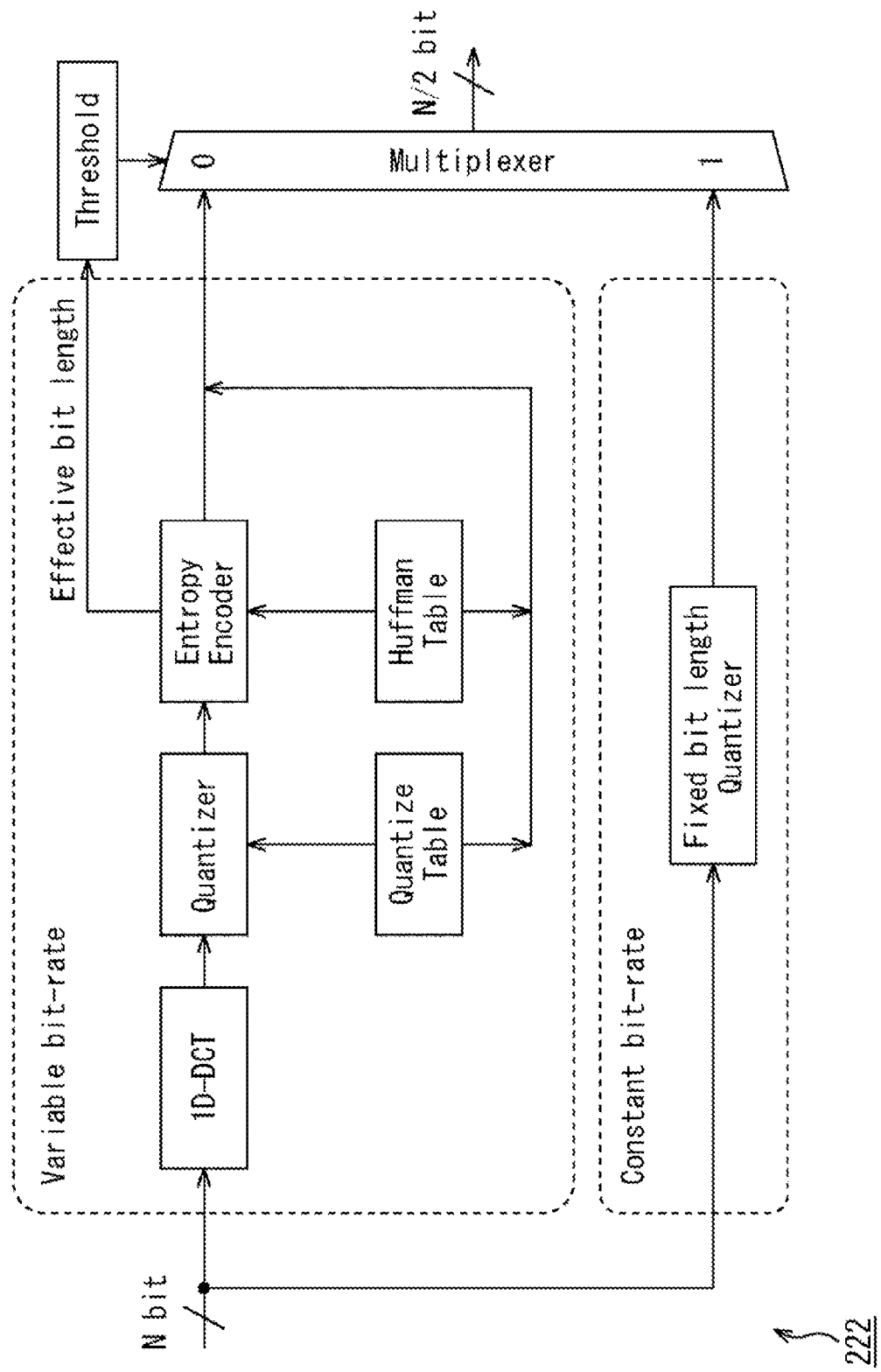
FIG. 32 is a diagram of an exemplary compressor.

However, in order to prevent increase in a processing time of the compression processing, it is preferable that the compression method and the control method be simple. For example, a compression system of a fixed bit rate (CBR) may be employed. FIG. 32 is a diagram of a primary example structure of the compressor 222 in that case. The structure of the compressor 222 can be optionally determined and is not limited to the example in FIG. 32.

As described above, since the CMOS image sensor 200 can output the pixel signals of the plurality of lines without increasing the transfer band, easier and more diversified data output can be realized.

3. Third Embodiment

<Data Latch>

In a case of an image sensor in which a single Single-Slope-type A/D converter is allocated to a single column of a pixel array, a single data latch is provided for each single A/D converter. The data latch stores a count value (A/D converted pixel signal (digital data)) which is counted by the A/D converter. By storing the count value to the data latch, while the next column is read and the A/D conversion is performed, the count value can be transferred to a logic unit.

When the single data latch is provided for the single A/D converter, a line memory is needed which stores data of different columns when addition to the other column is performed and differential data is output. When the line memory is mounted, it has been a possibility of increase in a circuit area (that is, manufacturing cost) and power consumption.

The plurality of data latches for storing the count value (A/D converted pixel signal (digital data)) counted by the A/D converter is provided for the single Single-Slope-type A/D converter, and the plurality of pixel signals (pixel signals of the plurality of lines) can be transferred in parallel (within a single unit time).

Note that, a calculation unit may be further included which adds/subtracts the pixel signals read from the plurality of data latches described above.

With the above method, the increase in a circuit size (manufacturing cost) and the power consumption can be reduced than a case where the line memory is included in an image processing unit.

<CMOS Image Sensor>

Figure 33:
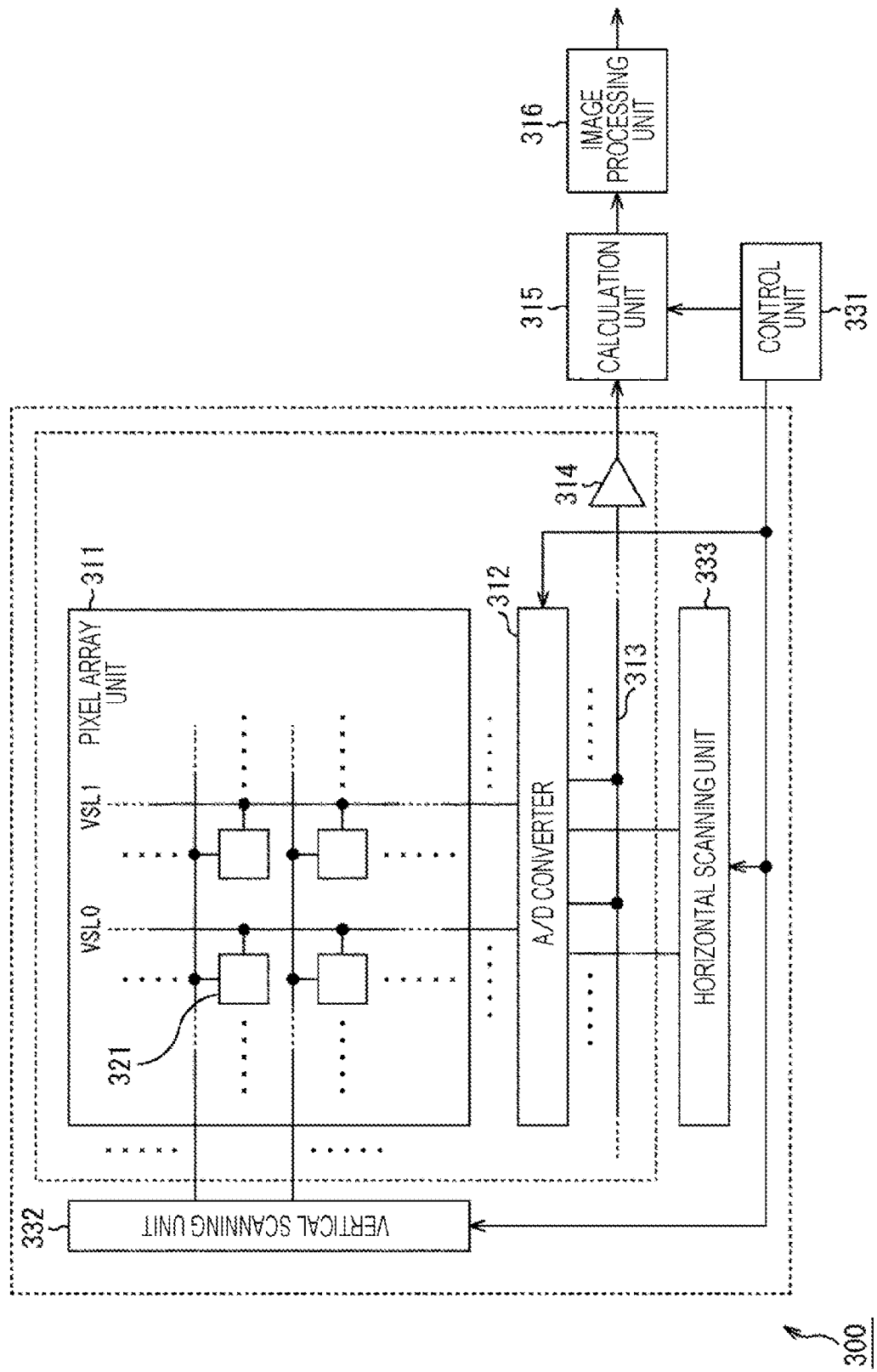
FIG. 33 is a block diagram of still another example structure of the image sensor to which the present technology has been applied.

FIG. 33 is a diagram of a primary example structure of the CMOS image sensor in that case. Similarly to the CMOS image sensors 100 and 200, a CMOS image sensor 300 illustrated in FIG. 33 is an image pickup element which images an object and obtains digital data of the imaged image. Note that, the CMOS image sensor is described as an example here. However, the present technology can be applied to an image pickup element other than the CMOS image sensor such as a CCD image sensor.

As illustrated in FIG. 33, the CMOS image sensor 300 includes a pixel array unit 311, an A/D converter 312, a horizontal transfer path 313, an amplification unit 314, a calculation unit 315, and an image processing unit 316. Also, the CMOS image sensor 300 includes a control unit 331, a vertical scanning unit 332, and a horizontal scanning unit 333.

The pixel array unit 311 is a pixel region where pixel configurations (unit pixel) 321 having a photoelectric conversion element such as a photodiode are arranged in a planar shape or a curved shape. Each unit pixel 321 of the pixel array unit 111 is controlled by the vertical scanning unit 332 and receives light from the object. The unit pixel 321 photoelectrically converts the incident light and accumulates charges. Then, the unit pixel 321 outputs the charges as a pixel signal at a predetermined timing.

The pixel signal output from each unit pixel 321 is transferred to the A/D converter 312 by a vertical signal line VSL (for example, VSL0 and VSL1) allocated to a column for each column.

The A/D converter 312 includes a column A/D converter for performing A/D conversion to the pixel signal of the column for each column. The A/D converter 312 is controlled by the horizontal scanning unit 333 and performs A/D conversion to the pixel signal of each column of the pixel array by using each column A/D converter. The pixel signal (digital data) A/D converted by the A/D converter 312 is supplied to the amplification unit 314 via the horizontal transfer path 313 and is amplified by the amplification unit 314. Then, the amplified pixel signal is supplied to the calculation unit 315.

The calculation unit 315 performs predetermined calculation (for example, addition/subtraction of the pixel signals of the plurality of lines) to the supplied pixel signals of the plurality of lines under the control of the control unit 331 as necessary. The calculation unit 315 supplies the supplied pixel signal or the calculation result to the image processing unit 316.

The image processing unit 316 performs predetermined image processing and signal processing by using the pixel signal supplied from the calculation unit 315.

The control unit 331 controls each processing unit of the CMOS image sensor 300. For example, the control unit 331 controls the vertical scanning unit 332 and makes the vertical scanning unit 332 control drive of the unit pixel 321. Also, for example, the control unit 331 controls the A/D converter 312 and controls A/D conversion to the pixel signal read from the pixel array unit 311 (more specifically, latch of the A/D converted pixel signal). In addition, for example, the control unit 331 controls the horizontal scanning unit 333 and makes the horizontal scanning unit 333 control the reading and transfer of the A/D converted pixel signal from the A/D converter 312 (more specifically, data latch) of each column. In addition, for example, the control unit 331 controls the calculation unit 315 and controls calculation processing for using the pixel signal.

The vertical scanning unit 332 is controlled by the control unit 331 and controls the drive of each unit pixel 321 of the pixel array unit 311 and makes the unit pixel 321 read the pixel signal from the unit pixel 321. The horizontal scanning unit 333 is controlled by the control unit 331 and controls the A/D converter 312. Then, the horizontal scanning unit 333 makes the A/D converter 312 perform A/D conversion to the pixel signal read from the pixel array unit 311 and transfer the A/D converted pixel signal.

Note that, the amplification unit 314, the calculation unit 315, and the image processing unit 316 may be omitted.

<A/D Converter>

Figure 34:
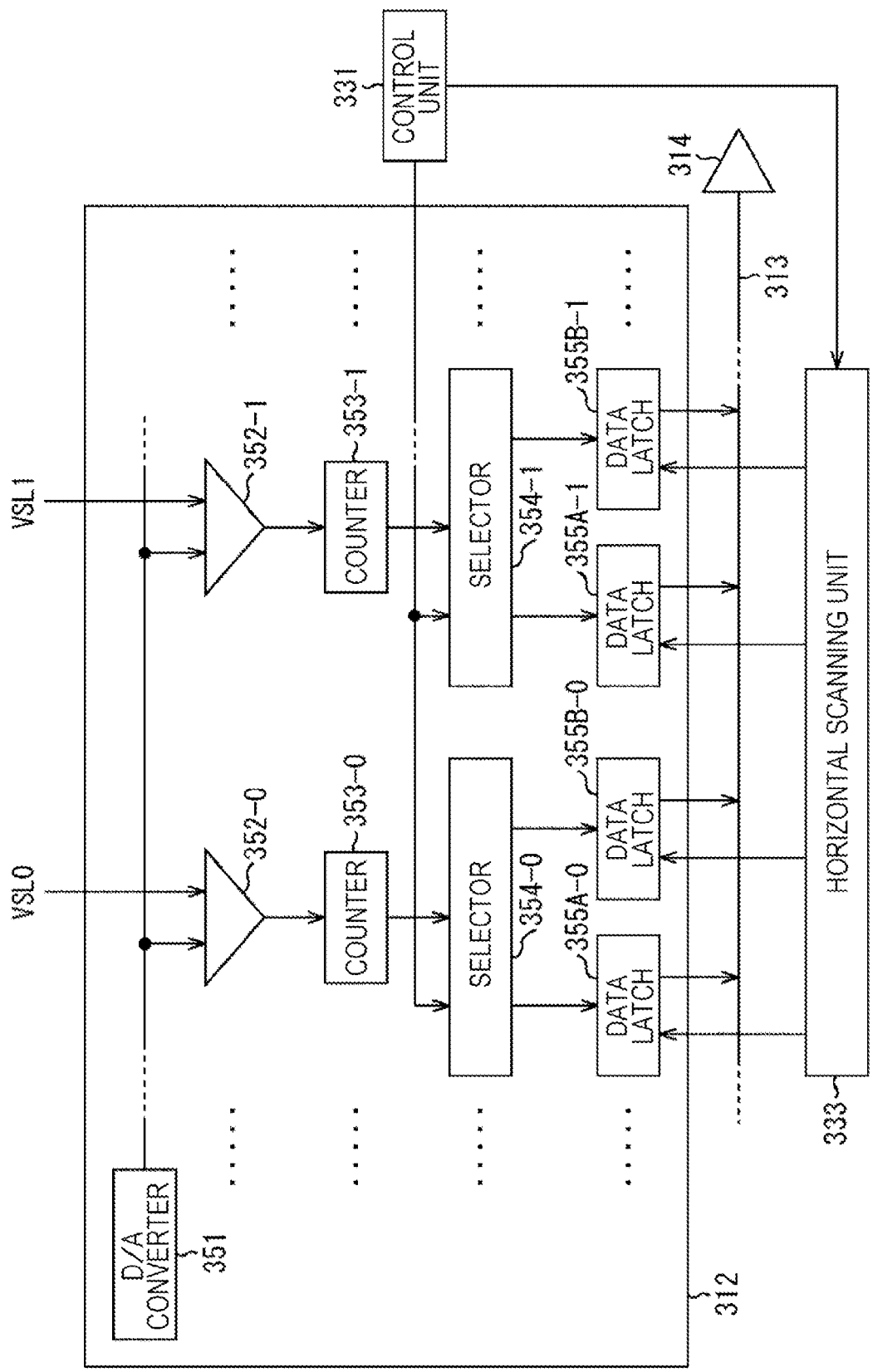
FIG. 34 is a block diagram of a primary example structure of the A/D converter.

FIG. 34 is a diagram of a primary example structure of the A/D converter 312. As described above, the A/D converter 312 includes the column A/D converter for each column. As illustrated in FIG. 34, the A/D converter 312 includes a D/A converter 351 for supplying the ramp signal to each column A/D converter.

Also, as illustrated in FIG. 34, the column A/D converter which performs A/D conversion to the pixel signal supplied via the vertical signal line VSL0 includes a comparator 352-0, a counter 353-0, a selector 354-0, data latches 355A-0 and 355B-0. Similarly, the column A/D converter which performs A/D conversion to the pixel signal supplied via the vertical signal line VSL1 includes a comparator 352-1, a counter 353-1, a selector 354-1, and data latches 355A-1 and 355B-1.

That is, each column A/D converter includes a comparator 352, a counter 353, a selector 354, and data latches 355A and 355B. Note that, in the following description, when it is not necessary to describe the units of each column as distinguishing them from each other, they are referred to as the comparator 352, the counter 353, the selector 354, and the data latches 355A and 355B as described above. When it is necessary to describe the columns as distinguishing them from each other, as described above, the units of the column A/D converter of the column X are referred to as a comparator 352-X, a counter 353-X, a selector 354-X, and data latches 355A-X and 355B-X. In addition, when it is not necessary to describe the data latches 355A and 355B as distinguishing them from each other, they are referred to as a data latch 355.

The comparator 352 compares the magnitude of the pixel signal supplied via the vertical signal line VSL of the column with that of the ramp signal supplied from the D/A converter 351 and supplies the comparison result to the counter 353.

The counter 353 counts a period from the start of the comparison by the comparator 352 to the time when the comparison result changes and outputs the count value to the selector 354.

The selector 354 supplies the count value (digital data of pixel signal) supplied from the counter 353 to at least one of the data latches 355A and 355B according to the control by the control unit 331.

The data latch 355 latches the pixel signal (digital data) supplied from the selector 354. According to the control by the horizontal scanning unit 333, the data latch 355 supplies the latched pixel signal (digital data) to the horizontal transfer path 313 and makes the horizontal transfer path 313 transfer the pixel signal to the amplification unit 314.

In this way, the A/D converter 312 has the column A/D converter for each column of the pixel array and includes two data latches 355 for each column A/D converter. Therefore, the A/D converter 312 can latch the pixel signals (digital data) of two lines. Therefore, the horizontal scanning unit 333 can optionally select and transfer one of or both of the pixel signals of the two lines in a single unit time (for example, a single horizontal synchronization period).

According to this, the CMOS image sensor 300 can realize the calculation of the pixel signals between the lines without increasing the manufacturing cost and the power consumption. Also, since the horizontal scanning unit 333 can select the pixel signal of an optional line and transfer it, the CMOS image sensor 300 can output the pixel signal in more diversified modes.

<Flow of Reading Processing>

Figure 35:
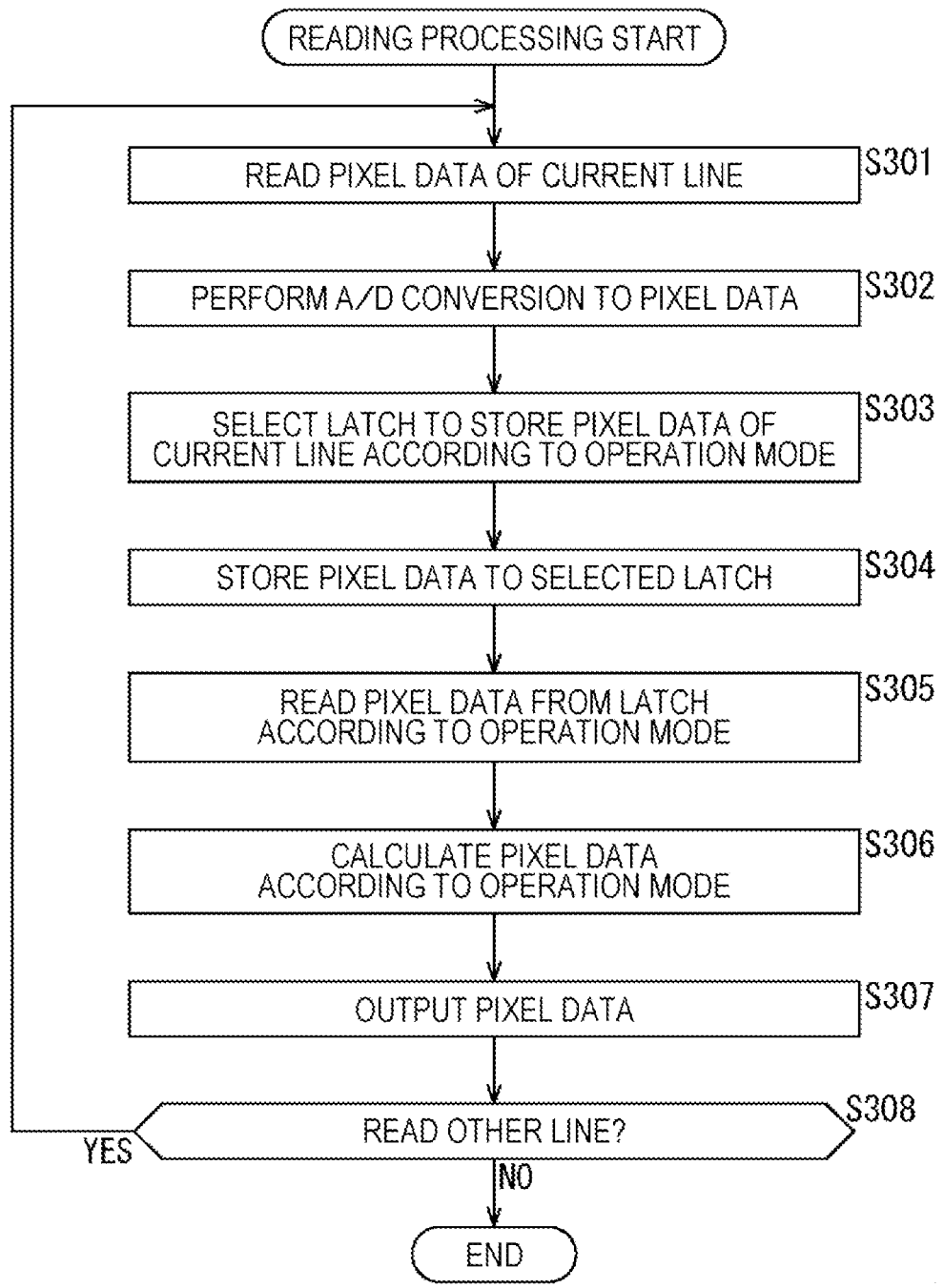
FIG. 35 is a flowchart to describe an exemplary flow of the reading processing.

An exemplary flow of reading processing is described with reference to the flowchart in FIG. 35. When the reading processing is started, in step S301, the control unit 331 controls each unit pixel 321 of the pixel array unit 311 via the vertical scanning unit 332 and reads the pixel signal from the unit pixel 321 of a current line to be processed.

In step S302, the control unit 331 controls the A/D converter 312 and makes it perform A/D conversion to the pixel signal read from the unit pixel.

In step S303, the control unit 331 controls the A/D converter 312 (more specifically, the selector 354) and selects the data latch 355 for storing pixel data (digital data of pixel signal) of the current line to which the A/D conversion has been performed according to an operation mode (reading mode).

In step S304, the control unit 331 controls the A/D converter 312 and makes the data latch 355 selected in step S303 store the pixel data.

In step S305, the control unit 331 controls the horizontal scanning unit 333 and makes it read the pixel data from a desired data latch 355 according to the operation mode.

In step S306, the control unit 331 controls the calculation unit 315 and makes it calculate the pixel data between the lines according to the operation mode. When it is not necessary to calculate the data, the processing in this step can be omitted.

In step S307, the control unit 331 controls the image processing unit 316 and makes it output the pixel data to which the image processing has been performed to the outside of the CMOS image sensor 300.

In step S308, the control unit 331 determines whether to read the pixel signal of other line (row). When an unprocessed line exists and it is determined to read the pixel signal of the other line (row), the procedure returns to step S301, and the process after that is repeated. Also, when it has been determined in step S308 not to read the pixel signal of the other line, the reading processing ends.

With this control, the CMOS image sensor 300 can realize the calculation of the pixel signals between the lines while preventing the increase in the manufacturing cost and the power consumption as necessary. Also, the CMOS image sensor 300 can output the pixel signals in more diversified modes.

<Exemplary Reading Mode>

Figure 36:
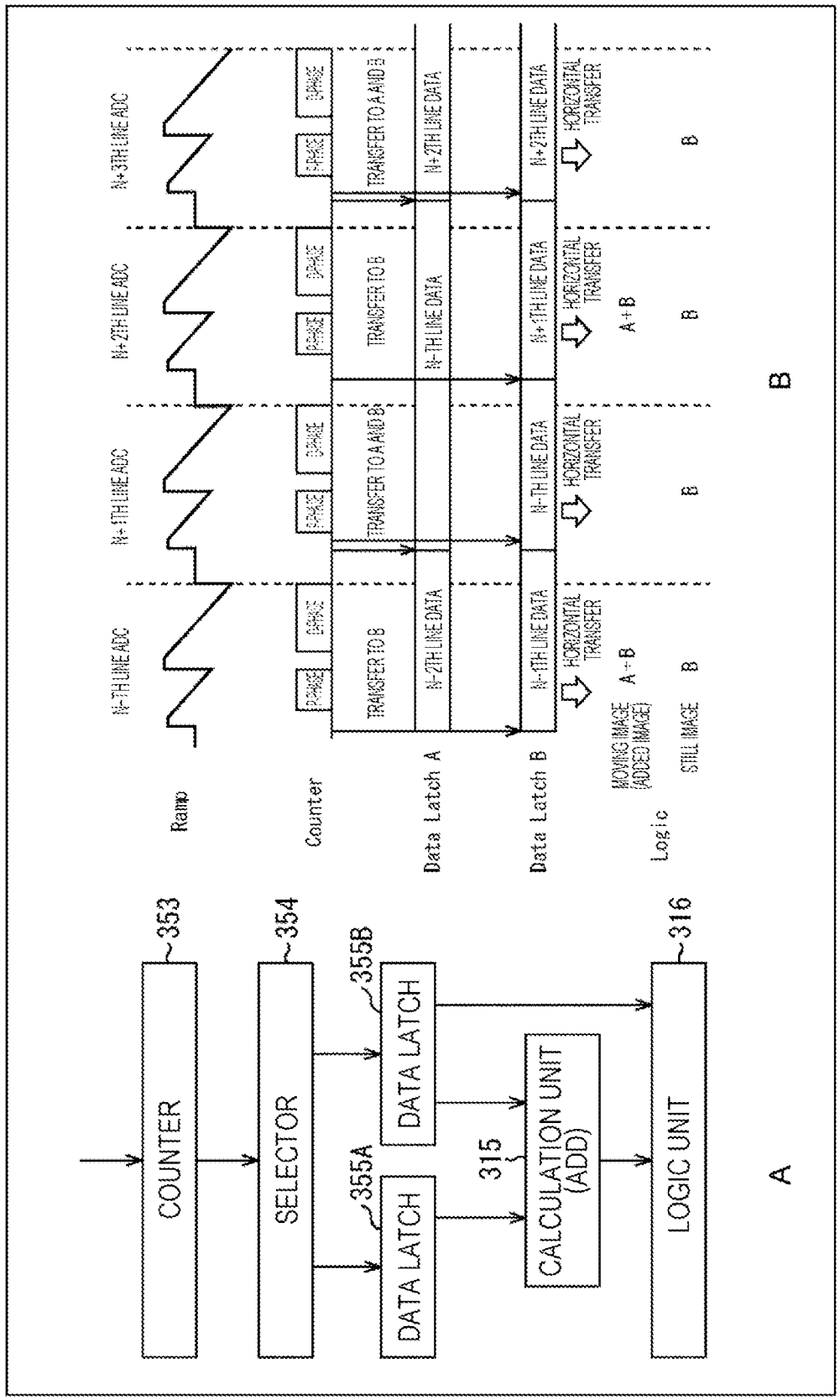
FIG. 36 is a diagram of an exemplary structure regarding pixel signal reading.

For example, as illustrated in FIG. 36, the CMOS image sensor 300 can read the pixel signals. In the example in FIG. 36, data to which the lines before and after it are added can be output. It is preferable that each processing unit of each column be configured as an example in A of FIG. 36 and the pixel signals be read, latched, and transferred as a timing chart of an example in B of FIG. 36. For example, the data of Nth line is stored in both the data latches 355A and 355B, and the data of N+1th line which is the next line is stored in the data latch 355B. At this time, the data of Nth line is still stored in the data latch 355A. Added data can be output by adding the two pieces of data by the calculation unit 315.

Also, the data before addition can be output by reading the data of the data latch 355B. In addition, for example, the output of the added data and the output of the data before the addition can be performed in parallel. For example, in a case of a moving image mode, the calculation unit 315 adds the data stored in the data latch 355A and the data stored in the data latch 355B and outputs the addition result (A+B) every single unit time. In a case of a still image mode, the data stored in the data latch 355B (B) can be output in each unit time. In this way, the pixel signal can be output by using more diversified methods.

Figure 37:
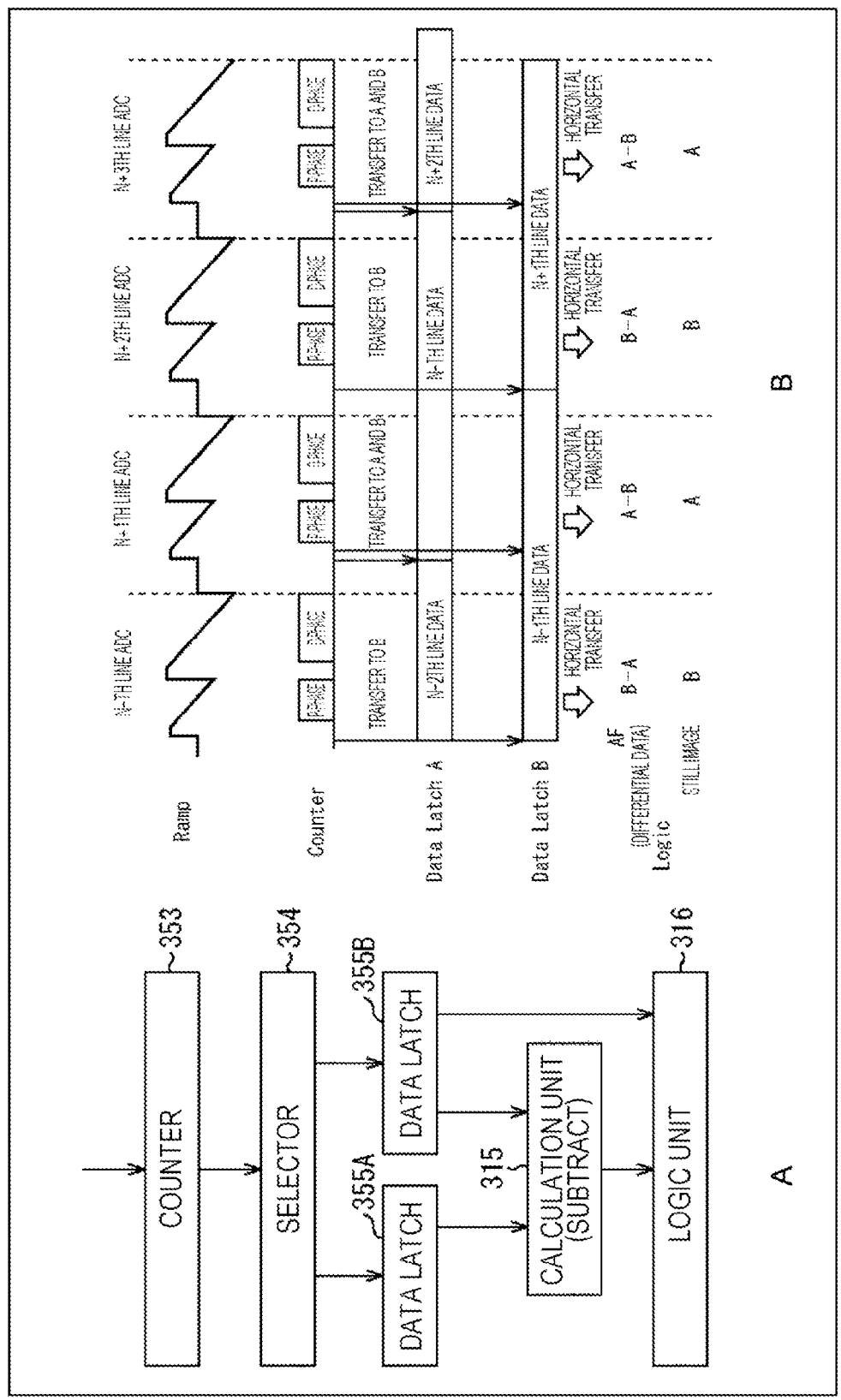
FIG. 37 is a diagram of another example of the structure regarding the pixel signal reading.

Also, for example, as illustrated in FIG. 37, the CMOS image sensor 300 can read the pixel signals. In the example in FIG. 37, data (differential data) from which the lines before and after it are subtracted can be output. It is preferable that each processing unit of each column be configured as an example in A of FIG. 37 and the pixel signals be read, latched, and transferred as a timing chart of an example in B of FIG. 37. For example, the data of Nth line is stored in the data latch 355A, and the data of N+1th line which is the next line is stored in the data latch 355B. That is, the data latches 355 for latching the data are switched for each line. In this way, the data latches 355A and 355B store the data of continuous two lines. By subtracting the two pieces of data by the calculation unit 315, the differential data can be output.

Also, by alternately reading the data stored in the data latch 355A and the data stored in the data latch 355B, the data before the subtraction can be output. In addition, for example, the output of the differential data and the output of the data before the subtraction can be performed in parallel. For example, in a case of the AF mode which is a mode to improve accuracy of a contrast auto focus (AF) function, the calculation unit 315 subtracts the data stored in the data latch 355A and the data stored in the data latch 355B and outputs the subtraction result (A−B or B−A) in each unit time. In a case of the still image mode, the data (A) stored in the data latch 355A and the data (B) stored in the data latch 355B can be alternately output for each unit time. In this way, the pixel signal can be output by using more diversified methods.

Figure 38:
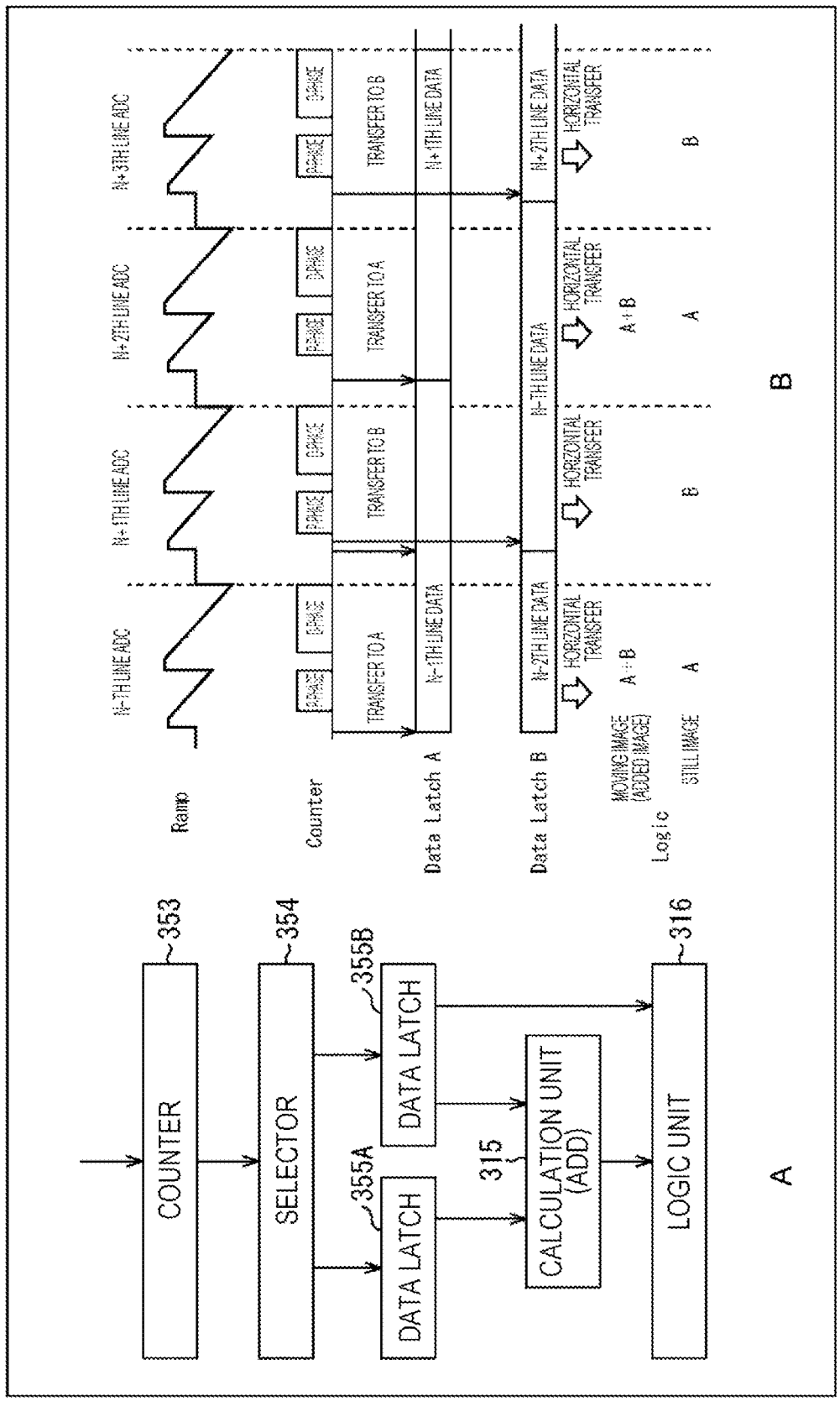
FIG. 38 is a diagram of still another example of the structure regarding the pixel signal reading.

Also, for example, as illustrated in A of FIG. 38, by having the structure similar to that in A of FIG. 38 (a case of subtraction), similarly to the example in FIG. 36, the data to which the lines before and after it are added can be output. In this case, it is preferable to read, latch, and transfer the pixel signals as illustrated in a timing chart in an example in B of FIG. 38.

For example, the data of Nth line is stored in the data latch 355A, and the data of N+1th line which is the next line is stored in the data latch 355B. That is, the data latches 355 for latching the data are switched for each line. In this way, the data latches 355A and 355B store the data of continuous two lines. Added data can be output by adding the two pieces of data by the calculation unit 315.

Also, by alternately reading the data stored in the data latch 355A and the data stored in the data latch 355B, the data before the addition can be output. In addition, for example, the output of the added data and the output of the data before the addition can be performed in parallel. For example, in a case of the moving image mode, the calculation unit 315 adds the data stored in the data latch 355A and the data stored in the data latch 355B and outputs the addition result (A+B) every single unit time. In a case of the still image mode, the data (A) stored in the data latch 355A and the data (B) stored in the data latch 355B can be alternately output for each unit time. In this way, the pixel signal can be output by using more diversified methods.

Note that, to align the centers of the data after the calculation (addition or subtraction), it is preferable that a predetermined load be applied to the data stored in each data latch and the data be calculated (added or subtracted).

With the above processing, the plurality of pieces of data can be output in parallel. Also, by calculating after the data latch, calculation (addition, subtraction, and the like) by using the pixel data of the plurality of lines can be performed. In addition, with the above structure, since it is not necessary to provide the line memory, the increase in the circuit size (manufacturing cost) and the power consumption can be prevented.

In the above, the description has been made in which the two data latches 355 are provided for each column (each column A/D converter). However, the number of data latches 355 per column can be optionally determined. For example, three or more data latches 355 may be provided for each column. Thus, the pixel data of larger number of lines can be stored, and more diversified calculations can be performed between the lines. That is, the pixel signal can be output by using more diversified methods.

4. Fourth Embodiment

<Reduction of Noise Due to Multisampling>

As described in the above embodiments, when a plurality of lines of A/D conversion is performed to each column, a noise of output data may be reduced by using the lines which are independent from each other.

In this case, it is preferable that a sampling timing of a P-phase be shifted from that of a D-phase in the A/D conversion of each line and an addition average of each phase be obtained.

For example, DAC waveforms of the respective lines are shifted from each other. Since column ADCs of the respective lines are independently operated, this operation can be easily realized. According to this, the number of times of sampling is doubled. Therefore, when the noises are not correlated with each other, a SN ratio can be improved by outputting the addition averages of the signals obtained by both sampling. That is, the noise of the output data can be reduced.

However, with this method, it has been a possibility of an increase in an A/D conversion processing time per column.

Therefore, the sampling timings may be shifted by relatively shifting an offset of a reference signal (ramp signal) without changing timing control of the plurality of times of A/D conversion. For example, as indicated by a dotted line 401 and a solid line 402 in the example in FIG. 39, it is preferable that the sampling timings of the P-phase and the D-phase be divided into a plurality of timings and the addition average of each output be obtained.

Figure 40:
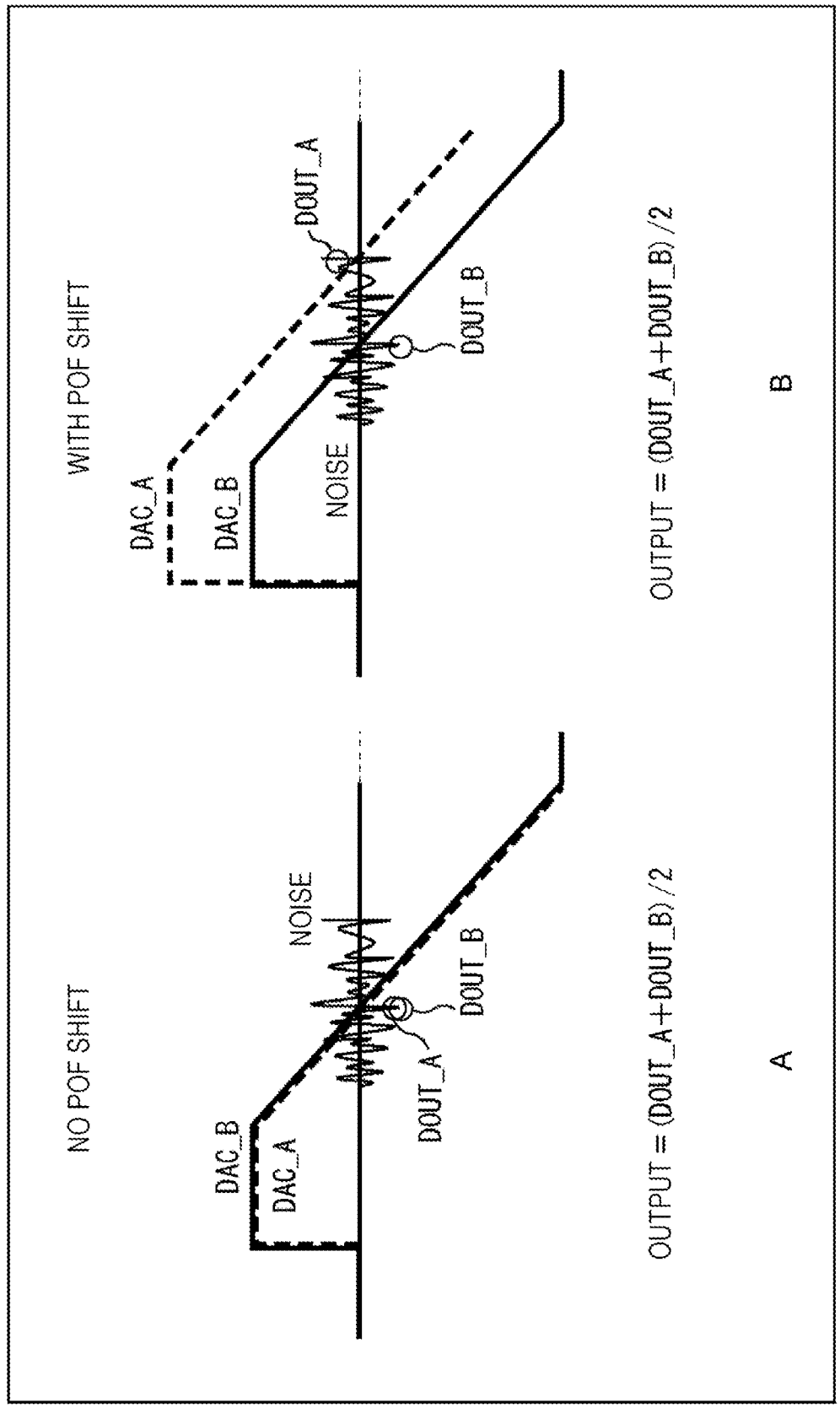
FIG. 40 is a diagram of an example of protection of a shift amount of an offset.

For example, as illustrated in A of FIG. 40, when the offset of the ramp signal of each line is not shifted (the same offset is applied to the ramp signal of each line), the sampling timings of the respective lines are the same as each other. Therefore, substantially same noise is applied to the output data. Therefore, even when the addition average of the output data of each line is obtained, it is difficult to improve the SN ratio of the pixel signal although the SN ratio of the A/D converter is improved.

Figure 39:
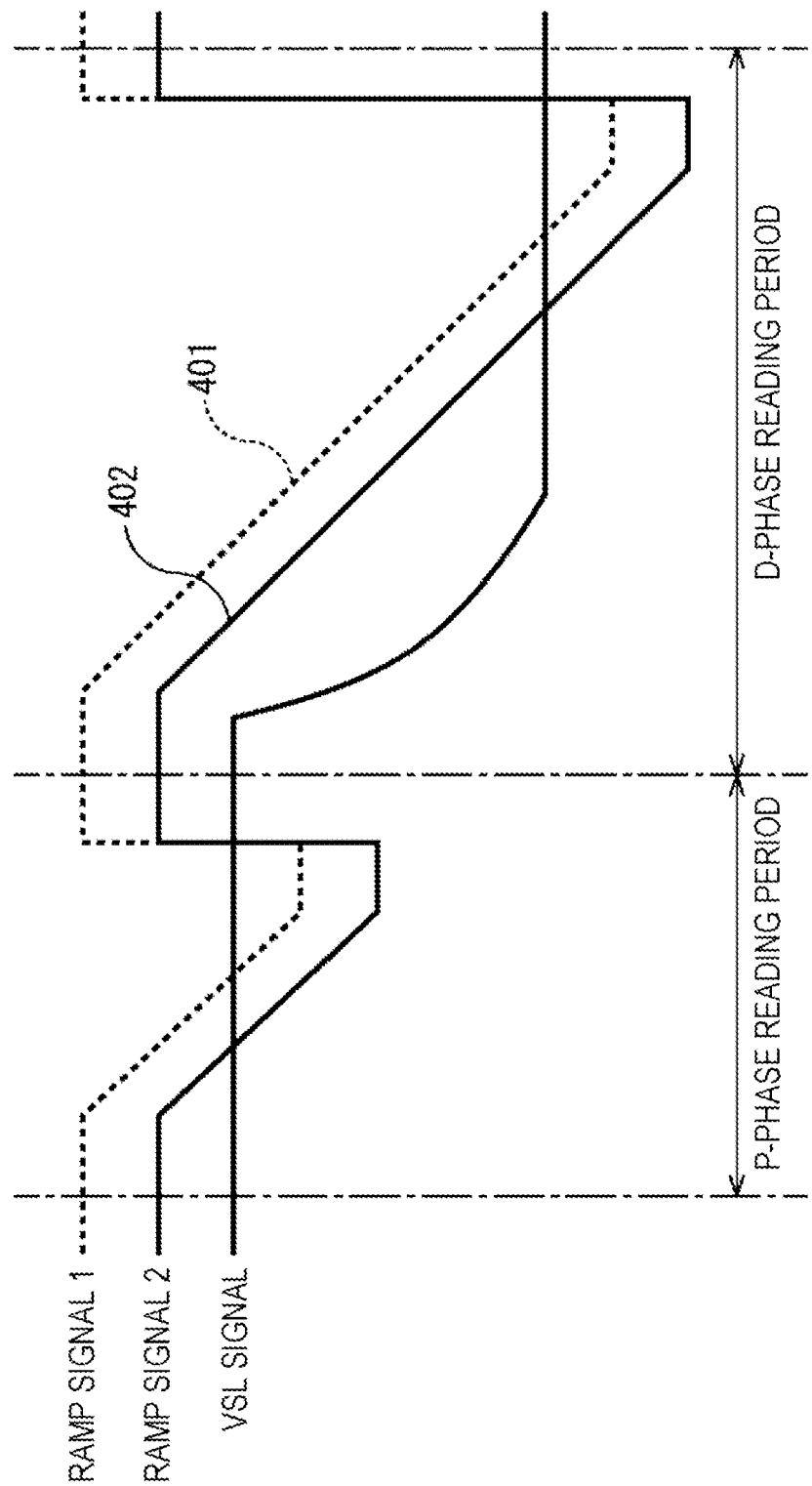
FIG. 39 is a diagram of another example of protection of a shift amount of an offset of a ramp signal.

Whereas, as in the example in FIG. 39, when the offsets of the ramp signals of the respective lines are relatively shifted from each other (different offsets are applied to the ramp signals of the respective lines), the sampling timings of the respective lines are different from each other as illustrated in B of FIG. 40. When it is assumed that the noise applied to the output data be random noise, the SN ratios of the pixel signal and the A/D converter can be improved by using the addition average of the output data of each line as the output data. That is, the noise of the output data can be more reduced.

Also, with this method, since supply timings of the ramp signals of all the lines are the same, it is easier to perform control than a case where the supply timings of the ramp signals are shifted for each line. Also, when the offsets of the ramp signals are shifted for each line, the time to perform the A/D conversion can be shorter than that in a case where the supply timing of the ramp signal is shifted for each line. That is, the increase in the A/D conversion processing time can be prevented. That is, the A/D conversion processing can be performed at a higher speed.

<Performing Both Blackening Phenomenon Correction and Multisampling>

Note that, in an image pickup device, when very strong light enters a photoelectric conversion unit (photodiode), a blackening phenomenon may occur. As a method for correcting the blackening phenomenon, there is a method for outputting a fixed value as the result of the A/D conversion when an output of the comparator is not inverted in a P-phase reading period. In a case of this method, when the offset of the ramp signal is too small, the output of the comparator is inverted in the P-phase reading period. Therefore, the control method for outputting the fixed value is not effectively functioned, and a possibility is considered that it is difficult to prevent the generation of the blackening phenomenon.

Figure 41:
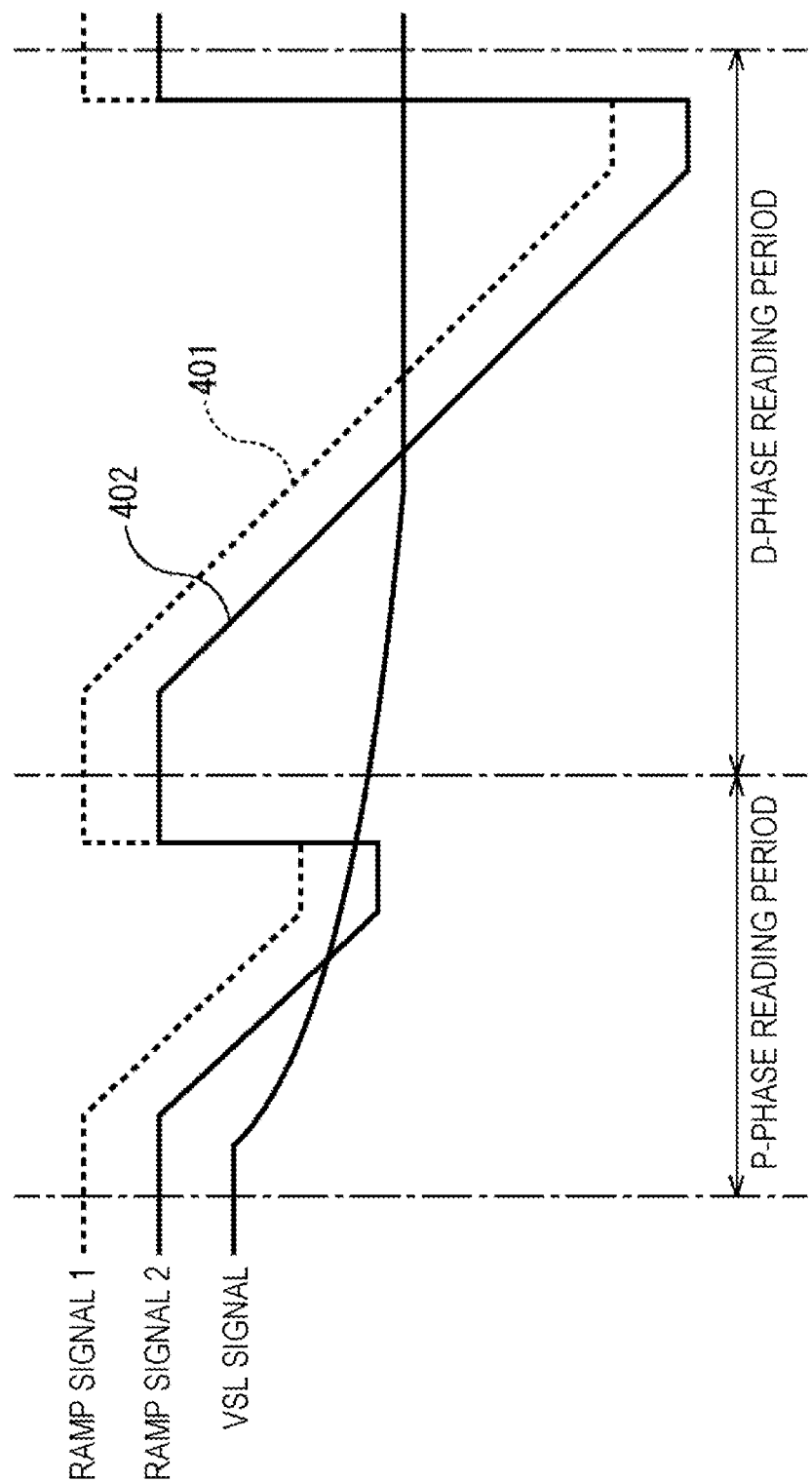
FIG. 41 is a diagram of another example of the protection of the shift amount of the offset.

For example, in a case of FIG. 41, the result of comparison between the pixel signal (VSL signal) and a ramp signal 1 indicated by a dotted line 401 is not inverted in the P-phase reading period. However, the result of comparison between the pixel signal (VSL signal) and a ramp signal 2 indicated by a solid line 402 is inverted in the P-phase reading period. In this way, when a difference between offsets of the ramp signals 1 and 2 is too large, that is, the offset to be applied to the ramp signal is too small, the comparison result between the ramp signal and the pixel signal is easily inverted. It is difficult to control the prevention of the generation of the blackening phenomenon due to the output of the fixed value described above.

It is preferable that a shift amount of the offset of the ramp signal be changed according to an inclination of the ramp signal. For example, when the inclination of the ramp signal is large, a difference between the offsets of the ramp signals of the respective A/D converters is set to be small. When the inclination of the ramp signal is small, the difference between the offsets of the ramp signals of the respective A/D converters may be set to be large.

Whether the inclination of the ramp signal is large or not may be determined by using a predetermined threshold. That is, when the inclination of the ramp signal is larger than the predetermined threshold (or equal to or larger than the threshold), it is determined that the inclination of the ramp signal is large, and the difference between the offsets of the ramp signals of the respective A/D converters is set to be small. When the inclination of the ramp signal is equal to or less than the predetermined threshold (smaller than the threshold), it is determined that the inclination of the ramp signal is small, and the difference between the offsets of the ramp signals of the respective A/D converters may be set to be large. The threshold may be optionally determined. The threshold may be a predetermined fixed value and may be determined on the basis of some information. Also, the difference between the offsets of the ramp signals of the respective lines may be set to be a value according to the inclination of the ramp signal without using the threshold.

By perform control in this way, even when the very strong light enters the photoelectric conversion unit, the blackening phenomenon can be normally corrected, and a noise reduction effect caused by the multisampling can be obtained.

Note that, when the fixed value of which blackening phenomenon is corrected is output from any one of the output signals by using a plurality of lines of outputs, it is preferable that the fixed value be selected and output without performing addition average processing.

Also, in this case, the number of A/D converters per column can be optionally determined. Note that, when the image sensor has the plurality of A/D converters provided for each column, the above control can be applied to any image sensor. For example, the control can be realized in each CMOS image sensor described in the above-mentioned embodiments. In the following description, the CMOS image sensor 100 in FIG. 1 is described as an example.

<Flow of Ramp Signal Control Processing>

Figure 42:
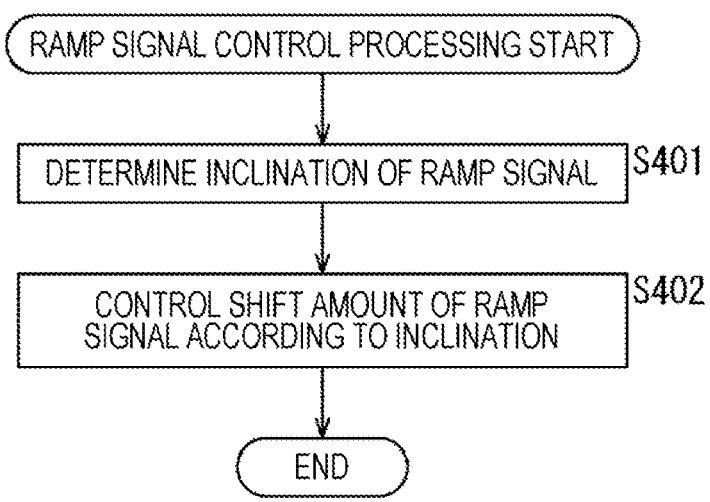
FIG. 42 is a flowchart to describe an exemplary flow of ramp signal control processing.

An exemplary flow of ramp signal control processing to control an offset amount of the ramp signal as described above is described with reference to a flowchart in FIG. 42.

When the ramp signal control processing is started, a sensor controller 131 determines the inclination of the ramp signal output by the D/A converter 113 in step S401. The D/A converter 113 generates and outputs the ramp signal according to the control by the sensor controller 131. That is, the sensor controller 131 determines the inclination of the ramp signal on the basis of the control information. Note that, it is preferable that the sensor controller 131 analyze an output waveform (waveform of ramp signal) of the D/A converter 113 and determine the inclination of the waveform.

In step S402, the sensor controller 131 controls the D/A converter 113 and controls the shift amount (difference between offsets) of the ramp signal as described above according to the inclination of the ramp signal determined in step S401. When the shift amount of the ramp signal is controlled, the ramp signal control processing ends.

With the above control, the CMOS image sensor 100 can obtain the noise reduction effect caused by the multisampling and can prevent the generation of the blackening phenomenon. That is, the pixel signal can be output by using more diversified methods.

5. Fifth Embodiment

<CMOS Image Sensor>

Note that, the image pickup element to which the present technology has been applied may have a plurality of semiconductor substrates superposed with each other.

Figure 43:
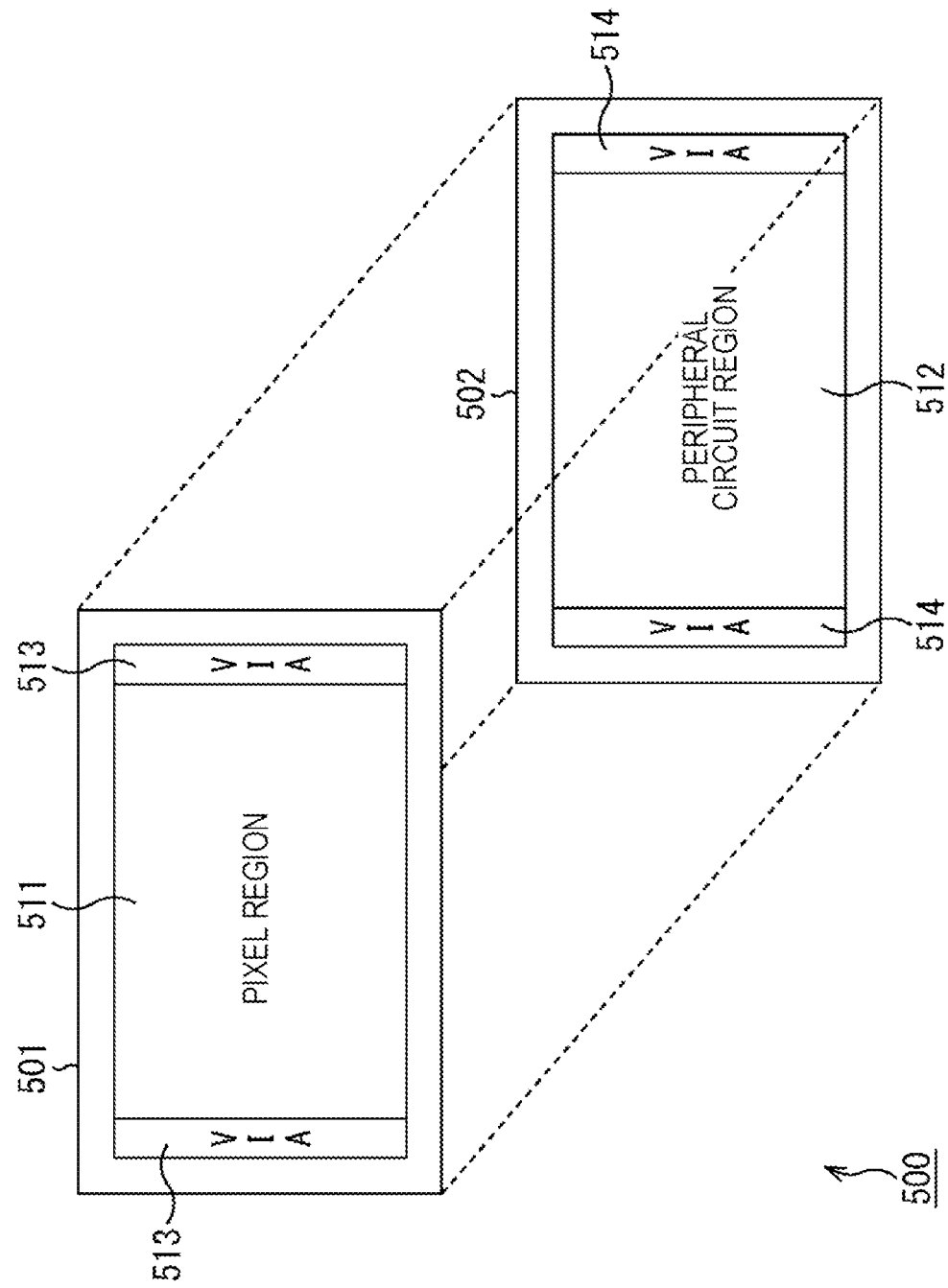
FIG. 43 is a diagram of a primary example structure of an image pickup element.

FIG. 43 is a diagram of a primary example structure of an exemplary image pickup element to which the present technology has been applied. Similarly to the CMOS image sensors described in the embodiments, a CMOS image sensor 500 illustrated in FIG. 43 is an image pickup element which images an object and obtains digital data of the imaged image. As illustrated in FIG. 43, the CMOS image sensor 500 includes two semiconductor substrates (laminated chips (pixel chip 501 and circuit chip 502)) superposed with each other. Note that, it is preferable to provide a plurality of semiconductor substrates (laminated chip). The number of semiconductor substrates may be, for example, equal to or larger than three.

In the pixel chip 501, a pixel region 511 where unit pixels including photoelectric conversion elements for photoelectrically converting incident light are arranged is formed. Also, in the circuit chip 502, a peripheral circuit region 512 where a peripheral circuit for processing the pixel signal read from the pixel region 511 is formed is formed.

As described above, the pixel chip 501 and the circuit chip 502 are superposed with each other and form a multilayer structure (laminated structure). Each pixel of the pixel region 511 formed in the pixel chip 501 and the peripheral circuit of the peripheral circuit region 512 formed in the circuit chip 502 are electrically connected to each other via through vias (VIA) formed in via regions (VIA) 513 and 514.

Even when the CMOS image sensor 500 has the laminated structure, the CMOS image sensor 500 can have the structure of the CMOS image sensor described in the above embodiments. That is, the present technology can also be applied to the CMOS image sensor 500 having the laminated structure.

6. Sixth Embodiment

<Image Pickup Device>

Figure 44:
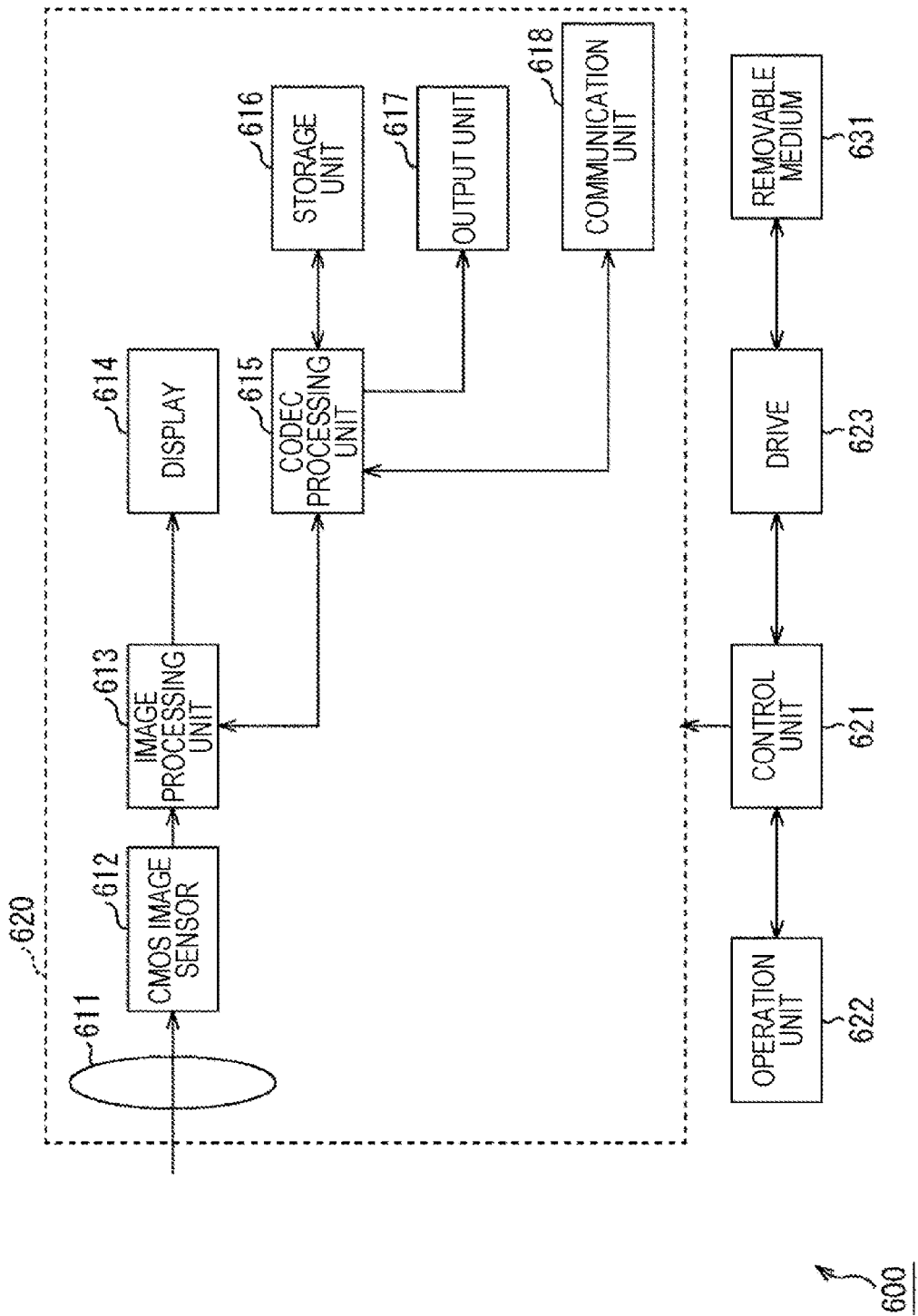
FIG. 44 is a diagram of a primary example structure of an image pickup device.

Note that, the present technology can be applied to a device other than the image pickup element. For example, the present technology may be applied to a device having the image pickup element (electronic device and the like) such as an image pickup device. FIG. 44 is a block diagram of a primary example structure of an image pickup device as an exemplary electronic device to which the present technology has been applied. An image pickup device 600 illustrated in FIG. 44 is a device for imaging an object and outputting the image of the object as an electrical signal.

The image pickup device 600 illustrated in FIG. 44 includes an optical unit 611, a CMOS image sensor 612, an image processing unit 613, a display 614, a codec processing unit 615, a storage unit 616, an output unit 617, a communication unit 618, a control unit 621, an operation unit 622, and a drive 623.

The optical unit 611 adjusts a focus to the object and includes a lens which collects light from the position where the focus is adjusted, a diaphragm which adjusts exposure, and a shutter which controls a timing of imaging. Light from the object (incident light) passes through the optical unit 611, and the optical unit 611 supplies the light to the CMOS image sensor 612.

The CMOS image sensor 612 performs A/D conversion to a signal (pixel signal) of each pixel by photoelectrically converting the incident light and performs signal processing such as CDS. Then, the CMOS image sensor 612 supplies the processed and imaged image data to the image processing unit 613.

The image processing unit 613 performs image processing to the imaged image data obtained by the CMOS image sensor 612. More specifically, the image processing unit 613 performs various image processing relative to the imaged image data supplied from the CMOS image sensor 612. For example, the image processing includes color mixture correction, black level correction, white balance adjustment, demosaic processing, matrix processing, gamma correction, and YC conversion. The image processing unit 613 supplies the imaged image data to which the image processing has been performed to the display 614.

The display 614 is, for example, configured as a liquid crystal display and the like. The display 614 displays an image of the imaged image data supplied from the image processing unit 613 (for example, image of object).

In addition, the image processing unit 613 supplies the imaged image data to which the image processing has been performed to the codec processing unit 615 as necessary.

The codec processing unit 615 performs predetermined system encoding processing to the imaged image data supplied from the image processing unit 613 and supplies the obtained encoded data to the storage unit 616. Also, the codec processing unit 615 reads the encoded data recorded in the storage unit 616 and generates decoded image data by decoding the encoded data. Then, the codec processing unit 615 supplies the decoded image data to the image processing unit 613.

The image processing unit 613 performs predetermined image processing to the decoded image data supplied from the codec processing unit 615. The image processing unit 613 supplies the decoded image data to which the image processing has been performed to the display 614. The display 614 is, for example, configured as a liquid crystal display and the like and displays the image of the decoded image data supplied from the image processing unit 613.

Also, the codec processing unit 615 may supply the encoded data obtained by encoding the imaged image data supplied from the image processing unit 613 or the encoded data of the imaged image data read from the storage unit 616 to the output unit 617 and output is to the outside of the image pickup device 600. Also, the codec processing unit 615 may supply the imaged image data before encoding or the decoded image data obtained by decoding the encoded data read from the storage unit 616 to the output unit 617 and output it to the outside of the image pickup device 600.

In addition, the codec processing unit 615 may transmit the imaged image data, the encoded data of the imaged image data, or the decoded image data to the other device via the communication unit 618. Also, the codec processing unit 615 may obtain the encoded data of the imaged image data and the image data via the communication unit 618. The codec processing unit 615 appropriately encodes and decodes the encoded data of the imaged image data and the image data obtained via the communication unit 618. The codec processing unit 615 may supply the obtained image data or the encoded data to the image processing unit 613 as described above and may output it to the storage unit 616, the output unit 617, and the communication unit 618.

The storage unit 616 stores the encoded data supplied from the codec processing unit 615 and the like. The encoded data stored in the storage unit 616 is read and decoded by the codec processing unit 615 as necessary. The imaged image data obtained by decoding processing is supplied to the display 617, and the imaged image corresponding to the imaged image data is displayed.

The output unit 617 includes an external output interface such as an external output terminal and outputs various data supplied via the codec processing unit 615 to the outside of the image pickup device 600 via the external output interface.

The communication unit 618 supplies various information including the image data and the encoded data supplied from the codec processing unit 615 to the other device which is a communication partner of predetermined communication (wired communication or wireless communication). Also, the communication unit 618 obtains the various information including the image data and the encoded data from the other device which is the communication partner of the predetermined communication (wired communication or wireless communication) and supplies it to the codec processing unit 615.

The control unit 621 controls an operation of each processing unit (each processing unit in the dotted line 620, the operation unit 622, and the drive 623) of the image pickup device 600.

The operation unit 622 is formed of an arbitrary input device such as a jog dial (trademark), a key, a button, or a touch panel. For example, the operation unit 622 receives an operation input by a user and the like and supplies a signal corresponding to the operation input to the control unit 621.

The drive 623 reads information stored in a removable medium 631 mounted thereto. For example, the removable medium 631 is a magnetic disk, an optical disk, a magnetooptical disk, or a semiconductor memory. The drive 623 reads various information such as a program and data from the removable medium 631 and supplies it to the control unit 621. Also, when the writable removable medium 631 is mounted to the drive 623, the drive 623 stores the various information such as the image data and the encoded data supplied from the control unit 621 to the removable medium 631.

The present technology described in the embodiments is applied as the CMOS image sensor 612 of the image pickup device 600 described above. That is, the CMOS image sensor (for example, CMOS image sensor 100, CMOS image sensor 200, or CMOS image sensor 300) described in the embodiments is used as the CMOS image sensor 612. According to this, the CMOS image sensor 612 can realize easier and more diversified data output. Therefore, the image pickup device 600 can realize easier and more diversified data output by imaging the object.

Note that, the structure of the image pickup device to which the present technology has been applied is not limited to those described above and may be any other structure. For example, the image pickup device may be an information processor having an imaging function such as a digital still camera, a video camera, a portable telephone, a smart phone, a tablet type device, and a personal computer. Also, the image pickup device may be a camera module which is attached to the other information processor and used (or mounted as a built-in-device).

The series of processing described above can be performed by hardware and software. When the series of the processing is performed by the software, a program for configuring the software is installed from a network and recording media.

For example, as illustrated in FIG. 44, the recording media is configured of the removable medium 631, in which the program is recorded and which is distributed to distribute the program to the user, separately provided from the device body. The removable medium 631 includes a magnetic disk (including flexible disk) and an optical disk (including CD-ROM and DVD). In addition, the removable media 631 includes a magnetooptical disk (including mini disc (MD)) and a semiconductor memory.

In this case, the program can be installed to the storage unit 616 by attaching the removable medium 631 to the drive 623.

Also, the program can be provided via a wired or wireless transmission media such as a local area network, the Internet, and digital satellite broadcasting. In this case, the program can be received by the communication unit 18 and can be installed to the storage unit 616.

In addition, the program can be previously installed to a read only memory (ROM) and the like in the storage unit 616 and the control unit 621.

Note that, the program performed by the computer may be a program in which processing is performed along the order described herein in a time series manner and a program in which the processing is performed in parallel or at a necessary timing when a call has been performed.

Also, here, a step for writing the program recorded in the recording media includes processing performed along the described order in time series and processing performed in parallel or independently even when the processing is not performed in time series.

Also, the processing in each step can be performed by the above-mentioned devices or any device other than the above-mentioned devices. In this case, it is preferable that the device for performing the processing have a function (function block and the like) necessary for performing the processing. Also, it is preferable that information necessary for the processing be appropriately transmitted to the device.

Also, the system means herein an assembly of a plurality of components (devices, modules (parts), and the like), and it is not considered whether all the components are in the same housing. Therefore, both a plurality of devices respectively housed in different housings from each other and connected via the network and a single device having a plurality of modules housed in one housing are systems.

Also, the structure described above as a single device (or processing unit) may be divided, and the divided parts may form a plurality of devices (or processing unit). Conversely, the structure described above as a plurality of devices (or processing unit) may be collectively configured as a single device. Also, a structure other than the structure described above may be added to the structure of each device (or each processing unit). In addition, when the structure and the operation as a whole system are substantially the same, a part of the structure of a device (or processing unit) may be included in the structure of the other device (or other processing unit).

Preferred embodiments of the present disclosure have been described in detail above with reference to the drawings. However, the technical scope of the present disclosure is not limited to the embodiments. It is obvious that a person who has normal knowledge in the technical field of the present disclosure can easily arrive at various variations and modifications in the scope of the technical ideas described in claims. It is understood that the variations and modifications naturally belong to the technical scope of the present disclosure.

For example, the present technology can have a structure of cloud computing in which a single function is shared and jointly processed by a plurality of devices via a network.

Also, each step described with reference to the above-mentioned flowchart can be performed by the single device and can be divided and performed by the plurality of devices.

In addition, when a plurality of processing is included in one step, the plurality of processing included in one step can be performed by the single device and can be divided and performed by the plurality of devices.

Also, the present technology is not limited to this and can be performed as the structure attached to the device or the device for configuring the system. The above structure is, for example, a processor as a system large scale integration (LSI) and the like, a module using a plurality of processors, a unit using a plurality of modules, and a set in which the other function is added to the unit (that is, structure of a part of the device).

Note that, the present technology can have the structure below.

(1) An image pickup element comprising:
a pixel array configured to have a plurality of signal lines for transmitting a pixel signal read from a pixel allocated to each column and have pixel signal reading modes which are different from each other respectively allocated to the signal lines of each column and be connected to the pixel corresponding to the mode; and a control unit configured to perform control to read the pixel signal from the pixel connected to the signal line corresponding to the reading mode of the pixel signal in the mode regarding each column of the pixel array and to transmit the read pixel signal via the signal line.

(2) The image pickup element according to any one of (1) and (3) to (13), wherein the control unit performs control to read the pixel signal from the pixel at a frame rate of the mode corresponding to the pixel.

(3) The image pickup element according to any one of (1), (2), and (4) to (13), wherein the control unit further performs control to perform a main shutter operation and a pre-shutter operation of each column at the frame rate of the mode.

(4) The image pickup element according to any one of (1) to (3) and (5) to (13), wherein the number of pixels allocated to each signal line of the column is different for each column.

(5) The image pickup element according to any one of (1) to (4) and (6) to (13), further comprising:

a selection unit configured to select the signal line corresponding to the reading mode of the pixel signal from among the plurality of signal lines in each column, wherein the control unit performs control to make the selection unit select any one of the signal lines for each column and to read the pixel signal from the pixel connected to the signal line selected by the selection unit in the mode and to transmit the read pixel signal via the signal line selected by the selection unit.

(6) The image pickup element according to any one of (1) to (5) and (7) to (13), wherein the control unit performs control to make the selection unit sequentially switch the signal line to be selected and read the pixel signals of a plurality of modes in time series.

(7) The image pickup element according to any one of (1) to (6) and (8) to (13), wherein a dummy pixel corresponding to the mode corresponding to the signal line is connected to each of the plurality of signal lines of each column of the pixel array, and the control unit performs control to read the pixel signal from the dummy pixel connected to the signal line corresponding to the reading mode of the pixel signal in the mode regarding each column of the pixel array.

(8) The image pickup element according to any one of (1) to (7) and (9) to (13), wherein the control unit further performs control to perform a shutter operation of the dummy pixel in the mode.

(9) The image pickup element according to any one of (1) to (8) and (10) to (13), further comprising:

an A/D converter configured to perform A/D conversion to the pixel signal transmitted via the signal line in each column of the pixel array.

(10) The image pickup element according to any one of (1) to (9) and (11) to (13), further comprising:

a selection unit configured to select a signal line corresponding to a reading mode of the pixel signal from among the plurality of signal lines in each column of the pixel array, wherein the A/D converter performs A/D conversion to the pixel signal read from the pixel connected to the signal line selected by the selection unit.

(11) The image pickup element according to any one of (1) to (10), (12), and (13), wherein the plurality of A/D converters is provided relative to each column of the pixel array, and the selection unit selects the A/D converter used for performing the A/D conversion to the pixel signal.

(12) The image pickup element according to any one of (1) to (11) and (13), wherein the control unit performs control to make the selection unit select the plurality of signal lines and A/D converters for each column of the pixel array and to read the pixel signals in the mode from the pixels connected to the respective signal lines selected by the selection unit in parallel between the signal lines for each column of the pixel array.

(13) The image pickup element according to any one of (1) to (12), wherein an exposure time of each pixel is set for each mode corresponding to the signal line connected to the pixel.

(14) A control method comprising:

reading a pixel signal in a mode from a pixel connected to a signal line corresponding to a reading mode of the pixel signal regarding each column of a pixel array connected to the pixel corresponding to the mode in which a plurality of signal lines for transmitting the pixel signal read from the pixel is allocated to each column and pixel signal reading modes different from each other are allocated to the respective signal lines of each column; and transmitting the read pixel signal via the signal line.

(15) An image pickup device comprising:

an imaging unit configured to image an object; and an image processing unit configured to perform image processing to image data imaged by the imaging unit, wherein the imaging unit has a pixel array which includes a plurality of signal lines for transmitting a pixel signal read from a pixel allocated to each column and pixel signal reading modes which are different from each other respectively allocated to the signal lines of each column and is connected to the pixel corresponding to the mode and a control unit which performs control to read the pixel signal from the pixel connected to the signal line corresponding to the reading mode of the pixel signal in the mode regarding each column of the pixel array and to transmit the read pixel signal via the signal line.

(16) An image pickup element comprising:

a pixel array configured to have a plurality of signal lines, which transmits a pixel signal read from a pixel, allocated to each column and have the pixel of each column connected to one of signal lines allocated to each column;

a plurality of A/D converters configured to perform A/D conversion to the pixel signals transmitted via the signal lines different from each other of each column of the pixel array;

a plurality of compressors configured to compress the pixel signals to which A/D conversion is respectively performed by the A/D converters different from each other; and a control unit configured to perform control to read the pixel signals in parallel from the plurality of lines of pixels allocated to the signal lines different from each other for each column of the pixel array, to transmit the plurality of lines of pixel signals read from the plurality of lines of pixels by using the signal lines corresponding to the pixels in parallel, to perform A/D conversion in parallel to the plurality of lines of pixel signals transmitted by using the plurality of signal lines by using the plurality of A/D converters, and to compress the pixel signal of the lines different from each other to which A/D conversion is performed by the different A/D converters by using the plurality of compressors in parallel.

(17) The image pickup element according to any one of (16) and (18) to (20), wherein the plurality of compressors compresses the pixel signal of each line so that the data size of the compressed pixel signals of the plurality of lines is equal to or smaller than the size which is transmitted within a single unit period.

(18) The image pickup element according to any one of (16), (17), (19), and (20), wherein the control unit reads image signals for each two lines, and the plurality of compressors compresses the pixel signal of each line so that the data size of the pixel signal becomes half.

(19) The image pickup element according to any one of (16) to (18) and (20), wherein the compressor compresses the pixel signal at a predetermined bit rate.

(20) The image pickup element according to any one of (16) to (19), further comprising:

a plurality of signal processing units configured to perform predetermined signal processing in parallel to the respective pixel signal of the different lines to which the A/D conversion is performed by the different A/D converters; wherein the plurality of compressors compresses the pixel signals of the different lines in parallel to which the signal processing is performed by the plurality of different signal processing units.

(21) A control method comprising:

reading pixel signals in parallel from a plurality of lines of pixels allocated to the different signal lines of each column of a pixel array in which a plurality of signal lines for transmitting the pixel signal read from the pixel is allocated to each column and the pixel of each column is connected to one of the plurality of signal lines allocated to the column;

transmitting the plurality of lines of pixel signals read from the plurality of lines of pixels in parallel by using the signal line corresponding to each pixel;

performing A/D conversion in parallel to the plurality of lines of pixel signals transmitted by using the plurality of signal lines; and compressing the pixel signals of the different lines, to which A/D conversion has been performed, in parallel.

(22) An image pickup device comprising:

an imaging unit configured to image an object; and an image processing unit configured to perform image processing to image data imaged by the imaging unit, wherein the imaging unit includes a pixel array which has a plurality of signal lines, which transmits a pixel signal read from a pixel, allocated to each column and has the pixel of each column connected to one of signal lines allocated to each column, a plurality of A/D converters which performs A/D conversion to the pixel signals transmitted via the signal lines different from each other of each column of the pixel array, a plurality of compressors which compresses the pixel signals to which A/D conversion is respectively performed by the A/D converters different from each other, and a control unit which performs control to read the pixel signals in parallel from the plurality of lines of pixels allocated to the signal lines different from each other for each column of the pixel array, to transmit the plurality of lines of pixel signals read from the plurality of lines of pixels by using the signal lines corresponding to the pixels in parallel, to perform A/D conversion in parallel to the plurality of lines of pixel signals transmitted by using the plurality of signal lines by using the plurality of A/D converters, and to compress the pixel signals of the different lines to which A/D conversion is performed by the different A/D converters by using the plurality of compressors in parallel.

(23) An image pickup element comprising:

a pixel array;

a plurality of A/D converters configured to be allocated to each column of the pixel array and perform A/D conversion to a pixel signal read from a pixel of the column;

a plurality of latches configured to be allocated to each A/D converter and store the pixel signal to which A/D conversion has been performed by the A/D converter; and a control unit configured to perform control to read the pixel signal from the pixel of the line to be processed in each column of the pixel array, to perform A/D conversion to the pixel signal read from the pixel by using the A/D converter allocated to the column, to store the pixel signals to which A/D conversion has been performed by the A/D converter to one of or all the plurality of latches corresponding to the A/D converter according to a reading mode of the pixel signal, and to read the pixel signals stored in one of or all the plurality of latches according to the mode.

(24) The image pickup element according to (23), further comprising:

a calculation unit configured to add or subtract the pixel signals read from the plurality of latches, wherein the control unit performs control to add or subtract the pixel signals read from the plurality of latches according to the mode by using the calculation unit.

(25) A control method comprising:

reading a pixel signal from a pixel of a line to be processed of a column for each column of a pixel array;

performing A/D conversion to the pixel signal read from the pixel;

storing the pixel signal to which A/D conversion has been performed to one of or all of a plurality of latches according to a reading mode of the pixel signals; and reading the pixel signal stored in one of or all of the plurality of latches according to the mode.

(26) An image pickup device comprising:

an imaging unit configured to image an object; and an image processing unit configured to perform image processing to image data imaged by the imaging unit, wherein the imaging unit includes a pixel array, a plurality of A/D converters which is allocated to each column of the pixel array and performs A/D conversion to a pixel signal read from a pixel of the column, a plurality of latches which is allocated to each A/D converter and stores the pixel signal to which A/D conversion has been performed by the A/D converter, and a control unit which performs control to read the pixel signal from the pixel of the line to be processed in each column of the pixel array, to perform A/D conversion to the pixel signal read from the pixel by using the A/D converter allocated to the column, to store the pixel signals to which A/D conversion has been performed by the A/D converter to one of or all the plurality of latches corresponding to the A/D converter according to a reading mode of the pixel signal, and to read the pixel signals stored in one of or all the plurality of latches according to the mode.

(27) An image pickup element comprising:

a pixel array;

a plurality of A/D converters configured to be allocated to each column of the pixel array and perform A/D conversion to a pixel signal read from a pixel of the column by using a different ramp signal; and a control unit configured to perform control to set an offset of the ramp signal of each A/D converter to be a different value, to read the pixel signal from the pixel of a line to be processed in each column of the pixel array, and to perform A/D conversion to the pixel signal read from the pixel by using the plurality of A/D converters allocated to the column.

(28) The image pickup element according to (27) or (29), wherein the control unit sets the offset of the ramp signal of each A/D converter according to an inclination of the ramp signal.

(29) The image pickup element according to (27) or (28), wherein the control unit sets a difference between the offsets of the ramp signals of the respective A/D converters to be small when the inclination of the ramp signal is large and sets the difference between the offsets of the ramp signals of the respective A/D converters to be large when the inclination of the ramp signal is small.

(30) A control method comprising:

setting offsets of respective ramp signals of A/D converters, which are allocated to each column of a pixel array and performs A/D conversion to pixel signals read from pixels of the column by using different ramp signals, to be values different from each other;

reading the pixel signal from the pixel of the line to be processed in each column of the pixel array; and performing A/D conversion to the pixel signals read from the pixels by the plurality of A/D converters allocated to the column.

(31) An image pickup device comprising:

an imaging unit configured to image an object; and an image processing unit configured to perform image processing to image data imaged by the imaging unit, wherein the imaging unit includes a pixel array, a plurality of A/D converters which is allocated to each column of the pixel array and performs A/D conversion to a pixel signal read from a pixel of the column by using a different ramp signal, and a control unit which performs control to set an offset of the ramp signal of each A/D converter to be a different value, to read the pixel signal from the pixel of a line to be processed in each column of the pixel array, and to perform A/D conversion to the pixel signal read from the pixel by using the plurality of A/D converters allocated to the column.

REFERENCE SIGNS LIST

100 CMOS image sensor
111 pixel array unit
112 reading unit
113 D/A converter
121 column pixel part
122 selection unit
123 column A/D converter
124 horizontal transfer unit
131 sensor controller
132 vertical scanning unit
133 horizontal scanning unit
141 address decoder
142 pixel driving unit
151 unit pixel
161 photodiode
162 reading transistor
163 reset transistor
164 amplifier transistor
165 select transistor
181 current source
182 comparator
183 counter
200 CMOS image sensor
221 horizontal processing unit
222 compressor
223 output unit
300 CMOS image sensor
311 pixel array unit
312 A/D converter
313 horizontal transfer path
314 amplification unit
315 calculation unit
316 image processing unit
321 unit pixel
331 control unit
332 vertical scanning unit
333 horizontal scanning unit
351 D/A converter
352 comparator
353 counter
354 selector
355 data latch
500 CMOS image sensor
501 pixel chip
502 circuit chip
511 pixel region
512 peripheral circuit region
513,514 via region
600 image pickup device
612 CMOS image sensor
613 image processing unit
621 control unit

What is claimed is:

1. An image pickup element comprising:

a pixel array;

a plurality of A/D converters configured to be allocated to each column of the pixel array and perform A/D conversion to a pixel signal read from a pixel of a column by using a different ramp signal, wherein each column includes a dummy pixel that indicates a reading mode; and a control unit configured to perform control to set an offset of the ramp signal of each A/D converter of the plurality of A/D converters allocated to each column to be a different value, to read the pixel signal from the pixel of a line to be processed in each column of the pixel array, and to perform A/D conversion to the pixel signal read from the pixel by using the plurality of A/D converters allocated to the column.

2. The image pickup element according to claim 1, wherein the control unit sets the offset of the ramp signal of each A/D converter according to an inclination of the ramp signal.

3. The image pickup element according to claim 2, wherein the control unit sets a difference between the offsets of the ramp signals of the respective A/D converters to be small when the inclination of the ramp signal is large and sets the difference between the offsets of the ramp signals of the respective A/D converters to be large when the inclination of the ramp signal is small.

4. A control method comprising:

setting offsets of respective ramp signals of a plurality of A/D converters, wherein each column of a pixel array is allocated its own one of the plurality of A/D converters;

performing A/D conversion to pixel signals read from pixels of columns by using different ramp signals, to be values different from each other, wherein each A/D converter of the plurality of A/D converters allocated to each column has a different ramp signal and wherein each column includes a dummy pixel that indicates a reading mode;

reading a pixel signal from a pixel of a line to be processed in each column of the pixel array; and performing A/D conversion to the pixel signals read from the pixels by the plurality of A/D converters allocated to the column.

5. An image pickup device comprising:

an imaging unit configured to image an object; and an image processing unit configured to perform image processing to image data imaged by the imaging unit, wherein the imaging unit includes a pixel array, and a plurality of A/D converters, wherein each column of the pixel array is allocated its own one of the plurality of A/D converters, and each A/D converter of the plurality of A/D converters performs A/D conversion to a pixel signal read from a pixel of a column by using a different ramp signal, wherein each column includes a dummy pixel that indicates a reading mode, and a control unit which performs control to set an offset of the ramp signal of each A/D converter of the plurality of A/D converters to be a different value, to read the pixel signal from the pixel of a line to be processed in each column of the pixel array, and to perform A/D conversion to the pixel signal read from the pixel.

* * * * *